United States Patent
Traina et al.

(10) Patent No.: US 12,168,572 B2
(45) Date of Patent: Dec. 17, 2024

(54) WAREHOUSING SYSTEM FOR STORING AND RETRIEVING GOODS IN CONTAINERS

(71) Applicant: Symbotic LLC, Wilmington, MA (US)

(72) Inventors: Jeffrey Adam Traina, Wilmington, MA (US); Edward Macdonald, Somerville, MA (US)

(73) Assignee: Symbotic LLC, Wilmington, MA (US)

( * ) Notice: Subject to any disclaimer, the term of this patent is extended or adjusted under 35 U.S.C. 154(b) by 432 days.

(21) Appl. No.: 17/657,705

(22) Filed: Apr. 1, 2022

(65) Prior Publication Data

US 2022/0289479 A1 Sep. 15, 2022

Related U.S. Application Data

(63) Continuation-in-part of application No. 17/358,383, filed on Jun. 25, 2021.

(60) Provisional application No. 63/171,465, filed on Apr. 6, 2021, provisional application No. 63/170,282, filed on Apr. 2, 2021, provisional application No. 63/044,721, filed on Jun. 26, 2020.

(51) Int. Cl.
   B65G 1/04 (2006.01)
(52) U.S. Cl.
   CPC .................... *B65G 1/0492* (2013.01)
(58) Field of Classification Search
   CPC ....... B65G 1/0492; B65G 1/06; B65G 1/1373
   See application file for complete search history.

(56) References Cited

U.S. PATENT DOCUMENTS

| | | | |
|---|---|---|---|
| 5,636,966 A | 6/1997 | Lyon et al. | |
| 5,953,234 A * | 9/1999 | Singer | B65G 1/1378 700/214 |
| 8,965,559 B2 * | 2/2015 | Pankratov | B65G 57/09 700/228 |
| 10,934,091 B1 * | 3/2021 | Kalm | B65G 1/1376 |
| 11,142,398 B2 * | 10/2021 | Lert, Jr | B65G 1/0492 |
| 11,203,486 B2 * | 12/2021 | Lert, Jr | B65G 1/0435 |
| 11,332,310 B2 * | 5/2022 | Lert, Jr. | B65G 1/1378 |
| 2019/0270537 A1 | 9/2019 | Amend, Jr. et al. | |
| 2019/0375589 A1 | 12/2019 | Gravelle et al. | |
| 2019/0389671 A1 | 12/2019 | Cohen et al. | |

* cited by examiner

*Primary Examiner* — Saul Rodriguez
*Assistant Examiner* — Ashley K Romano
(74) *Attorney, Agent, or Firm* — Perman & Green, LLP

(57) ABSTRACT

A warehousing system includes a multilevel container storage array each level of which has a transport area and a storage area, a container transport vehicle located on each level to transport containers to and from container storage locations on each storage shelf on each level of the multilevel storage array to a breakpack operation station, a putwall of more than one levels of breakpack goods container stations distributed along each level with a corresponding breakpack goods transfer deck at each level of the putwall, a breakpack goods transport vehicle that transports breakpack goods along the corresponding breakpack goods transfer deck, and between corresponding breakpack goods transfer decks at different levels of the putwall, to each breakpack goods container station, and a controller effecting operation of the container transport vehicle between the container storage locations, the breakpack operation station, and a breakpack goods container located at a breakpack goods container station.

30 Claims, 51 Drawing Sheets

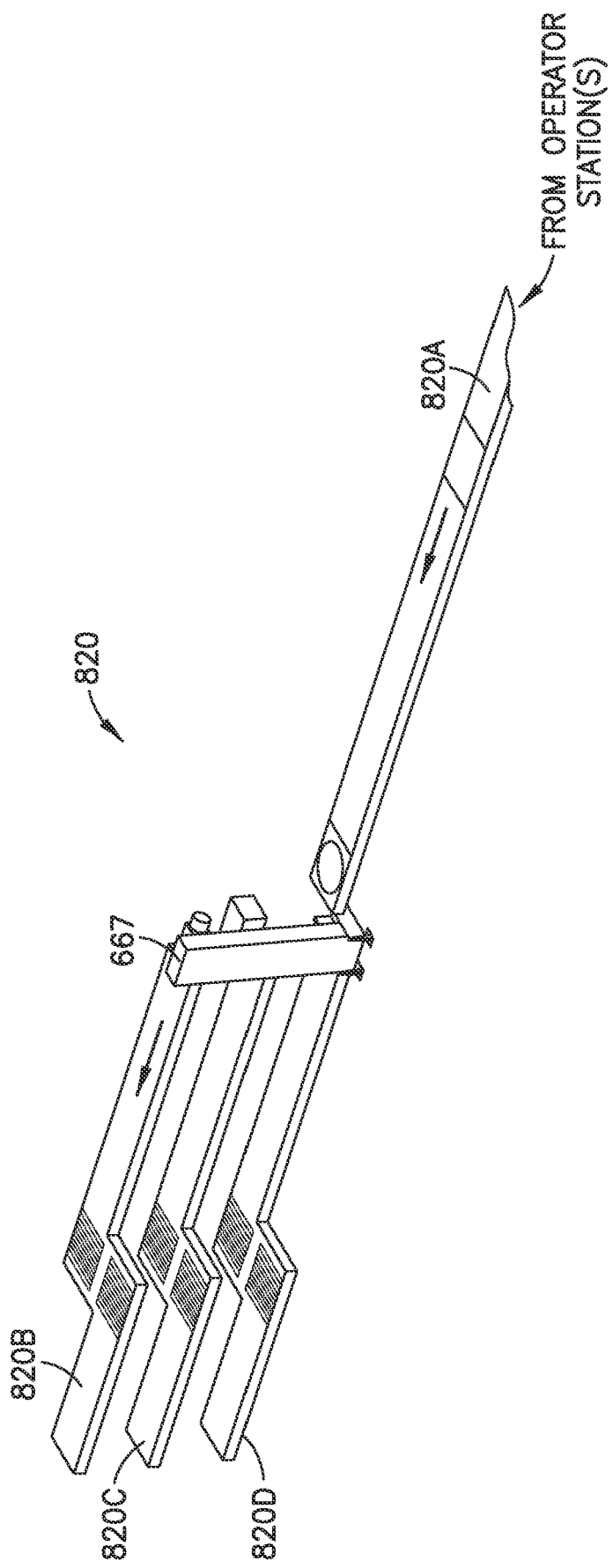

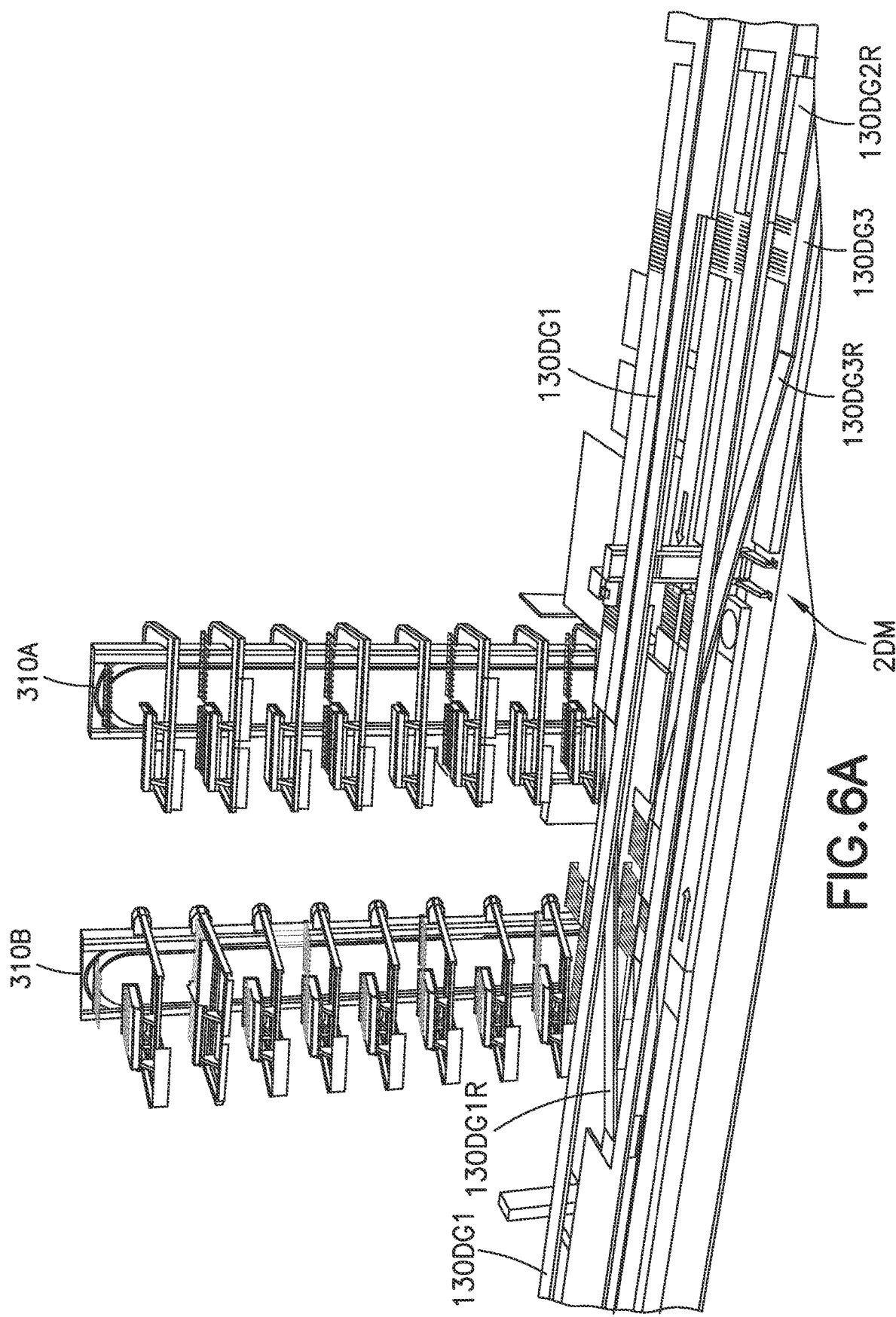

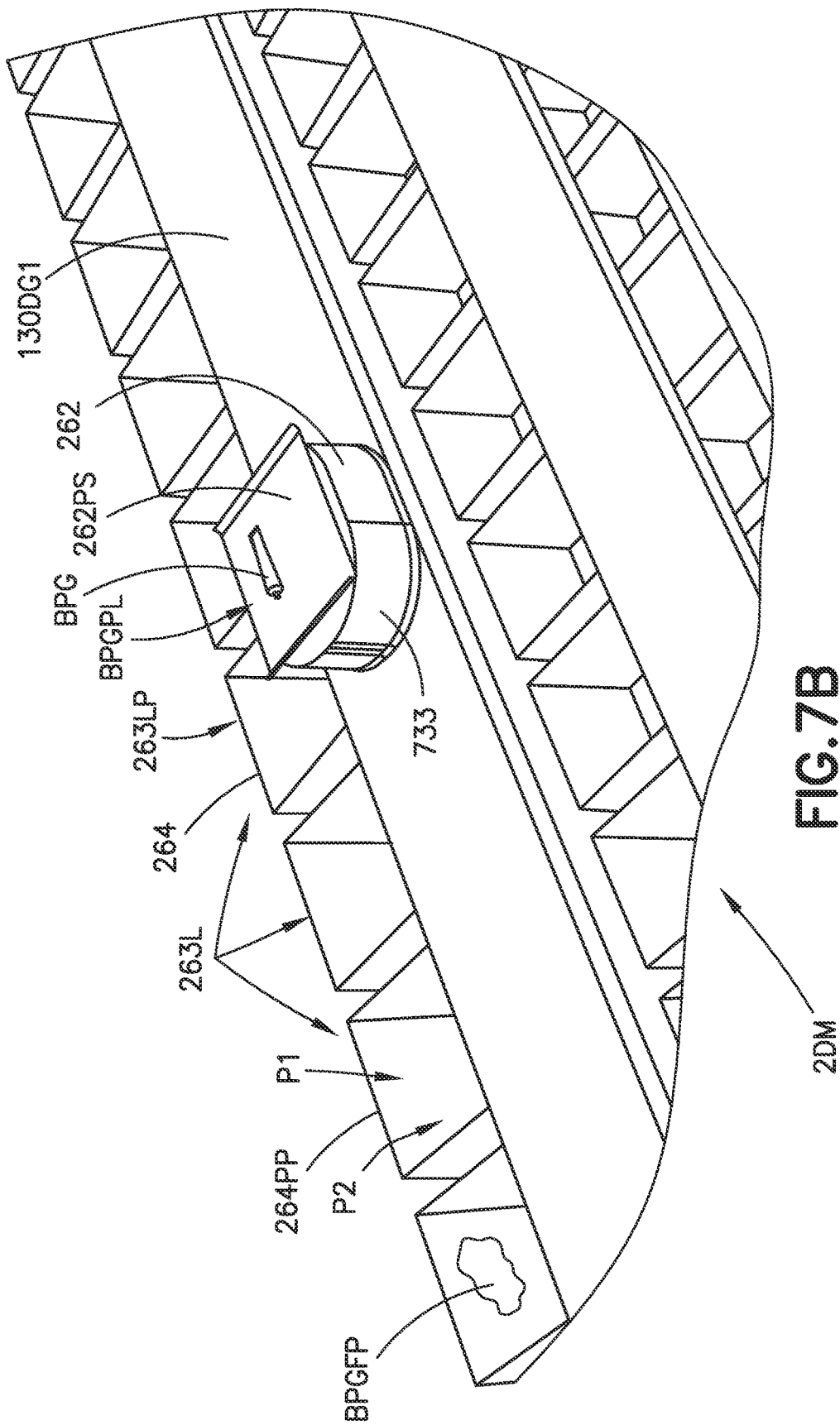

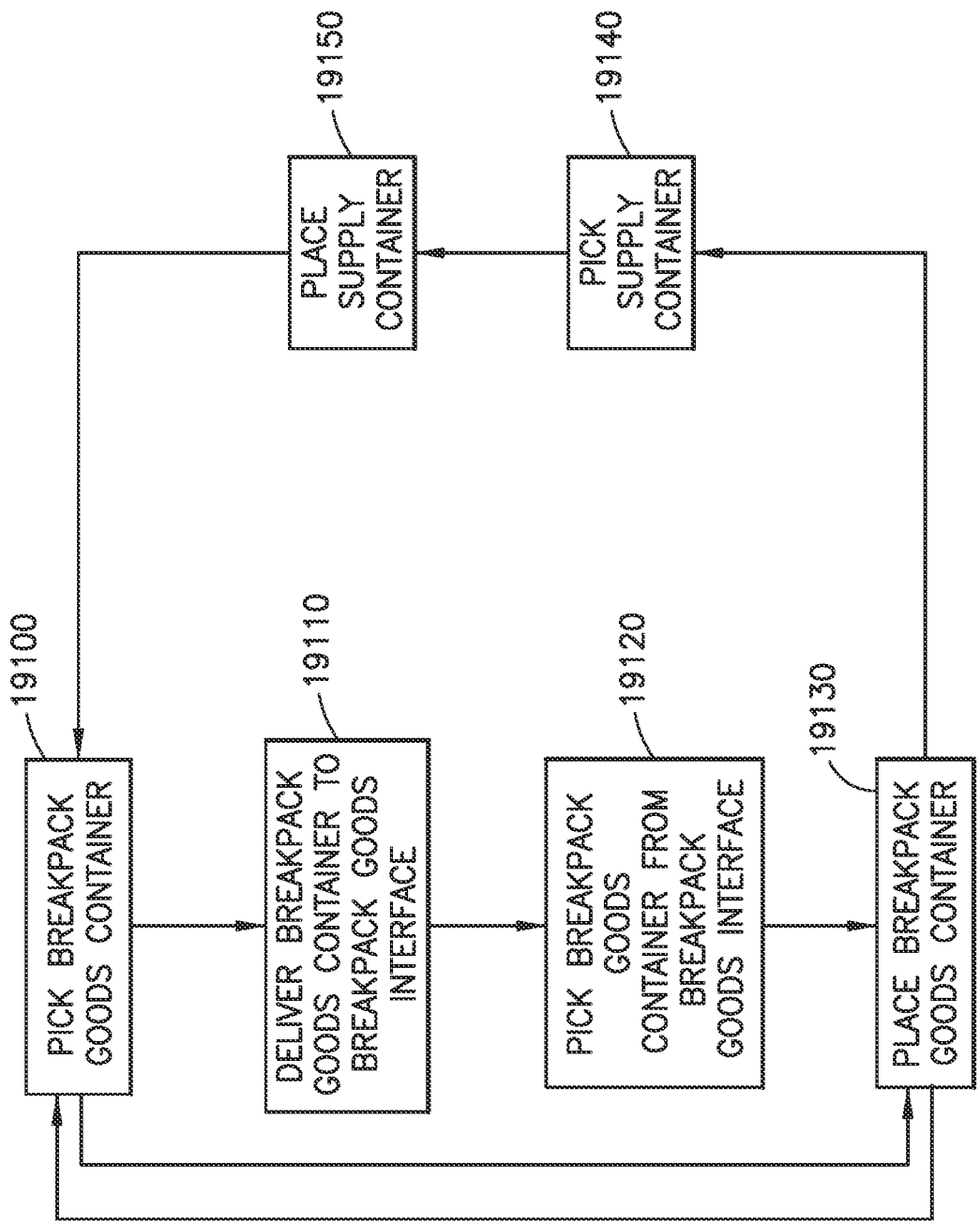

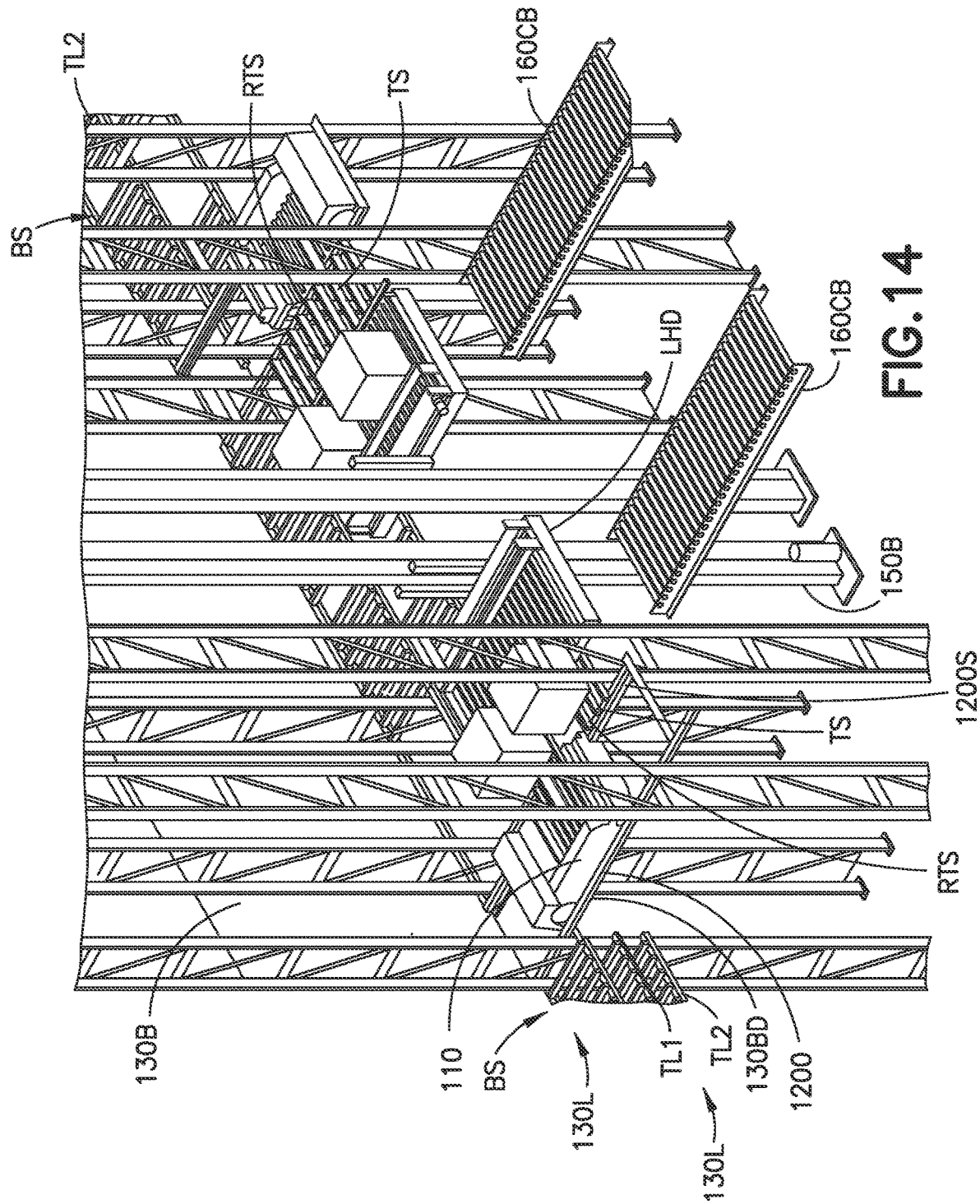

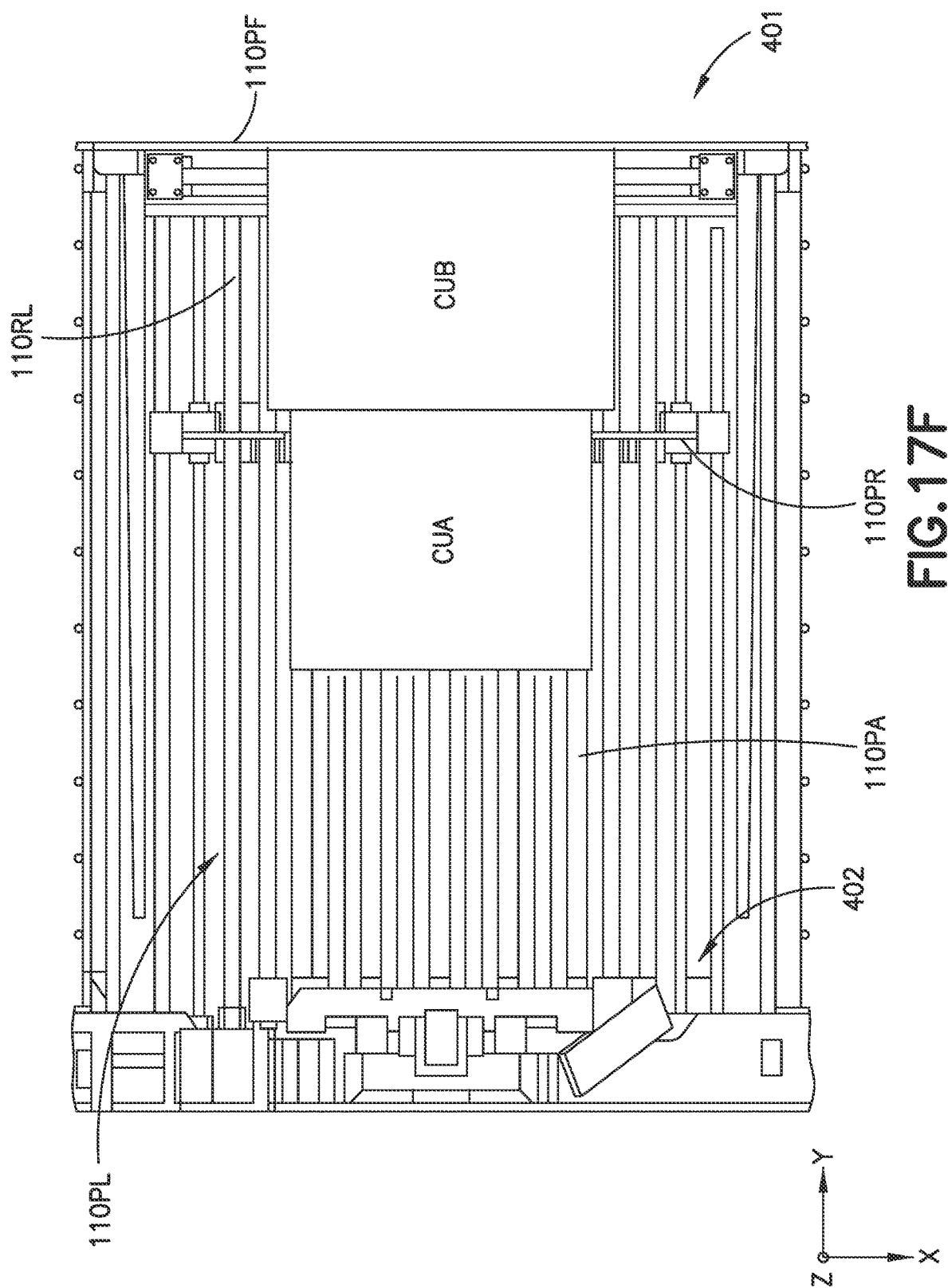

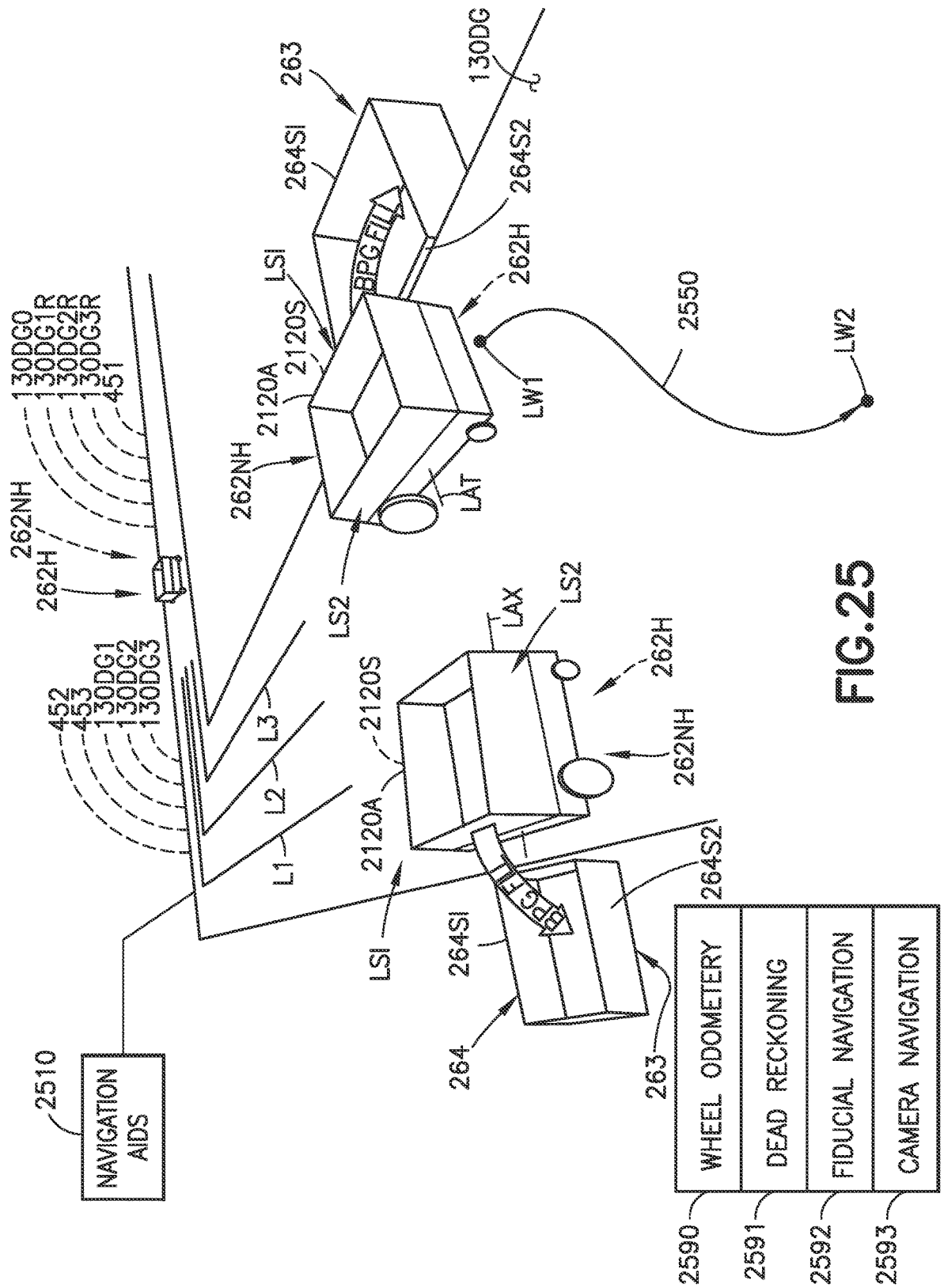

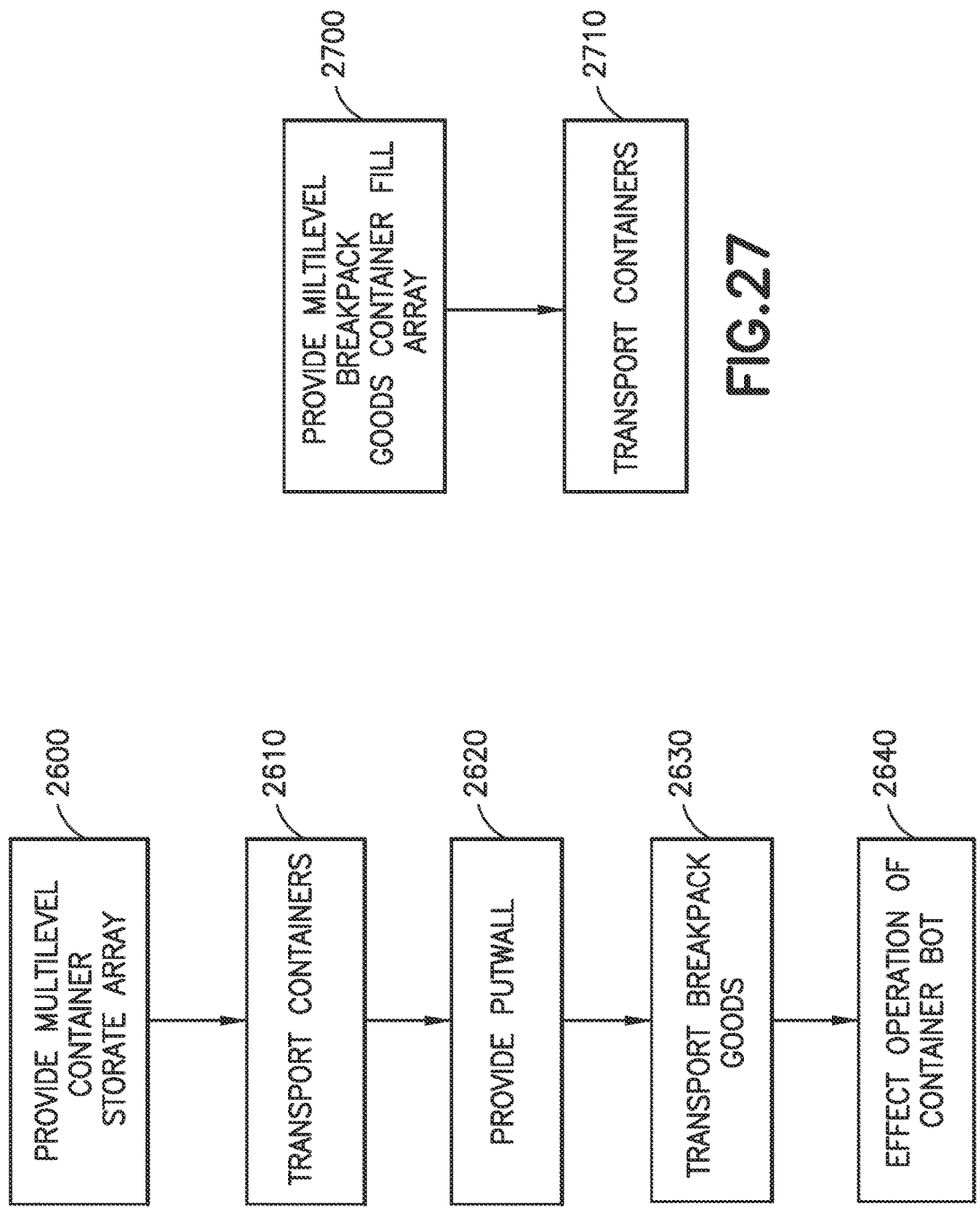

WAREHOUSING SYSTEM FOR STORING AND RETRIEVING GOODS IN CONTAINERS

CROSS-REFERENCE TO RELATED APPLICATIONS

This application is a continuation in part of U.S. patent application Ser. No. 17/358,383 filed on Jun. 25, 2021, which claims the benefit of U.S. provisional application No. 63/044,721 filed on Jun. 26, 2020, the disclosures of which are incorporated herein by reference in their entireties. This application is also a non-provisional of and claims the benefit of U.S. provisional patent application No. 63/170,282 filed on Apr. 2, 2021 and U.S. provisional patent application No. 63/171,465 filed on Apr. 6, 2021, the disclosures of which are incorporated herein by reference in their entireties.

BACKGROUND

1. Field

The disclosed embodiment generally relates to material handling systems, and more particularly, to transport and storage of items within the material handling system.

2. Brief Description of Related Developments

It is well recognized that integration of automated storage and retrieval systems into a logistic chain, particularly goods to man systems, are highly advantageous throughout efficiency and cost of the logistics chain. Conventional systems, even with a high level of automated storage and retrieval system integration in a logistic facility operate generally by storing product (e.g., supply) containers, where the supply containers include cases, packs, etc. that contain a common type of goods (also referred to as products) in the supply containers. The product containers may arrive on pallets (e.g., of common supply containers) or as truck loads, and are either depalletized or unloaded from trucks, and stored in the logistics facility, distributed throughout the storage volume (e.g., in a three-dimensional array of storage racks) of the logistic facility by the automated storage and retrieval system.

Order fulfillment from the logistic facility, particularly in the event that mixed product containers are desired (e.g., wherein any given order container may have mixed/different products or product types held by a common container such as in cases of direct to consumer fulfillment, or if indirect to consumer, such as via a retail order pick up location, the ordered mix of products in the order container is generated, at least in part, at the logistic facility prior to output from the logistic facility) conventionally, generation of mixed product containers is effected with the automated storage and retrieval system goods to person configuration by the automated storage and retrieval system outputting the product/supply containers (each containing one or more goods items of a common good type, i.e. each goods item in the product container is the same or substantially similar) from storage locations throughout the three-dimensional array of storage racks to workstations, manual or automated, to pick and remove goods from the different product/supply containers, fed by the automated storage and retrieval system to the given workstation, pursuant to a given fulfillment (or fill) order, and to place the different picked goods (mixed or common if a given order contained is so filled) into order containers. Such workstations may be referred to as breakpack stations, wherein the product container is "broken" down and its contents may be placed in order containers in whole or in part, or into what may be referred to as a breakpack storage container (e.g., totes) such as where the product container is unsuitable for continued holding of remaining product items after the breakpack operation, and such remaining products (i.e., the remainder of products in the "broken" down product container) should be returned to storage in the three-dimensional array of storage racks by the automated storage and retrieval system. In order to increase efficiency, order containers may also be entered into the three-dimensional array of storage racks, and potentially to storage locations on the storage racks storing product containers, until such time as order output is desired, both entry and output from the three-dimensional array of storage racks is otherwise effected by the automated storage and retrieval system.

Conventionally, breakpack stations have been arranged on a single common level (e.g., ground level or a level common or proximate with the logistic facility fill load exits) to effect output of order containers, filling an order, from the breakpack station to exit, or otherwise have been distributed at different levels around or within the three-dimensional array of storage racks to effect transfer by the automated storage and retrieval system of product containers between storage locations and the breakpack station, and enter/re-enter of order containers and breakpack storage containers (collectively referred to herein as breakpack goods containers) from the breakpack station to storage locations with the automated storage and retrieval system. An example of a conventional system and method of order fulfillment by preparing storage units at a pick station is disclosed in U.S. Pat. No. 9,988,212 issued on Jun. 5, 2018. U.S. Pat. No. 9,988,212 describes a method of order fulfilling by making order and/or product units available from a storage facility in a desired sequence at a picking station. The storage facility may include a plurality of multilevel storage racks in which order and/or product units are stored, an automatic storage and retrieval device, such as a shuttle, which retrieves and stores orders and/or products units, and lifts used to transfer the order and/or products units to at least one storage-exit conveyor, wherein each lift is directly connected to a picking station in a picking level by a storage-entry conveyor and the storage-exit conveyor. Conventional system, such as the one described above, are constrained, to a limited exchange interface (defined substantially by the footprint of the breakpack station) between supply containers and breakpack goods containers. This limits throughput through the pick station to that performed in the space immediate to the breakpack operator. An improved system is desired.

BRIEF DESCRIPTION OF THE DRAWINGS

The foregoing aspects and other features of the disclosed embodiment are explained in the following description, taken in connection with the accompanying drawings, wherein:

FIGS. 5A, 5B, and 5C are schematic perspective illustrations of portions of the breakpack goods module of FIG. 2 in accordance with aspects of the disclosed embodiment;

FIGS. 6A, 6B, 6C, 6D, and 6E are schematic perspective illustrations of portions of the breakpack goods module of FIG. 2 in accordance with aspects of the disclosed embodiment;

FIGS. 7A, 7B, 7C, and 7D are schematic perspective illustrations of portions of the breakpack goods module of FIG. 2 in accordance with aspects of the disclosed embodiment;

FIG. 9B is an exemplary flow diagram of a breakpack operation method in accordance with aspects of the disclosed embodiment;

FIG. 14 is a schematic illustrations of a portion of the storage and retrieval system of FIGS. 1A, 1B, 1C, and 1E in accordance with aspects of the disclosed embodiment;

FIGS. 17A-17F are schematic illustrations of portions of the transport vehicle of FIGS. 13A, 13B in accordance with aspects of the disclosed embodiment;

FIG. 25 is a schematic illustration of an exemplary portion of a goods deck in accordance with aspects of the disclosed embodiment;

FIG. 26 is an exemplary flow diagram in accordance with aspects of the disclosed embodiment; and FIG. 27 is an exemplary flow diagram in accordance with aspects of the disclosed embodiment.

DETAILED DESCRIPTION

Figure 1A:
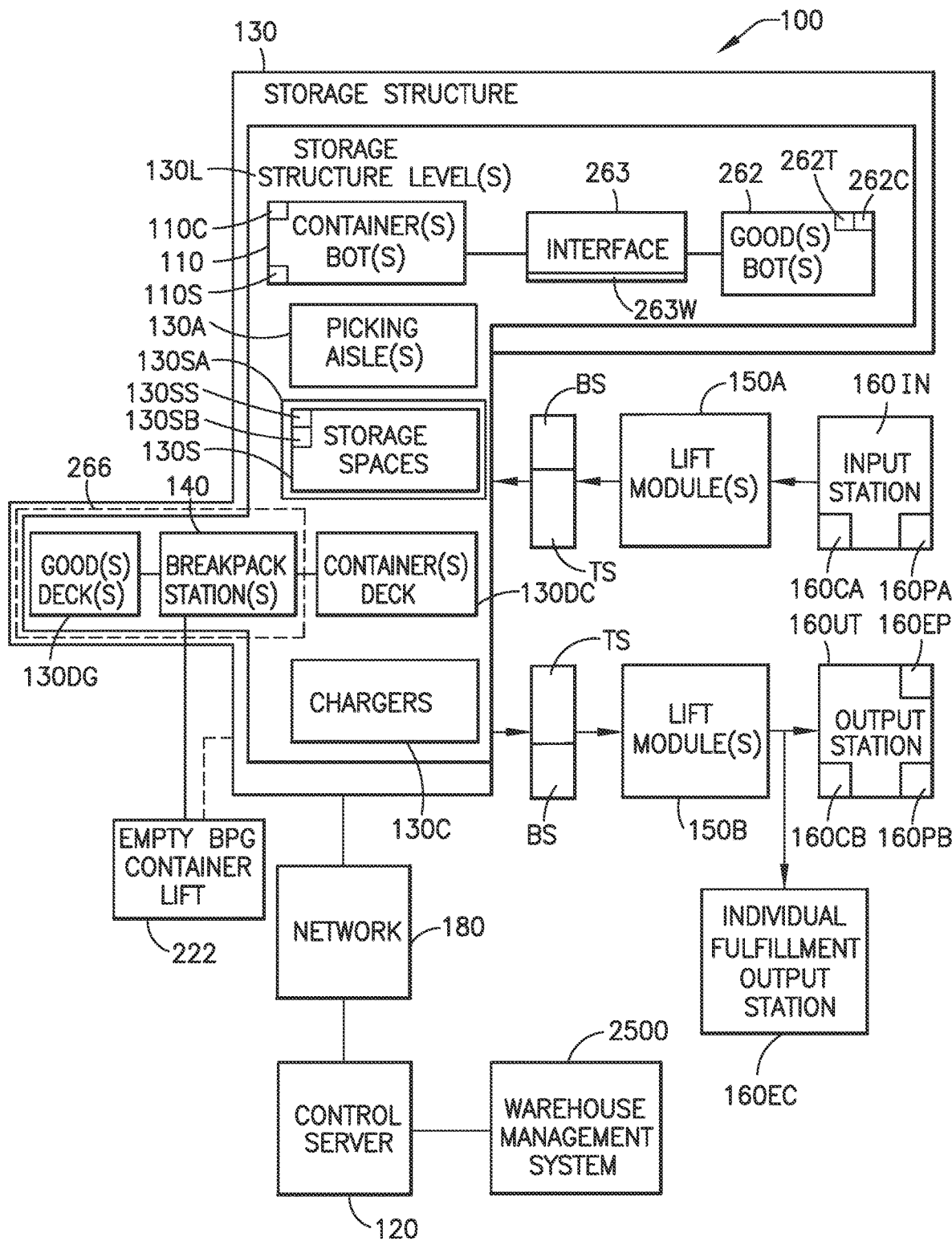
FIGS. 1A, 1B, and 1C are schematic illustrations of an automated storage and retrieval system in accordance with aspects of the disclosed embodiment.

FIG. 1A is a schematic illustration of an automated storage and retrieval system (also referred to herein as a warehousing system) 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

As described herein, the aspects of the disclosed embodiment provide an automated storage and retrieval system 100 that includes at least one breakpack module 266 (also referred to herein as an automated order fulfillment system). The at least one breakpack module 266 includes autonomous goods bots 262 that traverse multiple (stacked, vertically distributed, or offset) levels of the breakpack station for completing a goods bot task (e.g., multiple levels 130DG1-130DG3 and/or 130DGL of the breakpack module 266 are traversed by the goods bot 262 to effect picking of breakpack goods BPG from an operator station 801-804, placement of breakpack goods BPG in a breakpack goods container 264 at a putwall 263W (also referred to herein as a multilevel breakpack goods container fill array) (e.g., in multiple vertical arrayed levels of container goods), and return of the goods bot 262 to the operator station 801-804). The placement of goods on multiple vertical levels from a common or more than one common operator (breakpack) station 801-804 effects an increase in throughput of goods placement to a container at a predetermined/desired time and in a predetermined sequence of placement, if desired, regardless of blockage to one or more breakpack goods containers 264 (e.g., increasing the number of places the containers are available). Each breakpack module 266 has a separate/independent flow or stream of containers into, through, and out of the breakpack module 266. The container bots 110 and/or goods bots 262 may be operated by a suitable controller (such as controller 120) so that the flow of containers within the automated storage and retrieval system 100 is balanced between, for example, the different putwall 236W of the different breakpack modules 266 (e.g. to eliminate any container transfer bottlenecks, provide for substantially the same output rates from each (or two or more) breakpack modules 266, or any other suitable balancing of container transfer). As described herein the breakpack modules 266 may span several levels 130L of the storage structure 130 such that the container bots 110 and/or goods bots 262 may be operated by a suitable controller (such as controller 120) so that the flow of containers within the automated storage and retrieval system 100 is balanced across the storage levels 130L (e.g., to eliminate any container transfer bottlenecks, provide for substantially the same output rates from each (or two or more) breakpack modules 266, provide for substantially the same output rates from each (or two or more) storage levels 130L, or any other suitable balancing of container transfer).

The operation of the goods bots 262 is an autonomous operation under control of any suitable controller, such as controller 120, where the tasks performed by a goods bot 262 can be reassigned on the fly (as described herein) at any time during any given goods bot tasks. The controller 120 is also configured to effect, with the goods bots 262 a sequencing of breakpack goods BPG (as described herein) to one or more breakpack goods containers 264 so that placement of the breakpack goods BPG in the one or more breakpack containers 264 occurs in any suitable predetermined sequence or sortation/sequencing echelon as described herein (other examples of sortation echelons that may be employed in conjunction with those described herein are described in U.S. provisional patent application No. 63/044,721 filed on Jun. 26, 2020 and U.S. non-provisional patent application Ser. No. 17/358,383 filed on Jun. 25, 2021 both being titled "Warehousing System for Storing and Retrieving Goods In Containers," the disclosures of which are incorporated herein by reference in their entireties). The aspects of the disclosed embodiment also provide for closing/restricting goods bot 262 access to one or more portions of the breakpack module 266 to effect, for example, human access to the closed portion of the breakpack module 266.

In accordance with aspects of the disclosed embodiment the automated storage and retrieval system 100 may operate in a retail distribution center or warehouse to, for example, fulfill orders received from different customers (such as those described herein) for breakpack goods BPG and/or case units such as those described in U.S. Pat. No. 10,822,168 issued on Nov. 3, 2020, the disclosure of which is incorporated by reference herein in its entirety.

As an example, the case units are cases or units of goods not stored in trays, on totes or on pallets (e.g. uncontained). In other examples, the case units are cases or units of goods that are contained in any suitable manner such as in trays, on totes, in containers (such as containers of remainder goods after breakpack where the broken down case unit structure is unsuitable for transport of the remainder goods as a unit) or on pallets. In still other examples, the case units are a combination of uncontained and contained items. It is noted that the case units, for example, include cased units of goods (e.g. case of soup cans, boxes of cereal, etc.) or individual goods that are adapted to be taken off of or placed on a pallet. In accordance with the aspects of the disclosed embodiment, shipping cases for case units (e.g. cartons, barrels, boxes, crates, jugs, or any other suitable device for holding case units) may have variable sizes and may be used to hold case units in shipping and may be configured so they are capable of being palletized for shipping.

It is noted that when, for example, bundles or pallets of case units arrive at the storage and retrieval system 100 the content of each pallet may be uniform (e.g. each pallet holds a predetermined number of the same item—one pallet holds soup and another pallet holds cereal) and as pallets leave the storage and retrieval system the pallets may contain any suitable number and combination of different case units (e.g. a mixed pallet where each mixed pallet holds different types of case units—a pallet holds a combination of soup and cereal) that are provided to, for example the palletizer in a sorted arrangement (e.g., effected by at least a pallet output sort 185 echelon of the automated storage and retrieval system 100 where at least one or more of the container bots 110 and lift modules 150B transport the case units for sortation) for forming the mixed pallet. In the aspects of the disclosed embodiment the storage and retrieval system 100 described herein may be applied to any environment in which case units are stored and retrieved.

In accordance with the aspects of the disclosed embodiment, the automated storage and retrieval system 100 includes one or more breakpack modules 266 (see FIG. 2) configured to break down product containers or case units (which may generally be referred to as supply goods containers or supply containers 265) into breakpack goods containers 264 for order fulfillment as will be described further herein. One or more breakpack modules 266 may be communicably coupled to one or more stacked (storage) levels 130L of the automated storage and retrieval system 100, where the one or more levels 130L of the automated storage and retrieval system 100 include at least one breakpack module 266. The breakpack module(s) 266 may be plug and play modules that may be coupled to any suitable portion of the structure of the automated storage and retrieval system 100. For example, the breakpack module(s) may be coupled to a container transfer deck 130DC (see also container transfer deck 130DC2 in FIG. 1B) or picking (or pick) aisle(s) 130A of the automated storage and retrieval system 100 as will be described in greater detail below. The breakpack module(s) 266 may be disposed on any suitable number of stacked storage levels of the automated storage and retrieval system 100.

Here, the automated storage and retrieval system 100 may be configured, such as through any suitable controller (e.g., control server 120) so that the automated storage and retrieval system 100 has selectable modes of operation. In one mode of operation the automated storage and retrieval system 100 is configured to output product cases, containers, and/or case units to a palletizer. In another mode of operation, such as with the breakpack module(s) 266 employed, the automated storage and retrieval system 100 is configured to break down product cases, product containers, and/or case units and output breakpack goods containers, product cases, containers, and/or case units to a palletizer, or in other aspects, re-enter the breakpack (order) container(s) and/or a remainder of a product cases, containers, and/or case units to a palletizer (e.g., after being broken down) into storage for later retrieval.

The controller 120, as may be realized, is configured to effect the operations of the automated storage and retrieval system 100 described herein. For example, the controller 120 is configured to effect operations of at least one container bot or autonomous guided container transport vehicle 110 (see also FIG. 5A) and at least one goods bot or autonomous guided breakpack goods transport vehicle 262 (see also, e.g., FIG. 6B), as well as any lifts 310A, 310B, 310A', 310B' and other components of the automated storage and retrieval system 100 described herein, for assembling orders of breakpack goods BPG from supply containers 265 (see FIG. 5A) into breakpack goods containers 264

Figure 7A:
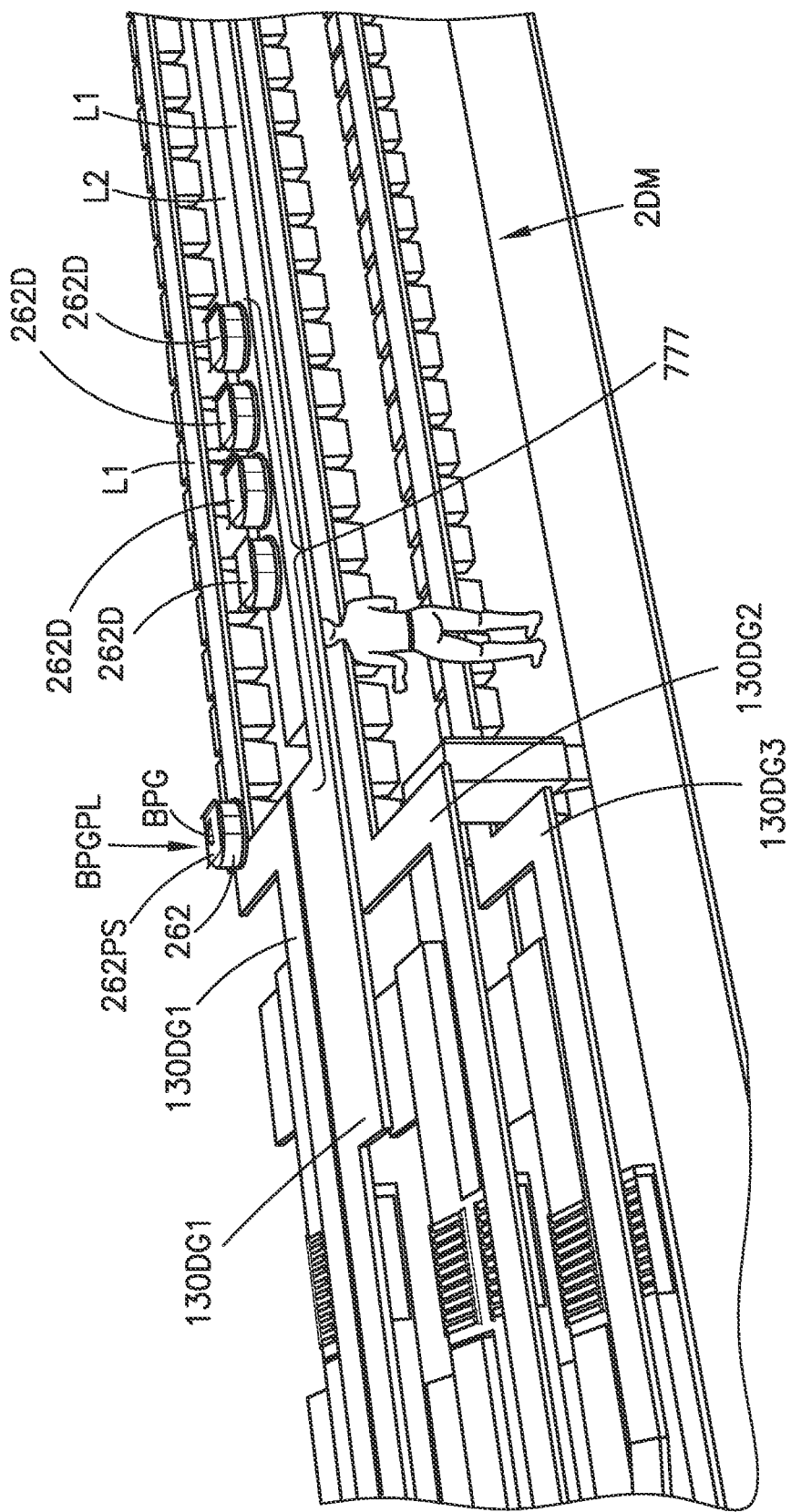

(see FIG. 3A) and outfeed of breakpack goods containers 264 through container outfeed stations TS as will be described herein. For example, the controller 120 is configured to effect operation of the container bot(s) 110 between the container storage locations 130S, the breakpack operation station 140, and a breakpack goods container 264 located along a breakpack goods transfer deck or goods deck 130DG (e.g., a breakpack goods container 64 located at a breakpack goods interface station/container station 263L of a putwall 263W as described herein). As another example, the controller 120 is configured to effect operation of the goods bot(s) 262 so that transport of the breakpack goods BPG (see FIG. 7B), by the goods bot 262 traverse on the goods transfer deck 130DG, sorts (e.g., in a breakpack order sort 188 echelon of the automated storage and retrieval system 100, as described herein) the breakpack goods BPG to corresponding breakpack goods containers 264. As a further example, the controller 120 is configured to effect operation of the container bot(s) 110 so that the container bot(s) 110 accesses, from the putwall 263W, corresponding breakpack goods containers 264 at the goods transfer deck 130DG and transports the breakpack goods containers 264 via traverse along the container transfer deck 130DC to at least one of a container output/transfer station TS and a corresponding container storage location 130SB of storage shelves of a corresponding level 130L of the multilevel storage array (e.g., to effect at least in part a breakpack output sort 189 echelon as described herein).

The controller 120 is also configured to effect operation of the container bot(s) 110 and lifts 150 (e.g., to form a container supply system) so as to introduce empty breakpack goods containers 264 into the automated storage and retrieval system so that the container bot(s) 110 transport the empty breakpack goods containers 264, along the transport/travel loops 233BP of the container transfer deck(s) 130DC and into a breakpack module for placement at a breakpack goods interface location(s) 263L of a breakpack goods interface 263 for transfer of breakpack goods BPG into the breakpack goods containers 264 in a manner similar to that described in U.S. provisional patent application No. 63/044,721 filed on Jun. 26, 2020 and U.S. non-provisional patent application Ser. No. 17/358,383 filed on Jun. 25, 2021 both being titled "Warehousing System for Storing and Retrieving Goods In Containers," the disclosures of which were incorporated herein by reference in their entireties. It is noted that the breakpack goods interface 263 may be substantially similar to one or more of the transfer stations TS and buffer stations BS described herein and include an undeterministic surface (similar to that of the rack storage spaces 130S described herein) upon which breakpack goods containers 264 are placed so as to form an undeterministic interface between a goods transfer deck 130DG and the container transfer deck 130DC (e.g., or otherwise a container bot travel surface(s) 266RS that forms part of or is communicably coupled to the container transfer deck 130DC). In other aspects, empty breakpack goods containers 264 may be transferred to (in a manner similar to that noted above with the lifts and container bots) and stored in the storage spaces 130SB, 130S (FIG. 1B) of the rack modules RM or buffered at an infeed station, where the controller 120 is configured to effect transfer of the empty breakpack goods containers 264 from the storage spaces 130SB, 130S or buffer location to the breakpack goods interface 263 in a manner similar to that described above.

In one or more aspects, the controller 120 is configured to effect operation of the container bot(s) 110 and lifts 150 (e.g., forming a container supply system) so as to introduce empty supply containers 265 or standardized containers (as described herein) into the automated storage and retrieval system (in a manner similar to that described in U.S. provisional patent application No. 63/044,721 filed on Jun. 26, 2020 and U.S. non-provisional patent application Ser. No. 17/358,383 filed on Jun. 25, 2021 both being titled "Warehousing System for Storing and Retrieving Goods In Containers," the disclosures of which were previously incorporated herein by reference in their entireties) so that the container bot(s) 110 transport the empty supply containers 265 or standardized containers 265S, along the transport/travel loops 233, 233A of the container transfer deck(s) 130DC and to the breakpack operation station 140 of a breakpack.

As may be realized, the container bots 110, goods bots 262, lift modules 150, breakpack modules 266, and other suitable features of the storage and retrieval system 100 described herein are controlled in any suitable manner such as by, for example, one or more central system control computers (e.g. control server) 120 through, for example, any suitable network 180 to effect the operations described herein. In one aspect the network 180 is a wired network, a wireless network or a combination of wireless and wired networks using any suitable type and/or number of communication protocols. In one aspect, the control server 120 includes a collection of substantially concurrently running programs (e.g. non-transitory computer program code/system management software) for substantially automatic control of the automated storage and retrieval system 100 as described herein. The collection of substantially concurrently running programs, for example, being configured to manage the storage and retrieval system 100 including, for exemplary purposes only, controlling, scheduling, and monitoring the activities of all active system components, managing inventory (e.g. which case units are input and removed, the order in which the cases are removed and where the case units are stored) and pickfaces (e.g. one or more case units that are movable as a unit and handled as a unit by components of the storage and retrieval system), and interfacing with a warehouse management system 2500. The control server 120 may, in one aspect, be configured to control the features of the storage and retrieval system in the manner described herein.

Figure 1B:
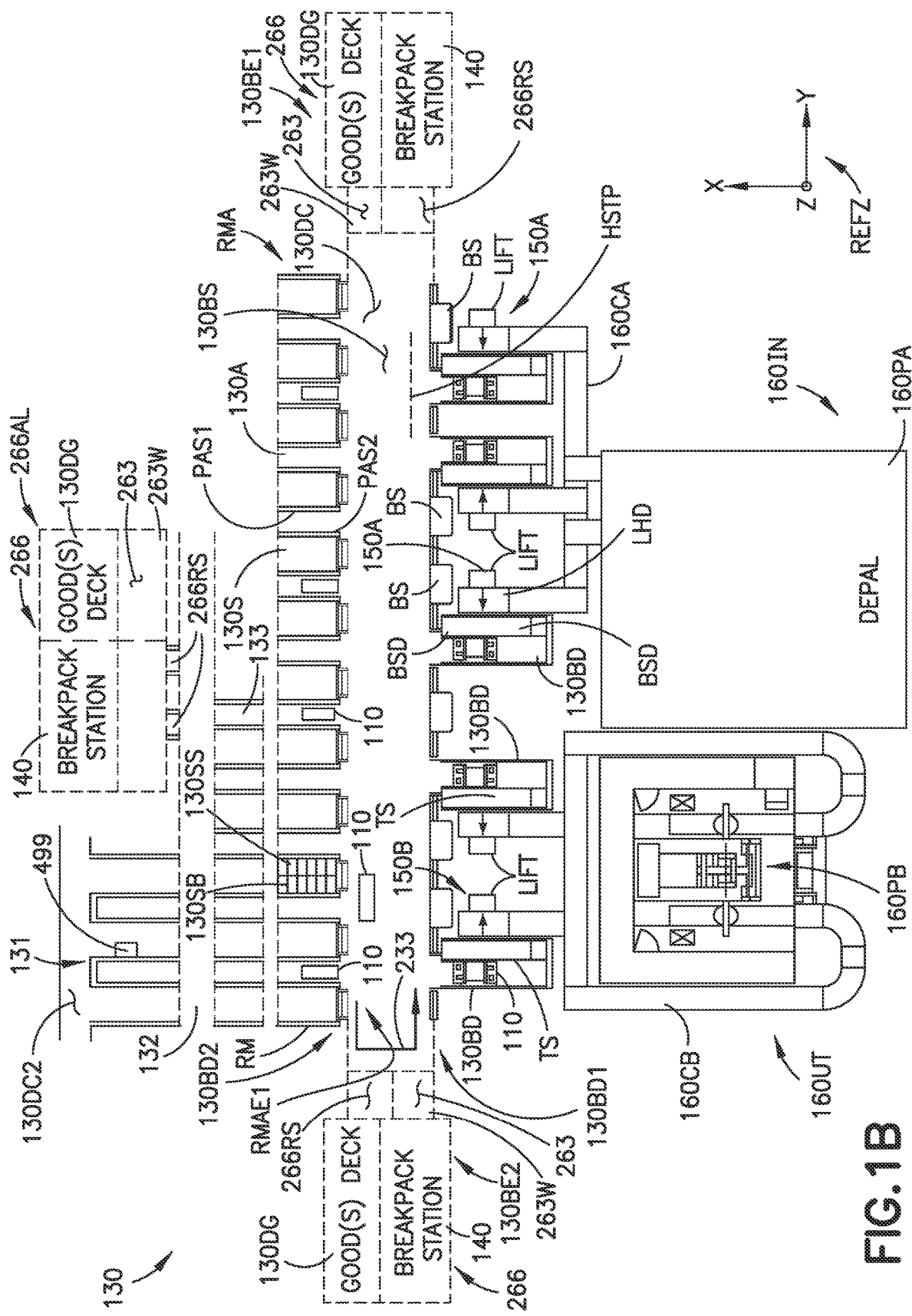
Figure 1C:
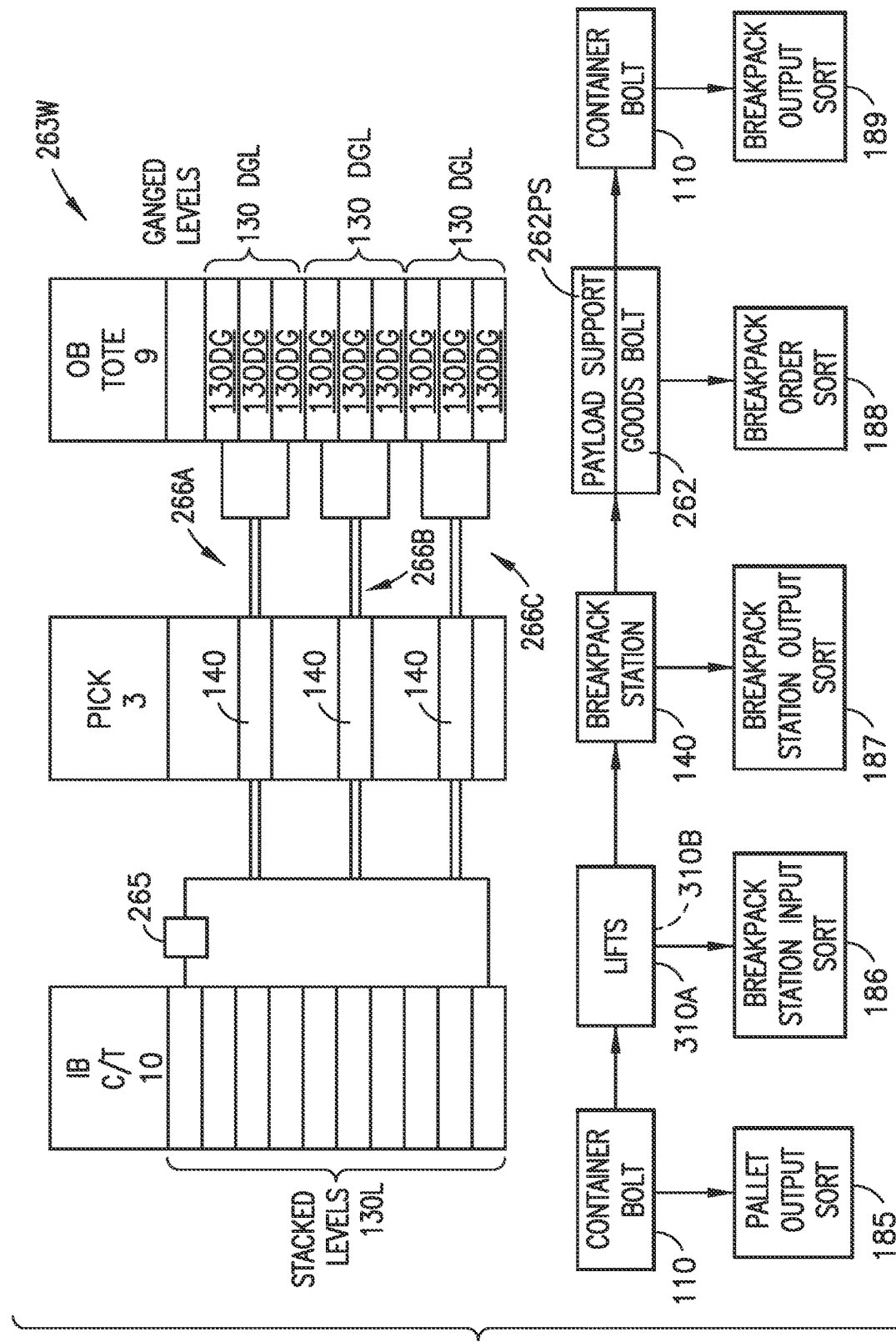
Figure 1D:
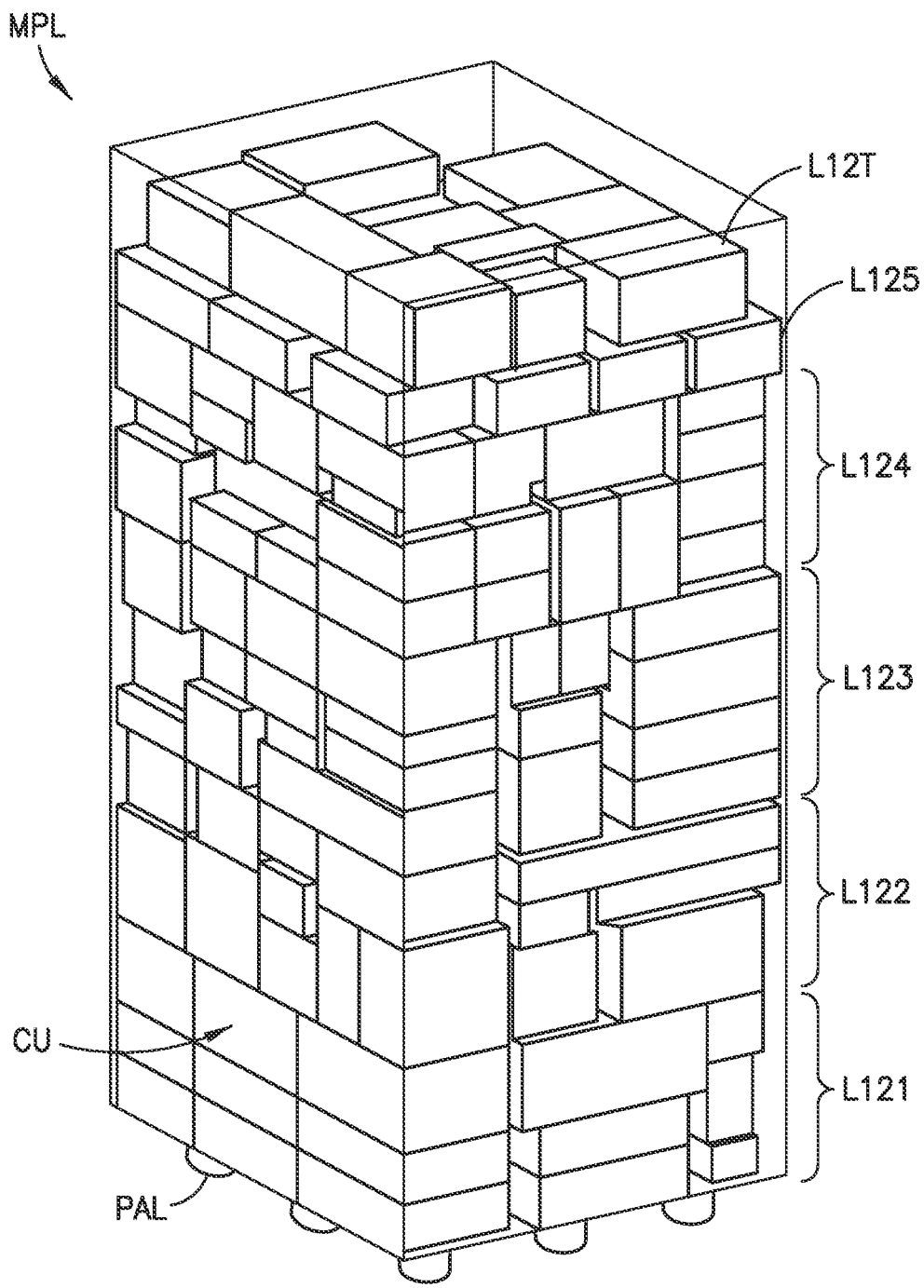
FIG. 1D is a schematic illustration of a mixed pallet load formed by the automated storage and retrieval system in accordance with aspects of the disclosed embodiment.

Also referring to FIG. 1D, it is noted that when, for example, incoming bundles or pallets (e.g. from manufacturers or suppliers of case units arrive at the storage and retrieval system for replenishment of the automated storage and retrieval system 100, the content of each pallet may be uniform (e.g. each pallet holds a predetermined number of the same item—one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). As pallets PAL leave the storage and retrieval system 100, with cases filling replenishment orders, the pallets PAL may contain any suitable number and combination of different case units CU (e.g. each pallet may hold different types of case units—a pallet holds a combination of canned soup, cereal, beverage packs, cosmetics and household cleaners). The cases combined onto a single pallet may have different dimensions and/or different SKU's. In one aspect of the disclosed embodiment, the storage and retrieval system 100 may be configured to generally include an in-feed section, a storage and sortation section (where, in one aspect, storage of items is optional and sortation is effected with one or more of different orthogonal sortations as described herein) and an output section (e.g., that also may provide sortation effected with one or more of different orthogonal sortations as described herein) as will be described in greater detail below. As may be realized, in one aspect of the disclosed embodiment the system 100 operating for example as a retail distribution center may serve to receive uniform pallet loads of cases, breakdown the pallet goods or disassociate the cases from the uniform pallet loads into independent case units handled individually by the system, retrieve and sort the different cases sought by each order into corresponding groups, and transport and assemble the corresponding groups of cases into what may be referred to as mixed case pallet loads MPL. As may also be realized in one aspect of the disclosed embodiment the system 100 operating for example as a retail distribution center may serve to receive uniform pallet loads of cases, breakdown the pallet goods or disassociate the cases from the uniform pallet loads into independent case units handled individually by the system, retrieve and sort the different cases sought by each order into corresponding groups, and transport and sequence the corresponding groups of cases in the manner described in U.S. Pat. No. 9,856,083 issued on Jan. 2, 2018 and having application Ser. No. 14/997,920, the disclosure of which is incorporated herein by reference in its entirety.

The automated storage and retrieval system 100 is configured as described in U.S. provisional patent application No. 63/044,721 filed on Jun. 26, 2020 and U.S. non-provisional patent application Ser. No. 17/358,383 filed on Jun. 25, 2021 both being titled "Warehousing System for Storing and Retrieving Goods In Containers," the disclosures of which were previously incorporated herein by reference in their entireties, to assemble an appropriate group of ordered cases, that may be different in SKU, dimensions, etc. into mixed case pallet loads (that include one or more of case units and/or breakpack containers 264) and/or breakpack containers 264. For example, where a mixed case pallet load is assembled, an output section of the automated storage and retrieval system 100 generates the pallet load in what may be referred to as a structured architecture of mixed case stacks. The structured architecture of the pallet load described herein is representative and in other aspects the pallet load may have any other suitable configuration. For example, the structured architecture may be any suitable predetermined configuration such as a truck bay load or other suitable container or load container envelope holding a structural load. The structured architecture of the pallet load may be characterized as having several flat case layers L121-L125, L12T as described in U.S. Pat. No. 9,856,083, previously incorporated by reference herein in its entirety. As a further example, the breakpack containers 264 may be assembled and output by the output section of the automated storage and retrieval system 100 for individual shipment to a customer or shipment with other breakpack containers 264 to one or more customers.

Figure 1E:
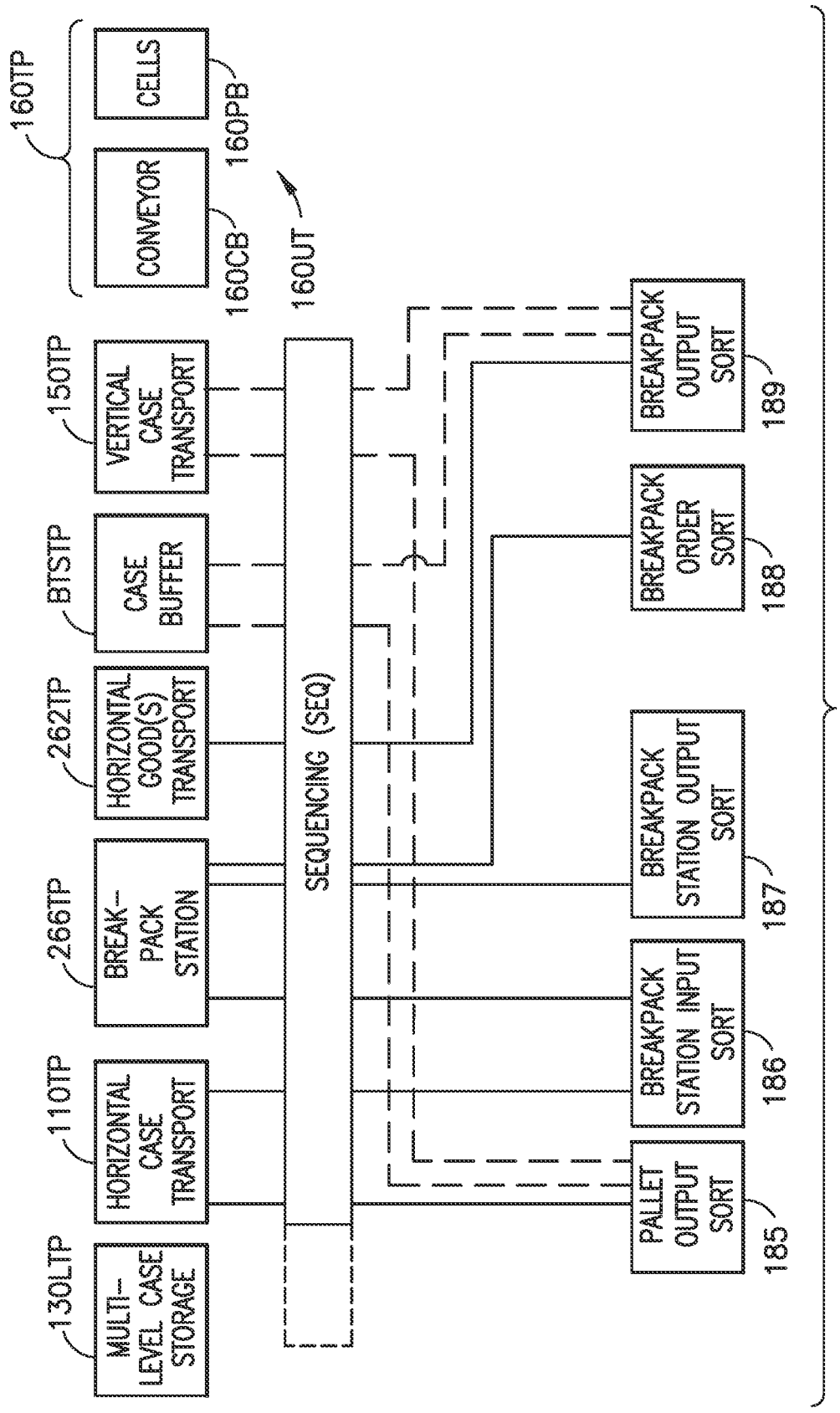
FIG. 1E is a schematic illustration of an automated storage and retrieval system in accordance with aspects of the disclosed embodiment.

Referring to FIGS. 1C and 1E, as will be described in greater detail herein, to effect assembling one or more of the mixed pallet load, individual breakpack containers 264, and grouped breakpack containers 264, the controller 120 may operate the container bots 110, goods bots 262, lift modules 150, breakpack modules 266, and other suitable features of the storage and retrieval system 100 so that different orthogonal (i.e., separate and distinct/independent) sortation echelons are effected. For example, the case bots 110 may effect a pallet out sort 185 echelon where case units are retrieved from storage and output for inclusion in a mixed pallet load. One or more of the case bots 110 and breakpack module lifts 310A, 310B may also effect (orthogonal to/independent of the pallet output sort 185) a breakpack station input sort 186 echelon where supply containers 265 are provided to a breakpack module 266 in a predetermined sequence. Each breakpack operation station 140 of a breakpack module 266 may also effect an orthogonal sortation (e.g., breakpack station output sort 187 echelon) of breakpack goods BPG to the goods bots 262, where the goods bots 262 are configured to effect another orthogonal sortation (e.g., breakpack order sort 188 echelon) of the breakpack goods PGB to the breakpack containers 264 at the putwall 263W. The case bots 110 pick the breakpack containers 264 from the putwall 263W and provide a breakpack output sort 189 echelon (that is orthogonal to sortations 185-188) to the output section of the automated storage and retrieval system 100.

In accordance with aspects of the disclosed embodiment, referring again to FIG. 1A, the automated storage and retrieval system 100 includes input stations 160IN (which include depalletizers 160PA and/or conveyors 160CA for transporting items (e.g., inbound supply containers) to lift modules 150A for entry into a storage level 130L of the storage structure or multilevel container storage array 130) and output stations 160UT, 160EC (which include palletizers 160PB, operator stations 160EP and/or conveyors 160CB for transporting items (e.g., outbound supply containers and filled breakpack goods (order) containers) from lift modules 150B for removal from storage (e.g., to a palletizer (for palletizer load) or to a truck (for truck load)). Here the output station 160EC is an individual fulfillment (or e-commerce) output station where, for example, filled breakpack goods (order) containers including single goods items and/or small bunches of goods are transported for fulfilling an individual fulfillment order (such as an order placed over the Internet by a consumer). The output station 160UT is a commercial output station where large numbers of goods are generally provided on pallets for fulfilling orders from commercial entities (e.g., commercial stores, warehouse clubs, restaurants, distribution centers (e.g., where goods, such as the breakpack goods, case units, pickfaces, etc. are held for shipment to individual customers), etc.). As may be realized, the automated storage and retrieval system 100 includes both the commercial output station 160UT and the individual fulfillment output station 160EC; while in other aspects, the automated storage and retrieval system includes one or more of the commercial output station 160UT and the individual fulfillment output station 160EC.

The automated storage and retrieval system 100 also includes input and output vertical lift modules 150A, 150B (generally referred to as lift modules 150—it is noted that while input and output lift modules are shown, a single lift module may be used to both input and remove case units from the storage structure), a storage structure 130 (which may have at least one elevated storage level and in some aspects forms a multilevel storage array), and at least one autonomous guided container transport vehicle or container bot 110 which may be confined to a respective storage level of the storage structure 130 and are distinct from a transfer deck 130DC (also referred to herein as a transport area) on (or in) which they travel. It is noted that the depalletizers 160PA may be configured to remove case units from pallets so that the input station 160IN can transport the items to the lift modules 150 for input into the storage structure 130. The palletizers 160PB may be configured to place items removed from the storage structure 130 on pallets PAL (FIG. 1E) for shipping. As used herein the lift modules 150, storage structure 130, breakpack modules 266, goods bots 262, and container bots 110 may be collectively referred to herein as the multilevel automated storage system (e.g. storage and sorting section) noted above so as to define (e.g. relative to e.g. a container bot 110 frame of reference REF—FIG. 6D—or any other suitable storage and retrieval system frame of reference) transport/throughput axes (in e.g. three dimensions) that serve the three dimensional multilevel automated storage system where each throughput axis has an integral "on the fly sortation" (e.g. sortation of case units during transport of the case units) so that case unit sorting and throughput occurs substantially simultaneously without dedicated sorters as described in U.S. Pat. No. 9,856,083, previously incorporated herein by reference in its entirety.

As an example of case unit or breakpack goods container throughput as it relates to sortation, referring also to FIG. 1E, the storage and retrieval system 100 includes several areas or regions of throughput. For example, there is multi-level case unit storage throughput 130LTP that effects placement of case units into storage. The placement/organization of case units in the storage spaces 130S may be decoupled/independent from (e.g., are not pre-staged for) sorting of the case units and/or breakpack goods BPG in the different sortation echelons described herein. A horizontal case unit transport throughput 110TP effects a transfer of case unit(s) from storage along the picking aisles, transfer decks, and to/from a breakpack goods interface. The horizontal case unit transport throughput 110TP effects, at least in part, one or more of the pallet output sort 185 echelon and the breakpack station input sort 186 echelon. The pallet output sort 185 sorts case units destined for a mixed pallet load, where such case units are not provided to a breakpack station 266. Breakpack station throughput 266TP (e.g., breakdown of supply cases at a breakpack operation station) effects one or more of the breakpack station input sort 186 echelon (e.g., via breakpack module lifts 310A, 310B) and breakpack station output sort 187 echelon (via the breakpack operation station 140). Horizontal goods transport throughput 262TP provides for transfer of breakpack goods from a breakpack operation station 140 to a breakpack goods interface and effects a breakpack order sort 188 echelon. Case buffering throughput BTSTP provides for buffering of case units to facilitate transfer of the case units between storage/breakpack and vertical transport and may at, least in part, effect one or more of the pallet output sort 185 and the breakpack output sort 189. A vertical transport throughput 150TP effects transfer of case units by the vertical lifts 150 and may further facilitate, at least in part, one or more of the pallet output sort 185 and breakpack output sort 189. Throughput at the output stations 160TP is also provided which includes, e.g., transport by conveyors 160CB and palletizing by palletizer 160PB. In one aspect sortation of case units, as described herein, is effected substantially coincident (e.g. "on the fly") with throughput 130LTP, 110TP, 266TP, 262TP, BTSTP, 150TP of case units along each throughput axis (e.g. the X, Y, Z axes relative to, for example, a container bot 110 and or lift 150 frame of reference) and sortation along each axis is independently selectable so that sortation is effected along one or more X, Y, Z axes.

Also referring to FIGS. 1A and 1B, the storage structure 130 may include a container autonomous transport travel loop(s) 233, 233A (e.g., formed on and along a container transfer deck 130DC), disposed at a respective level of the storage structure 130. It is noted that the lifts 150 are connected via transfer stations TS (also referred to herein as container infeed stations when the lift 150 is an inbound lift 150A or as container outfeed stations when the lift 150 is an outbound lift 150B) to the container transfer deck 130DC, and each lift is configured to lift one or both of supply containers 265 (empty or filled) and the breakpack goods containers 264 (empty or filled, where a filled breakpack goods container 264 is one that is ready for shipping and is filled so that the breakpack goods BPG within the container occupy at least about 30% or at least about 50% of the total container volume) into and out of the at least one elevated storage level 130L of the storage structure 130. An array of storage shelves 130SA (e.g., forming at least a portion of a storage area of the storage structure 130, and also referred to herein a multilevel container storage array) is configured with container storage locations (or spaces) 130S that are arrayed peripherally along the container transfer deck 130DC, where the transport area of the storage structure 130 is substantially continuous and includes at least the transfer deck 130DC and picking aisles 130A such that the transfer area communicably connects each storage shelf in the array of storage shelves 130SA to each other. For example, multiple storage rack modules RM, configured in a high density three dimensional rack array RMA, are accessible by storage or deck levels 130L. As used herein the term "high density three dimensional rack array" refers to the three dimensional rack array RMA having undeterministic open shelving distributed along picking aisles 130A where, in some aspects, multiple stacked shelves are accessible from a common picking aisle travel surface or picking aisle level as described in U.S. Pat. No. 9,856,083, previously incorporated by reference herein in its entirety.

Each storage level 130L includes pickface storage/hand-off spaces 130S (referred to herein as storage spaces 130S or container storage locations 130S) arrayed peripherally along the container transfer deck 130DC. At least one of the storage locations 130S is a supply container storage location 130SS, and another of the container storage locations is a breakpack goods (or order) container storage location 130SB. The storage spaces 130S are in one aspect formed by the rack modules RM where the rack modules include shelves that are disposed along storage or picking aisles 130A (that are connected to the container transfer deck 130DC) which, e.g., extend linearly through the rack module array RMA and provide container bot 110 access to the storage spaces 130S and transfer deck(s) 130B (e.g., the container bots 110 are configured to traverse the container transfer deck 130DC and picking aisles 130A on each respective level(s) and transport containers (such as those described herein) accessed to and from container storage locations/spaces (such as described herein) on each of the storage shelves on each respective level(s) of the storage structure 130 to a breakpack operation station 140. In one aspect, the shelves of the rack modules RM are arranged as multi-level shelves that are distributed along the picking aisles 130A. As may be realized the container bots 110 travel on a respective storage level 130L along the picking aisles 130A and the container transfer deck 130DC for transferring case units between any of the storage spaces 130S of the storage structure 130 (e.g. on the level which the container bot 110 is located) and any of the lift modules 150 (e.g. each of the container bots 110 has access to each storage space 130S on a respective level and each lift module 150 on a respective storage level 130L).

The container transfer decks 130DC are arranged at different levels (corresponding to each level 130L of the storage and retrieval system) that may be stacked one over the other or horizontally offset, such as having one container transfer deck 130DC at one end or side RMAE1 of the storage rack array RMA or at several ends or sides RMAE1, RMAE2 of the storage rack array RMA as described in, for example, U.S. patent application Ser. No. 13/326,674 filed on Dec. 15, 2011 the disclosure of which is incorporated herein by reference in its entirety. The container transfer decks 130DC are substantially open and configured for the undeterministic traversal of container bots 110 along multiple travel lanes (e.g. along an X throughput axis with respect to the bot frame of reference REF illustrated in FIG. 6D) across and along the transfer decks 130B. As described in U.S. Pat. No. 10,556,743 issued on Feb. 11, 2020 and having application Ser. No. 15/671,591, the disclosure of which is incorporated herein by reference in its entirety, the multiple travel lanes may be configured to provide multiple access paths or routes to each storage location 130S (e.g., pickface, case unit, container, or other items stored on the storage shelves of rack modules RM) so that container bots 110 may reach each storage location using, for example, a secondary path if a primary path to the storage location is obstructed. As may be realized, the transfer deck(s) 130B at each storage level 130L communicate with each of the picking aisles 130A on the respective storage level 130L.

Figure 6B:
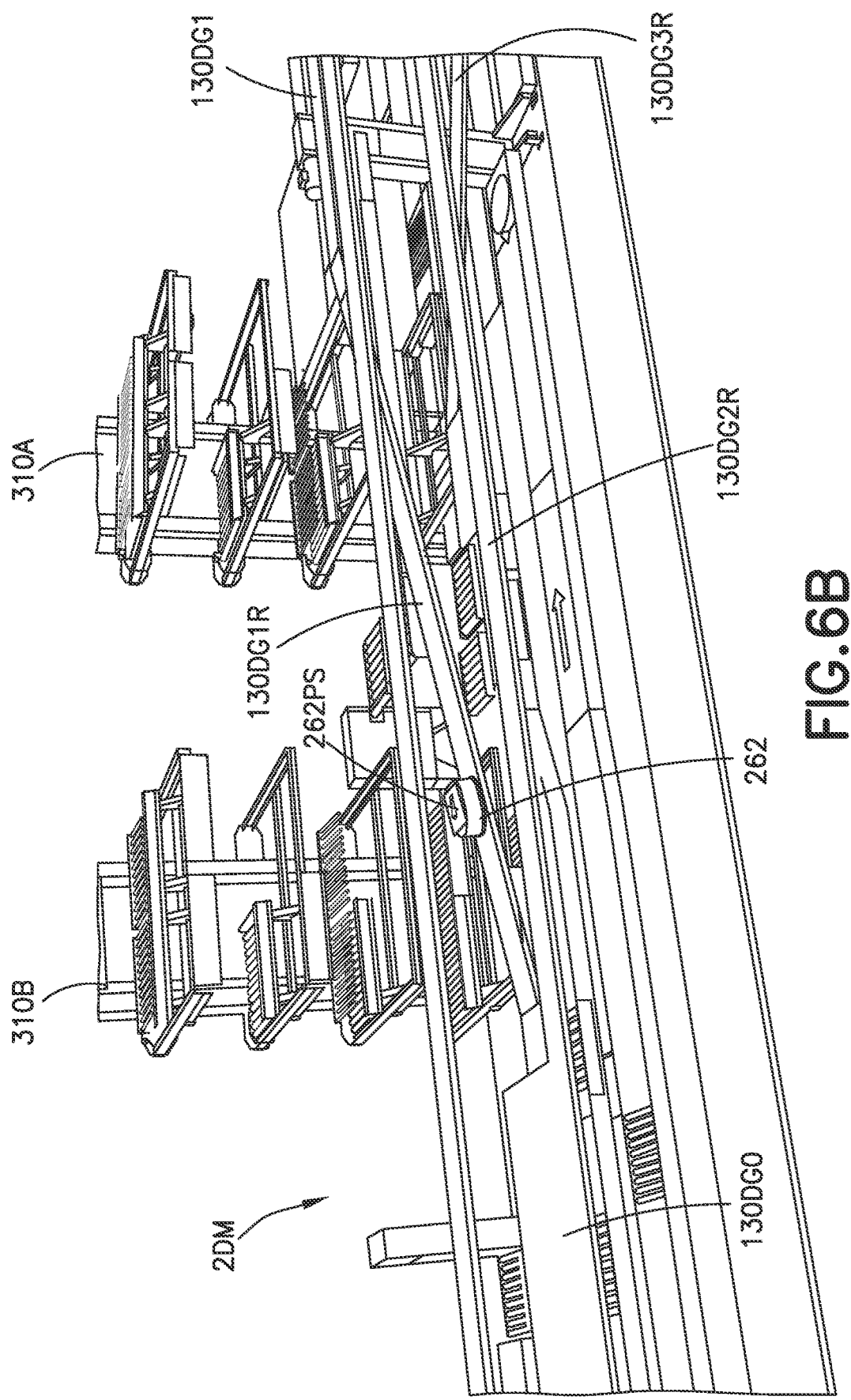
Figure 6C:
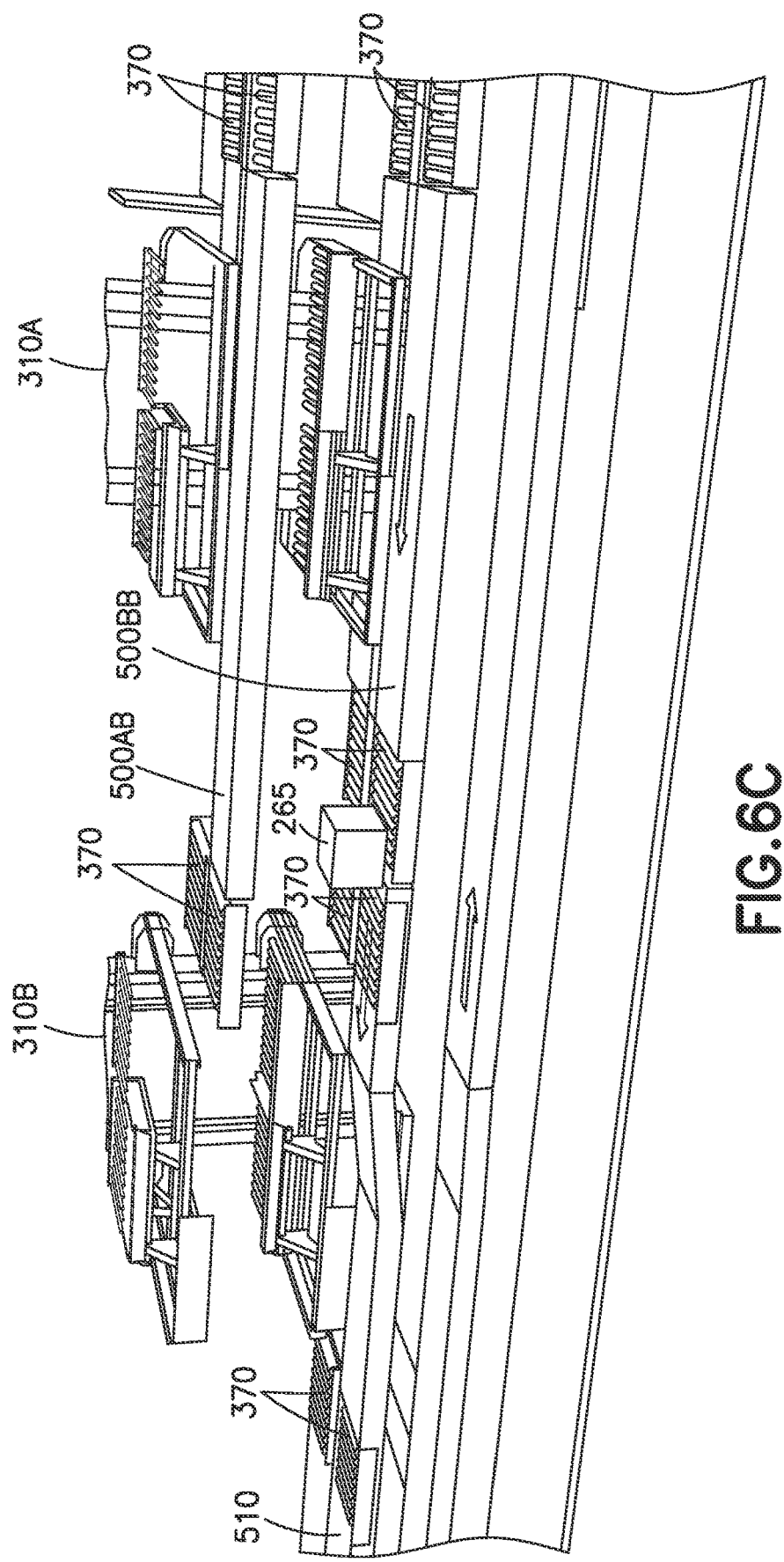
Figure 6D:
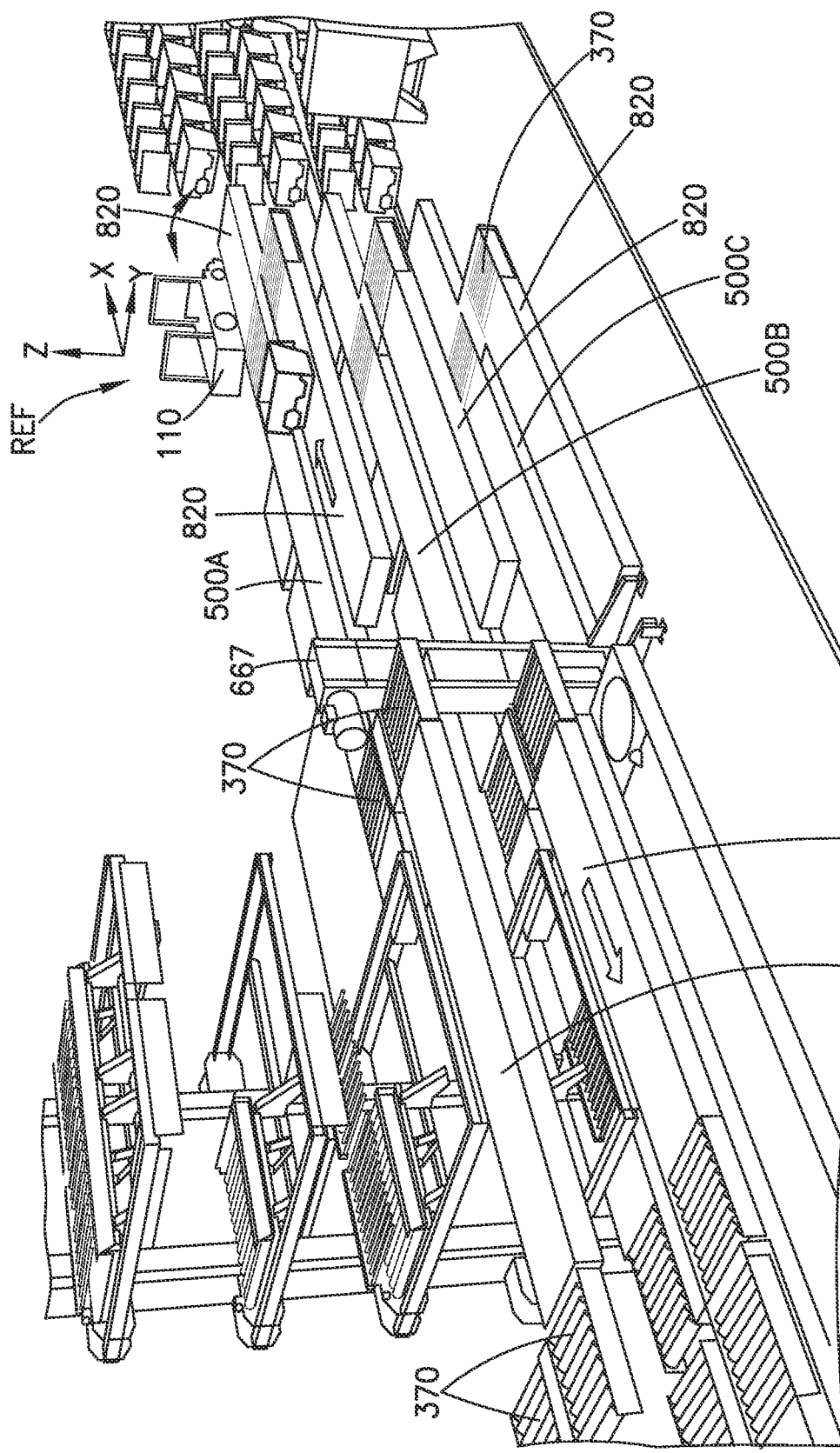
Figure 6E:
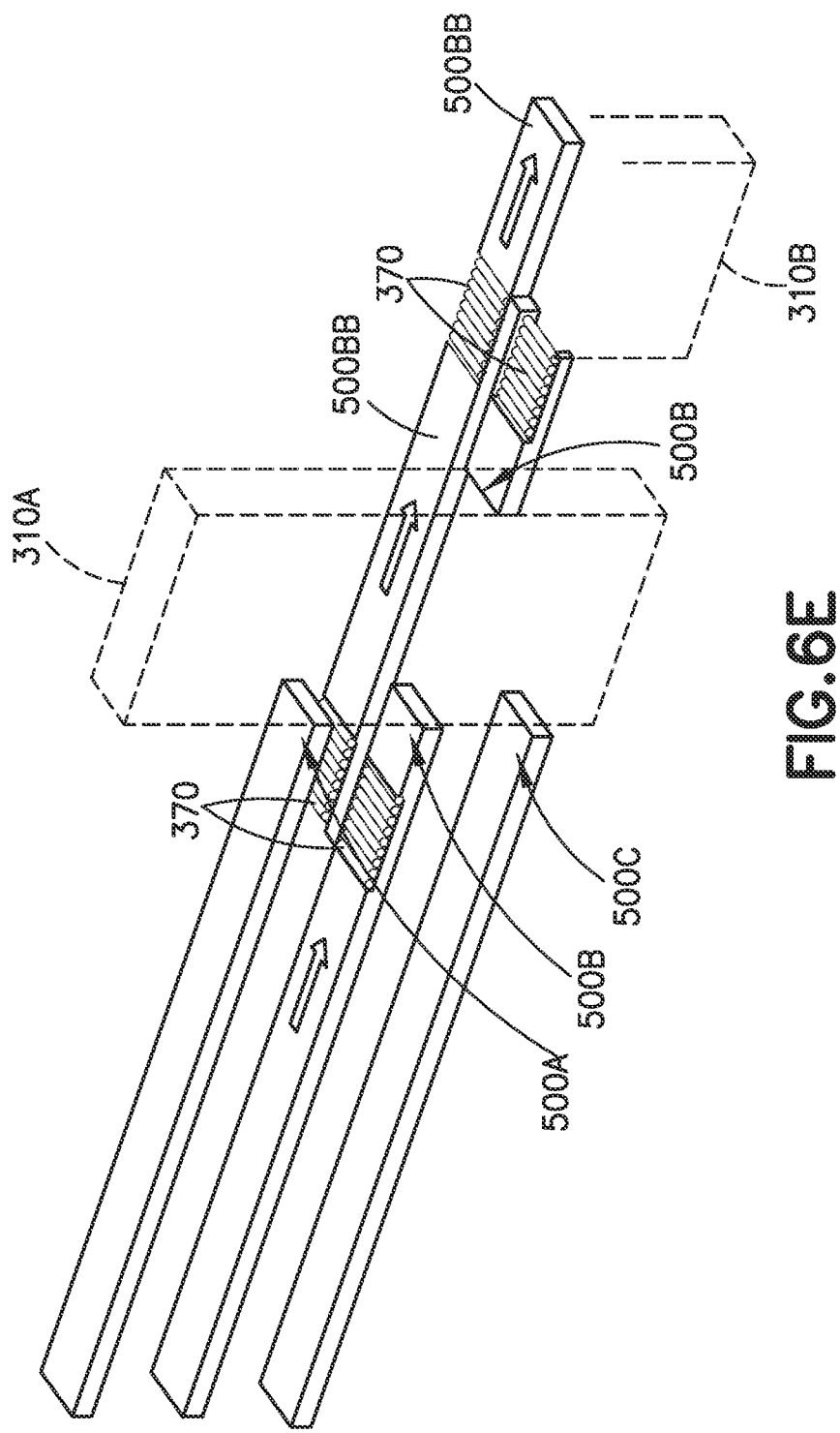

Container bots 110 bi-directionally traverse between the container transfer deck(s) 130DC and picking aisles 130A on each respective storage level 130L so as to travel along the picking aisles (e.g. along the X throughput axis with respect to the bot frame of reference REF illustrated in FIG. 6D) and access the storage spaces 130S disposed in the rack shelves alongside each of the picking aisles 130A (e.g. container bots 110 may access, along a Y throughput axis, storage spaces 130S distributed on both sides of each aisle such that the container bot 110 may have a different facing when traversing each picking aisle 130A, for example, drive wheels of the container bot 110 leading a direction of travel or drive wheels trailing a direction of travel). As may be realized, throughput outbound from the storage array in the horizontal plane corresponding to a predetermined storage or deck level 130L is effected by and manifest in the combined or integrated throughput along both the X and Y throughput axes. As noted above, the container transfer deck(s) 130DC also provides container bot 110 access to each of the lifts 150 on the respective storage level 130L where the lifts 150 feed and remove case units (e.g. along the Z throughput axis) to and/or from each storage level 130L and where the container bots 110 effect case unit transfer between the lifts 150 and the storage spaces 130S.

The container bots 110 may be any suitable independently operable autonomous transport vehicles that respectively carry and transfer/transport case units and/or pickfaces (which may be individually or collectively referred to as supply containers 265) and breakpack goods containers 264, e.g., along the X and Y throughput axes (see FIG. 1B) throughout the storage and retrieval system 100. In one aspect the container bots 110 are automated, independent (e.g. free riding) autonomous transport vehicles. Suitable examples of bots can be found in, for exemplary purposes only, U.S. patent application Ser. No. 13/326,674 filed on Dec. 15, 2011; U.S. patent application Ser. No. 12/757,312 filed on Apr. 9, 2010 (now U.S. Pat. No. 8,425,173); U.S. patent application Ser. No. 13/326,423 filed on Dec. 15, 2011; U.S. patent application Ser. No. 13/326,447 filed on Dec. 15, 2011 (now U.S. Pat. No. 8,965,619); U.S. patent application Ser. No. 13/326,505 Dec. 15, 2011 (now U.S. Pat. No. 8,696,010); U.S. patent application Ser. No. 13/327,040 filed on Dec. 15, 2011 (now U.S. Pat. No. 9,187,244); U.S. patent application Ser. No. 13/326,952 filed on Dec. 15, 2011; U.S. patent application Ser. No. 13/326,993 filed on Dec. 15, 2011; U.S. patent application Ser. No. 14/486,008 filed on Sep. 15, 2014; and U.S. Provisional Patent Application No. 62/107,135 filed on Jan. 23, 2015, the disclosures of which are incorporated by reference herein in their entireties. The container bots 110 (described in greater detail below) may be configured to place case units, such as the above described retail merchandise, into picking stock in the one or more levels of the storage structure 130 and then selectively retrieve ordered case units. As may be realized, in one aspect, the throughput axes X and Y (e.g. pickface transport axes) of the storage array are defined by the picking aisles 130A, at least one container transfer deck 130DC, the container bot 110 and the extendable end effector (as described herein) of the container bot 110 (and in other aspects the extendable end effector of the lifts 150 also, at least in part, defines the Y throughput axis). The pickfaces (which in one aspect include supply containers 265) are transported between an inbound section of the storage and retrieval system 100, where pickfaces inbound to the array are generated (such as, for example, input station 1601N) and a load fill section of the storage and retrieval system 100 (such as for example, output station 160UT or output station 160EC), where outbound pickfaces from the array are arranged to fill a load in accordance with a predetermined load fill order sequence or an individual fulfillment order(s) in accordance with a predetermined individual fulfillment order sequence. In another aspect, pickfaces (e.g., of supply containers 265) are transported between the storage spaces 130S and a load fill section of the storage and retrieval system 100 (such as for example, output station 160UT or output station 160EC) to fill a load in accordance with a predetermined load fill order sequence or an individual fulfillment order(s) in accordance with a predetermined individual fulfillment order sequence. In still other aspects, breakpack goods container(s) 264 (which, in one aspect, multiple breakpack goods containers may be arranged in and transported as a pickface) are transported by the container bots 110 between the storage spaces 130S and the load fill section and/or between the breakpack goods interface 263 of the breakpack module(s) 266 and the load fill section of the storage and retrieval system 100 (such as for example, output station 160UT or output station 160EC) to fill a load in accordance with a predetermined load fill order sequence or an individual fulfillment order(s) in accordance with a predetermined individual fulfillment order sequence. The control server 120 may operate the automated storage and retrieval system 100 in different modes of operation so that the pickfaces (e.g., of supply containers 265) and breakpack goods containers 264 are transferred in accordance with one or more of the above aspects to the load fill section to fill a load with one or more of pickfaces (e.g., of supply containers 265) and breakpack goods containers 264.

As described above, referring to FIG. 1B, in one aspect the storage structure 130 includes multiple storage rack modules RM, configured in a three dimensional array RMA (e.g., forming the array of storage shelves 130SA) where the racks are arranged in aisles 130A, the aisles 130A being configured for container bot 110 travel within the aisles 130A. The container transfer deck 130DC has an undeterministic transport surface on which the container bots 110 travel where the undeterministic transport surface (also referred to herein as a deck surface) 130BS has multiple travel lanes (e.g., more than one juxtaposed travel lane (e.g. high speed bot travel paths HSTP)) for travel of the container bot 110 along the container autonomous transport travel loop(s) 233 formed by the container transfer deck 130DC, where the multiple travel lanes connect the aisles 130A. The container autonomous transport travel loop(s) 233 provides the container bot 110 with random access to any and each picking aisle 130A and random access to any and each lift 150A, 150B on the respective level 130L of the storage structure 130. At least one of the multiple travel lanes has a travel sense opposite to another travel lane sense of another of the multiple travel lanes (so as to form the container autonomous transport travel loop 233).

In one aspect, the storage rack modules RM and the container bots 110 are arranged so that in combination the storage rack modules RM and the container bots 110 effect the on the fly sortation (e.g., such as of the pallet output sort 185 echelon) of mixed case pickfaces coincident with transport on at least one (or in other aspects on at least one of each of the more than one) of the throughput axes so that two or more pickfaces are picked from one or more of the storage spaces and placed at one or more pickface holding locations (such as, for example, the buffer and transfer stations BS, TS), that are different than the storage spaces 130S, according to the predetermined load fill order sequence.

As may be realized, any suitable controller of the storage and retrieval system 100 such as for example, control server 120, may be configured to create any suitable number of alternative pathways or diverts for retrieving one or more case units (and/or breakpack goods containers) from their respective storage locations 130S when a pathway provided access to those case units is restricted or otherwise blocked in the manner described in U.S. provisional patent application No. 63/044,721 filed on Jun. 26, 2020 and titled "Warehousing System for Storing and Retrieving Goods In Containers," the disclosure of which was previously incorporated herein by reference in its entirety.

It is noted that the storage and retrieval systems shown and described herein have exemplary configurations only and in other aspects the storage and retrieval systems may have any suitable configuration and components for storing and retrieving items as described herein. For example, in other aspects, the storage and retrieval system may have any suitable number of storage sections, any suitable number of transfer decks, any suitable number of breakpack modules 266, and corresponding input/output stations.

As may be realized, the juxtaposed travel lanes are juxtaposed along a common undeterministic transport surface 130BS between opposing sides 130BD1, 130BD2 of the container transfer deck 130DC. As illustrated in FIG. 1B, in one aspect the aisles 130A are joined to the container transfer deck 130DC on one side 130BD2 of the container transfer deck 130DC but in other aspects, the aisles are joined to more than one side 130BD1, 130BD2 of the container transfer deck 130DC in a manner substantially similar to that described in U.S. patent application Ser. No. 13/326,674 filed on Dec. 15, 2011, the disclosure of which is previously incorporated by reference herein in its entirety. As described in U.S. provisional patent application No. 63/044,721 filed on Jun. 26, 2020 and titled "Warehousing System for Storing and Retrieving Goods In Containers," the disclosure of which was previously incorporated herein by reference in its entirety, the other side 130BD1 of the container transfer deck 130DC may include deck storage racks (e.g. interface stations (also referred to as transfer stations) TS and buffer stations BS) that are distributed along the other side 130BD1 of the container transfer deck 130DC so that at least one part of the transfer deck is interposed between the deck storage racks (such as, for example, buffer stations BS or transfer stations TS) and the aisles 130A. The deck storage racks are arranged along the other side 130BD1 of the container transfer deck 130DC so that the deck storage racks communicate with the container bots 110 from the container transfer deck 130DC and with the lift modules 150 (e.g. the deck storage racks are accessed by the container bots 110 from the container transfer deck 130DC and by the lifts 150 for picking and placing pickfaces so that pickfaces are transferred between the container bots 110 and the deck storage racks and between the deck storage racks and the lifts 150 and hence between the container bots 110 and the lifts 150).

Referring again to FIG. 1A, each storage level 130L may also include charging stations 130C (e.g., located at any suitable container transfer location) for charging an onboard power supply of the container bots 110 on that storage level 130L such as described in, for example, U.S. patent application Ser. No. 14/209,086 filed on Mar. 13, 2014 and Ser. No. 13/326,823 filed on Dec. 15, 2011 (now U.S. Pat. No. 9,082,112), the disclosures of which are incorporated herein by reference in their entireties.

Referring to FIGS. 1A, 1B, 1C, and 2, as noted above, the automated storage and retrieval system 100 includes one or more breakpack modules 266. Each breakpack module includes a breakpack station 140, one or more lift(s) (in one aspect lift(s) 310A, 310B and in other aspects lift(s) 310A', 310B'), one or more container bot travel surface(s) 266RS (e.g., for inputting supply containers 265 to the breakpack module 266) communicably coupled to the breakpack station 140 (as described herein), and a predetermined number of ganged goods deck levels 130DGL communicably coupled to the breakpack station 140 and a respective one of the storage levels 130L.

While the breakpack modules 266 are described herein with respect to the automated storage and retrieval system 100, it should be understood that, in other aspects, the breakpack modules 266 may be configured for coupling to any suitable input such as a single level storage and retrieval system (e.g., via any suitable deck or floor and/or in any other suitable manner), a goods transport truck or trailer (e.g., such as at a loading dock), a cargo car of a train (e.g., such as at a train depot), a cargo aircraft (such as at an airport terminal), or any other suitable input that may provide (either manually or with automation) supply containers (such as those described herein) to, for example, at least one induction conveyor(s) 500A, 500B, 500C of a respective breakpack module 266. Here, given that the breakpack module may receive supply containers from any suitable input, the breakpack module 266 may be referred to as an automated order fulfillment system (or at least a part thereof, such as when coupled to the automated storage and retrieval system 100). Whether the breakpack module 266 is coupled to and forms part of the storage and retrieval system 100 or is coupled to any of the other inputs as noted above, the automated order fulfillment system includes the putwall or multilevel breakpack goods container fill array 263W, goods transfer decks 130DG, and at least one goods bot 262 as described herein. The putwall 263W has multiple levels PWL, each level PWL having a container fill station area CFA, with breakpack goods interface locations 263L arrayed along the container fill station area CFA, and having a corresponding breakpack goods transfer deck 130DG1-130DG3 juxtaposed along the breakpack goods interface locations 263L of the container fill station area CFA. The at least one goods bot 262, as will be described in greater detail herein, has a payload support 262PS for holding at least one breakpack goods BPG unit for transport by the at least one goods bot 262. The at least one goods bot 262 is configured (e.g., as described herein) to traverse and transport breakpack goods BPG along the corresponding breakpack goods transfer deck 130DG, and between corresponding breakpack goods transfer decks 130DG1-130DG3 at different levels of the multilevel breakpack goods container fill array (see, e.g., FIGS. 3A, 3B, 4, 6A, 6B, 7A, and 7B), to each breakpack goods interface station/container station 263L at each level PWL of the putwall 263W (see FIGS. 4 and 5C), wherein each breakpack goods interface station 263L is disposed to hold a breakpack goods container 264 accessed by and filled by the at least one goods bot 262 with a predetermined breakpack goods fill payload BPGFP. As will be described in greater detail herein, the corresponding transfer deck 130DG1-130DG3 at each level PWL is communicably joined to other transfer decks 130DG1-130DG3 corresponding to each other level PWL of the putwall 263W by interlevel transit autonomous guided breakpack goods transport vehicle pathways (e.g., the lifts, ramps, etc. described herein) that traverse between the corresponding breakpack goods transfer deck 130DG1-130DG3 at each level PWL and other breakpack goods transfer decks 130DG1-130DG3 corresponding to each other level PWL (and in some aspects the interlevel transit autonomous guided breakpack goods transport vehicle pathways provide goods bot transit between the decks of different gangs of decks 130DGL as described herein) so that the at least one goods bot 262 transits, via the interlevel transit autonomous guided breakpack goods transport pathways from the corresponding breakpack goods transfer deck 130DG1-130DG3 to each other breakpack goods transfer deck 130DG1-130DG3 corresponding to each other level PWL, and transports the predetermined breakpack goods BPG fill payload loaded on the at least one goods bot 262 on one level PWL and fills the breakpack goods container 264 at each breakpack goods container station 263L at a different level PWL.

Again, whether the breakpack module 266 is coupled to and forms part of the storage and retrieval system 100 or is coupled to any of the other inputs as noted above, the corresponding breakpack goods transfer decks 130DG1-130DG3 at each level PWL and interlevel transit autonomous guided breakpack goods transport pathways (e.g., the ramps, lifts, etc. described herein) form at least a two-dimensional matrix of autonomous guided breakpack goods transport vehicle divert pathways 2DM (see FIGS. 2, 3A, 3B, 4, 6A, 6B, and 7A-7D) including at least one interlevel divert pathway (e.g., the ramps 130DG1R, 130DG3R, 451, 452, 453, lifts 490, etc. described herein) and at least one intralevel divert pathway (e.g., the shunts 461-463 described herein—see, e.g., FIG. 7C), so that the at least one goods bot 262 freely diverts, on the fly, via at least one of the at least one interlevel divert pathway and the at least one interlevel divert pathway from an initial breakpack goods container station destination CSD1 to a divert breakpack goods container station destination CSD2 on at least one of a common level PWL (i.e., a same level as the initial breakpack goods container station destination CSD1) and a different level PWL as (e.g., relative to) the initial container station destination CSD1. The corresponding breakpack goods transfer deck 130DG1-130DG3 (e.g., of each gang of deck levels 130DGL where more than one gang is provided) at each level is non-deterministic (e.g., in a manner substantially similar to the container deck 130DC described herein) and the at least one interlevel divert pathway is non-deterministic (e.g., in a manner substantially similar to the container deck 130DC described herein) so that the at least one goods bot 262 may freely transition between the corresponding breakpack goods transfer deck 130DG1-130DG3 to the at least one interlevel divert pathway and vice versa. The goods bot 262 effects pose determination and localization along the goods decks 130DG1-130DG2, the at least one interlevel divert pathway and the at least one intralevel divert pathway in the manner described herein (see FIG. 25).

With respect to the automated storage and retrieval system 100, each breakpack module 266 may be undeterministically coupled (e.g., the breakpack modules 266 maybe coupled to the automated storage and retrieval system 100 at any suitable location thereof, such as to one or more ends 130BE1, 130BE2, or centrally located between the two ends 130BE1, 130BE2 such as in place of picking aisles 130A (and storage locations), on a side of the container transfer deck 130DC on which the picking aisles 130A are located and one or more picking aisles 130A extend into the breakpack module 266AL so as to form container bot riding surface(s) 266RS, or at any other suitable location—see FIG. 1B) to the automated storage and retrieval system 100 in any suitable manner (e.g., so as to form a part thereof). Though the breakpack modules 266 are coupled undeterministically to the structure of the automated storage and retrieval system 100 each component of the breakpack modules 166 is independent (e.g., self-contained as a unit) and/or independently automated in guidance and travel of the bots (e.g., goods bots 262) from the components of the automated storage and retrieval system, so that the interface between the components of the breakpack modules 266 and the components of the automated storage and retrieval system 100 is undeterministic.

The breakpack module(s) 266 may be coupled to the structure of the automated storage and retrieval system 100 at any suitable location and at any suitable level(s) 130L. For example, as noted above, a breakpack module 266 may be located at one or more ends 130BE1, 130BE2 of the container transfer deck 130DC or at one or more sides 130BD1, 130BD2 of the container transfer deck 130DC (such as in lieu of storage rack modules RM/picking aisles 130A or lifts 150A, 150B, or as an extension of one or more picking aisles 130A—see FIG. 1B). Each of the breakpack modules 266 is a plug and play module that is integrated with (or otherwise connected to) the container transfer deck 130DC so that the container transfer deck 130DC is communicably coupled to the container bot riding surface 266RS. In one aspect, the container transfer deck 130DC extends into the breakpack module to form the container bot riding surface 266RS (e.g., the breakpack module forms a modular part of the container transfer deck 130DC) so that container bots 110 traverse or move into and out of the breakpack modules 266 along the undeterministic container transfer deck 130DC, and at least one of the multiple travel lanes of the container transfer deck 130DC defines a queue for the container bots 110 at the breakpack module 266. In other aspects, the container bot riding surface 266RS includes rails 1200S that extend from the container transport deck 130DC in a manner similar to that of the picking aisles 130A, so that container bots 110 traverse or move into and out of the breakpack modules 266 along the rails 1200S, and the rails 1200S defines a queue for the container bots 110 at the breakpack module 266. It is noted that where the container bot riding surface 266RS is formed by rails 1200S the riding surface may include an undeterministic turn around area 1200UTA (that is similar to the open undeterministic container transfer deck 130DC) on which the container bots 110 turn to transition between different travel portions (e.g., inbound lane TL1 and outbound lane TL3 of travel loop 233BP described herein) of the container bot riding surface 266RS. The travel loop 233BP provides the container bot 110 with random access to any and each breakpack goods interface locations 263L of the breakpack goods interface 263 along the bot travel surface 266RS, where the breakpack goods interface locations 263L form an asynchronous product distribution system.

Figure 2:
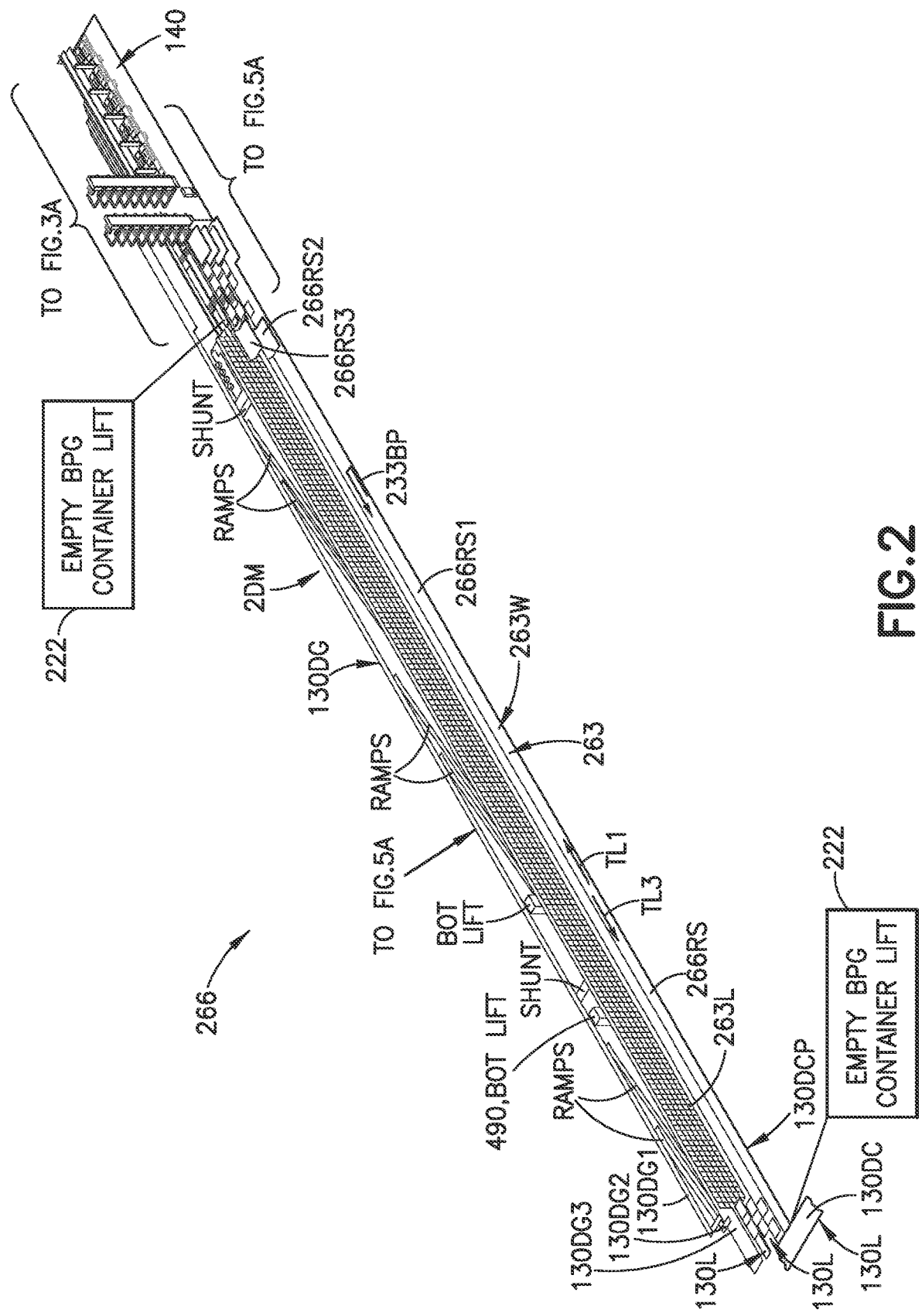
FIG. 2 is a schematic perspective illustration of a breakpack goods module of the automated storage and retrieval systems of FIGS. 1A, 1B, 1C, and 1E in accordance with aspects of the disclosed embodiment.
Figure 3A:
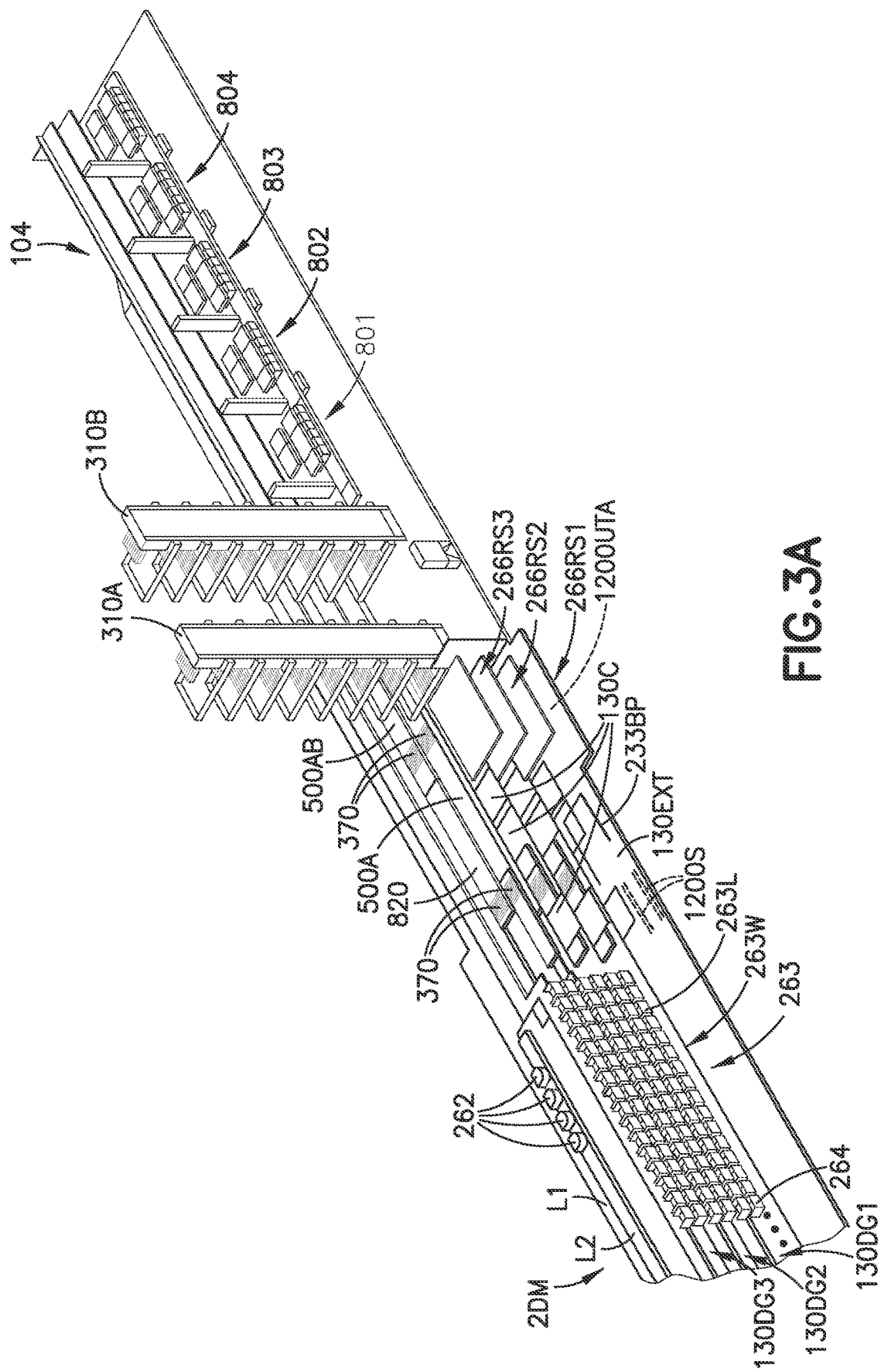
FIGS. 3A and 3B are, respectively, schematic perspective and side illustrations of portions of the breakpack goods module of FIG. 2 in accordance with aspects of the disclosed embodiment.
Figure 3B:
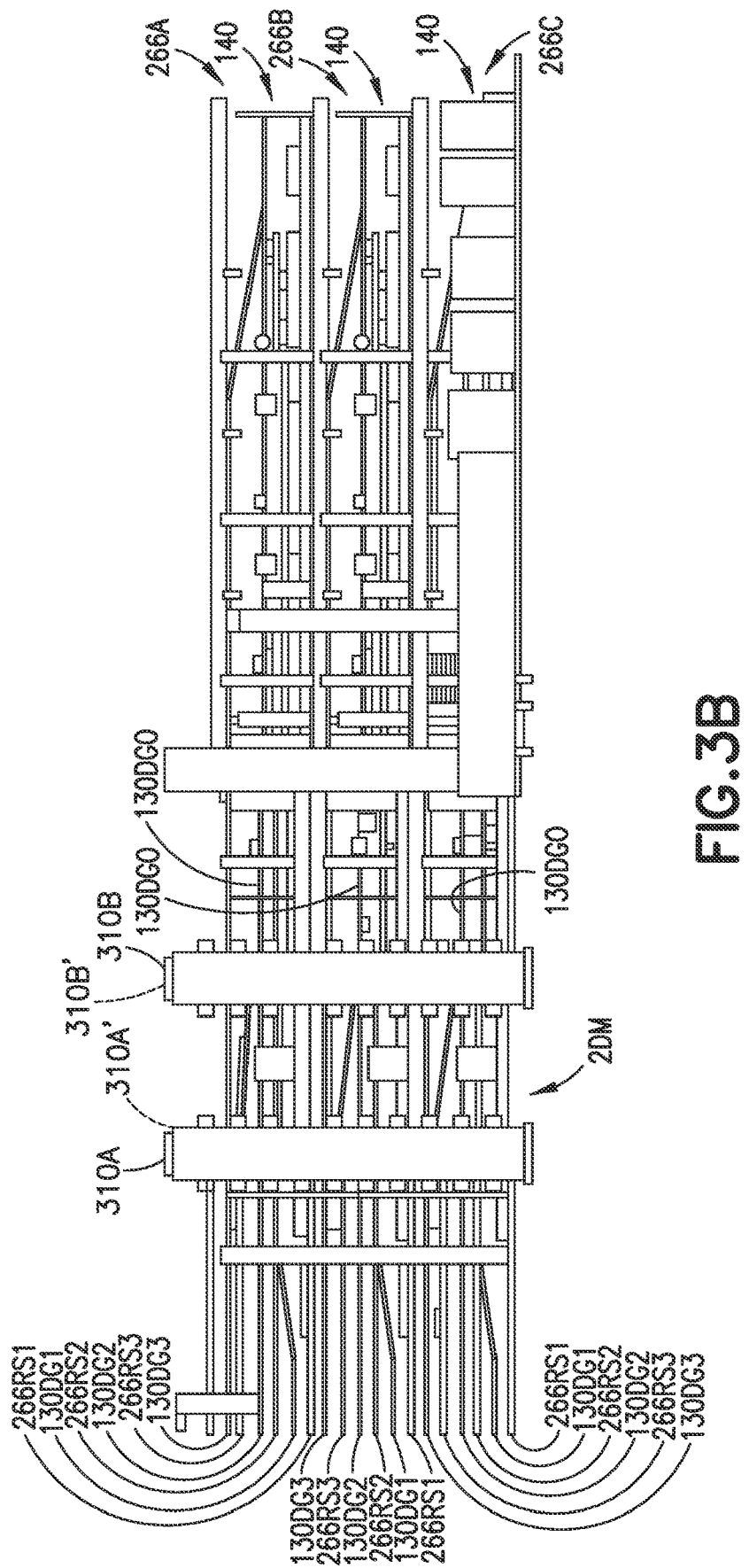

As can be seen in FIG. 1C and also referring to FIGS. 3A and 3B, two or more breakpack modules 266 may be stacked one above the other. Here, three breakpack modules 266A, 266B, 266C are illustrated as being stacked one above the other but in other aspects any suitable number of breakpack modules 266 may be stacked one above the other. Each breakpack module 266 (whether arranged in a stack or not) receives inbound supply containers 265 from any one or more of the stacked levels 130L e.g., via the containers bots 110 and lift(s) 310A, 310B, 310A', 310B'. For example, each breakpack module 266 has at least one container bot transfer deck 130EXT, each having a container bot riding surface 266RS, that forms a portion 130DCP of a container transfer deck 130DC of a storage level 130L of the automated storage and retrieval system 100. Referring also to FIG. 2, the breakpack module 266 includes three container bot riding surface 266RS1, 266RS2, 266RS3 (each corresponding to a container bot transfer deck 130EXT), stacked one above the other (noting that only a portion of container bot riding surfaces 266RS2, 266RS3 are shown for clarity). Each of container bot riding surface 266RS1, 266RS2, 266RS3/container bot transfer deck 130EXT is coupled to and forms the portion 130DCP of a container transfer deck 130DC on a respective level 130L of the automated storage and retrieval system 100. The riding surface 2666RS is substantially similar to that of container transfer deck 130DC, while in other aspects the container bot riding surface 266RS may be substantially similar to that of the picking aisles 130A. For ease of explanation, the aspects of the disclosed embodiment will refer to the container bot riding surface 266RS within the breakpack module 266 as a portion of the container transfer deck 130DC. In aspects where the bot riding surface 266RS is formed by a portion of (or is an extension of) the container transfer deck 130DC it is noted that, while the container transfer deck 130DC is illustrated in FIG. 2 as a single path transport/travel loop, in other aspects the transport/travel loop of the breakpack module 266 may be a multilane transport/travel loop substantially similar to container transport deck illustrated in FIG. 1B. For example, referring to FIG. 2 the container bot travel surface 266RS is an open undeterministic travel surface having at least one travel inbound lane TL1 and at least one outbound lane TL3, where the multiple travel lanes TL1, TL3 act as bypass lanes for each other so that the container bots 110 can enter travel lane TL2 to travel around obstructions on travel lane TL1 (or vice versa). Here, the at least one travel inbound lane TL1 and the at least one travel outbound TL3 defines at least one queue (which may effect, at least in part, one or more of the breakpack station input sort 186 and breakpack output sort 189) for the container bots 110 interfacing the breakpack module 266. The travel lanes TL1, TL3 provide the container bot 110 with random access to any and each breakpack goods interface locations 263L of the breakpack goods interface 263 along the bot travel surface 266RS.

Still referring to FIGS. 1A, 1C, 2, 3A, and 3B, as will be described in greater detail herein, the containers bots 110 from any given level 130L travel along a respective container bot travel surface 266RS1, 266RS2, 266RS3 (e.g., for that given level 130L) and, in one aspect, deliver supply containers 265 to the lift(s) 310A, 310B. The lifts 310A, 310B (and/or lifts 310A', 310B' described herein) may be referred to individually or collectively as an intervening sorter that effects the breakpack station input sort 186. The intervening sorter is disposed to communicably couple a multilevel array transport area (e.g., formed by the picking aisles 130A and transfer deck 130DC of the different storage levels 130L) and the breakpack operation station 140. In some aspects induction conveyors 500A, 500B, 500C of the breakpack module 266 may form a part of the intervening sorter as the induction conveyors 500A, 500B, 500C provide for a bypass to or divert from the lifts 310A, 310B to the breakpack operation station 140, which may effect at least in part the breakpack station input sort 186. Each lift 310A, 310B is configured so as to sort supply containers 265, from a container bot 110, and upstream of the breakpack operation station 140. Sortation, by one or more of the lifts 310A, 310B upstream of the breakpack operation station 140, of the supply containers 265 is disposed to promote sequencing of the supply containers 265, from an inferior optimized sequence (e.g., transport from storage in a non-staged manner) to a superior optimized sequence of goods (e.g., sequenced for optimized delivery to different operator stations 801-804 of the breakpack operation station 140). The sortation by one or more of the lifts 310A, 310B effects a predetermined sequence of supply containers 265 input the breakpack operation station 140, and decommissioning of goods (e.g., breakpack goods BPG), from the supply containers 265 at the operator stations 801-804, and dispatch of at least one goods bot 262 from the breakpack operation station 140 to fill the putwall 263W. The one or more lifts 310A, 310B (i.e., the intervening sorter) upstream of the breakpack operation station 140 is configured to define (via the different lifts 310A, 310B) multiple axes of sortation (each lift forming a respective axis of sortation) that are orthogonal to (e.g., separate and distinct/independent from) each other. At least one axis of sortation in one direction has parallel axis of sortation such as, for example, lifts 310A, 310B form parallel axes of sortation for sorting supply containers 265 to one or more goods deck level goods deck level 130DG1, 130DG2, 130DG3 of the same or different ganged goods deck levels 130DGL.

Figure 5A:
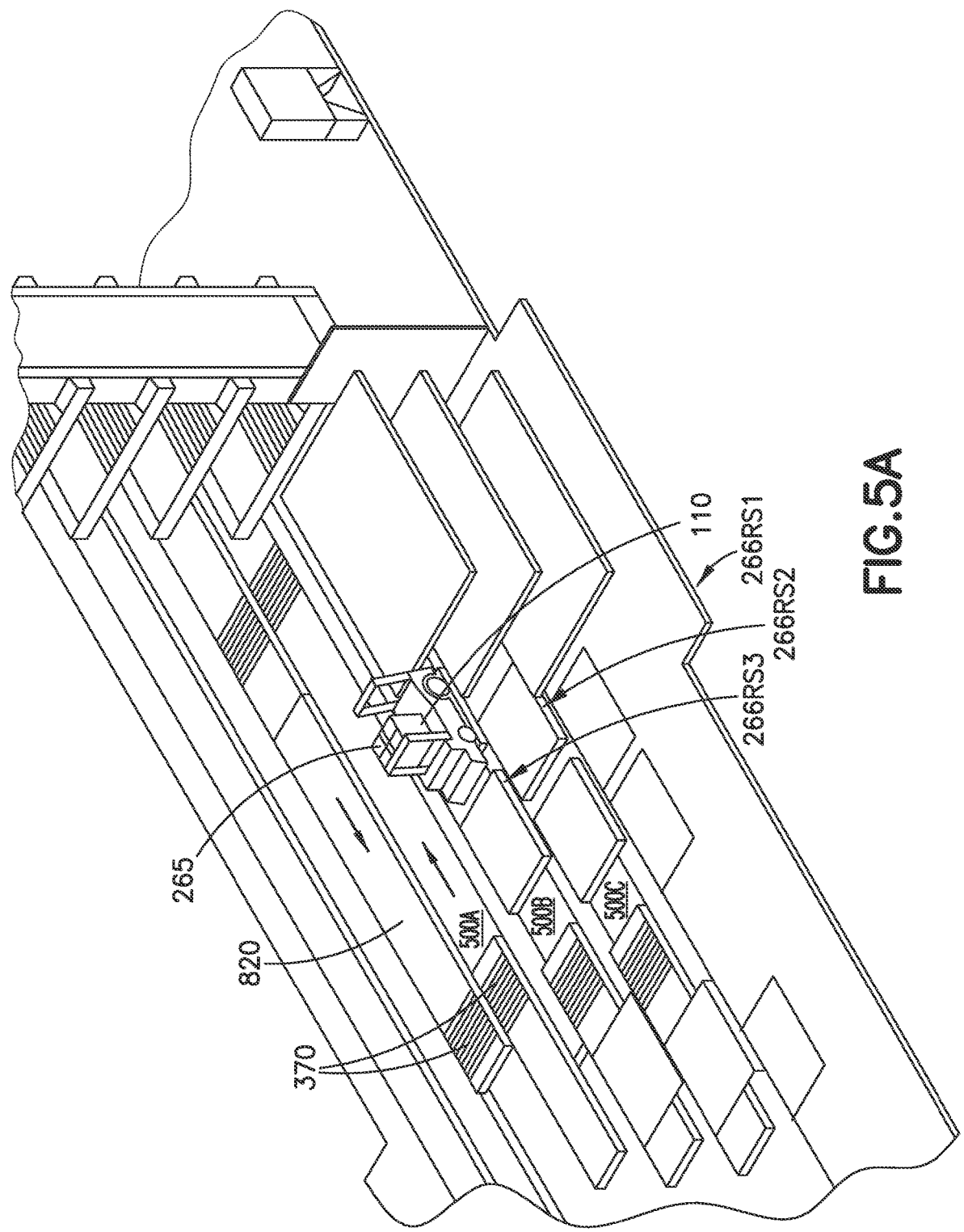

Referring also to FIG. 5A, each of the container bot travel surfaces 266RS1, 266RS2, 266RS3 disposed adjacent a respective induction conveyor 500A, 500B, 500C so that container bots 110 travelling along the container bot travel surfaces 266RS1, 266RS2, 266RS3 places (e.g., transfers) supply containers 265 from the container bot 110 to the respective induction conveyor 500A, 500B, 500C. Here, each induction conveyor 500A, 500B, 500C is configured to transfer the supply container 265 to one of the lifts 310A, 310B. At least one of the induction conveyors 500A, 500B, 500C includes a bypass conveyor portion 500AB, 500BB (see FIGS. 3A, 6C, 6D noting the bypass conveyor portion for induction conveyor 500C is obscured in the Figs.) for bypassing, or diverting supply containers 265 from, one or more lift(s) 310A, 310B. For example, an upstream lift (e.g., upstream with respect to a flow of supply containers 265 along the conveyor) may be bypassed (in the example shown the upstream lift is lift 310A) so that the supply container 265 is delivered to a downstream lift (in the example shown the downstream lift is lift 310B) to effect, at least in part the breakpack station input sort 186; while in other aspects, one or more lifts 310A, 310B may be bypassed for delivery of the supply container 265 substantially directly from the container bot 110 to the breakpack operation station 140 without transport of the supply container by the lift 310A, 310B to effect at least in part the breakpack station input sort 186.

The induction conveyors 500A, 500B, 500C include any suitable multidirectional drive/conveyor units/portions 370 configured to move the supply containers 265 between conveyor portions or to/from a lift 310A, 310B. For example, the multidirectional conveyor portions 370 are configured to move the supply containers 265 along a longitudinal axis of the respective induction conveyor 500A, 500B, 500C (e.g., for delivery of the supply container 265 to the lifts 310A, 310B—the lifts 310A, 310B being interdigitated between lengths of at least one of the induction conveyor 500A, 500B, 500C as illustrated best in FIG. 6C) and/or move the supply containers 265 in a direction transverse to the longitudinal axis so as to move the supply containers 265 to and from the respective bypass conveyor portion 500AB, 500BB.

Figure 8A:
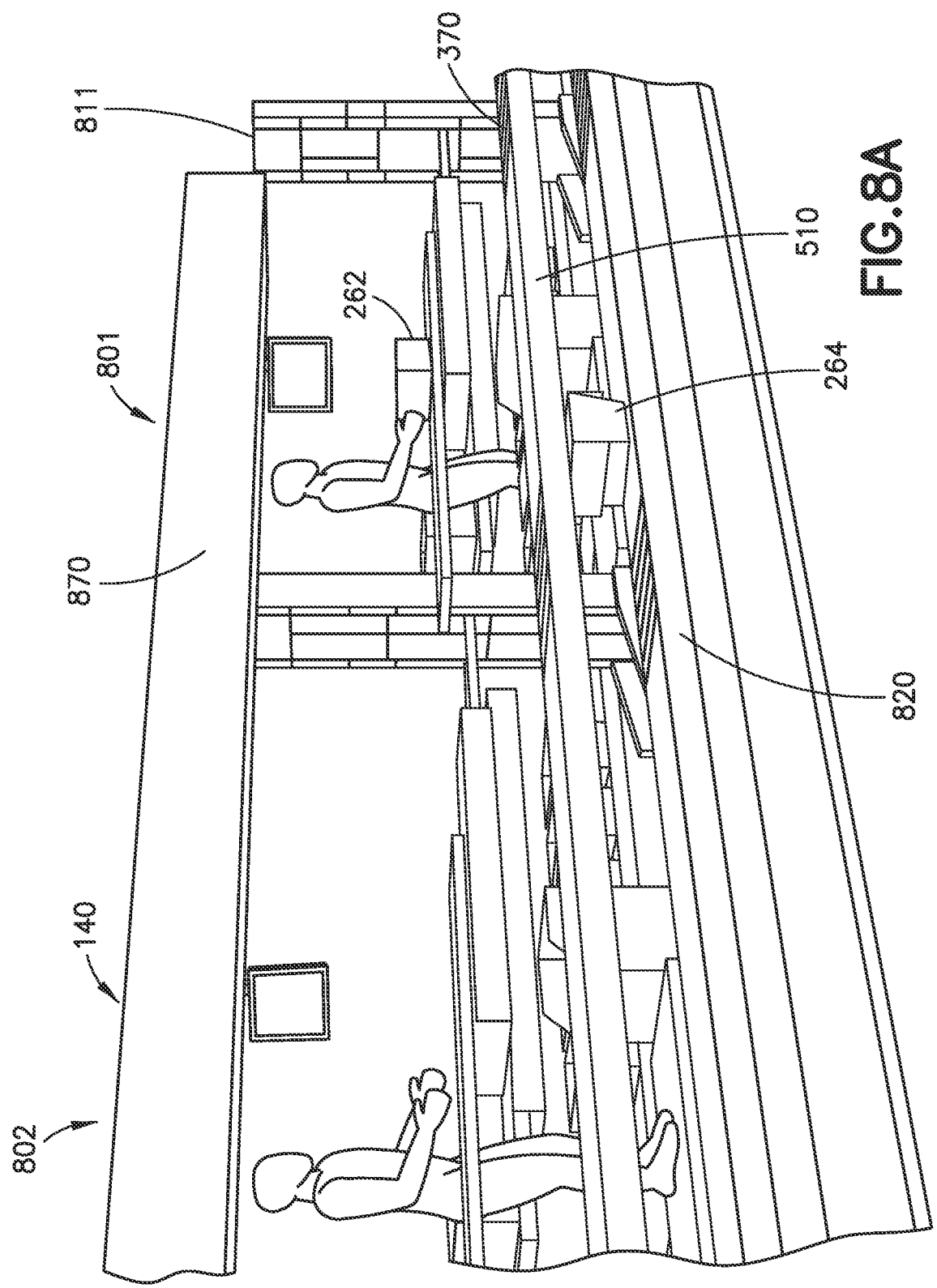
FIGS. 8A and 8B are schematic perspective illustrations of operator stations of the breakpack goods module of FIG. 2 in accordance with aspects of the disclosed embodiment.
Figure 8B:
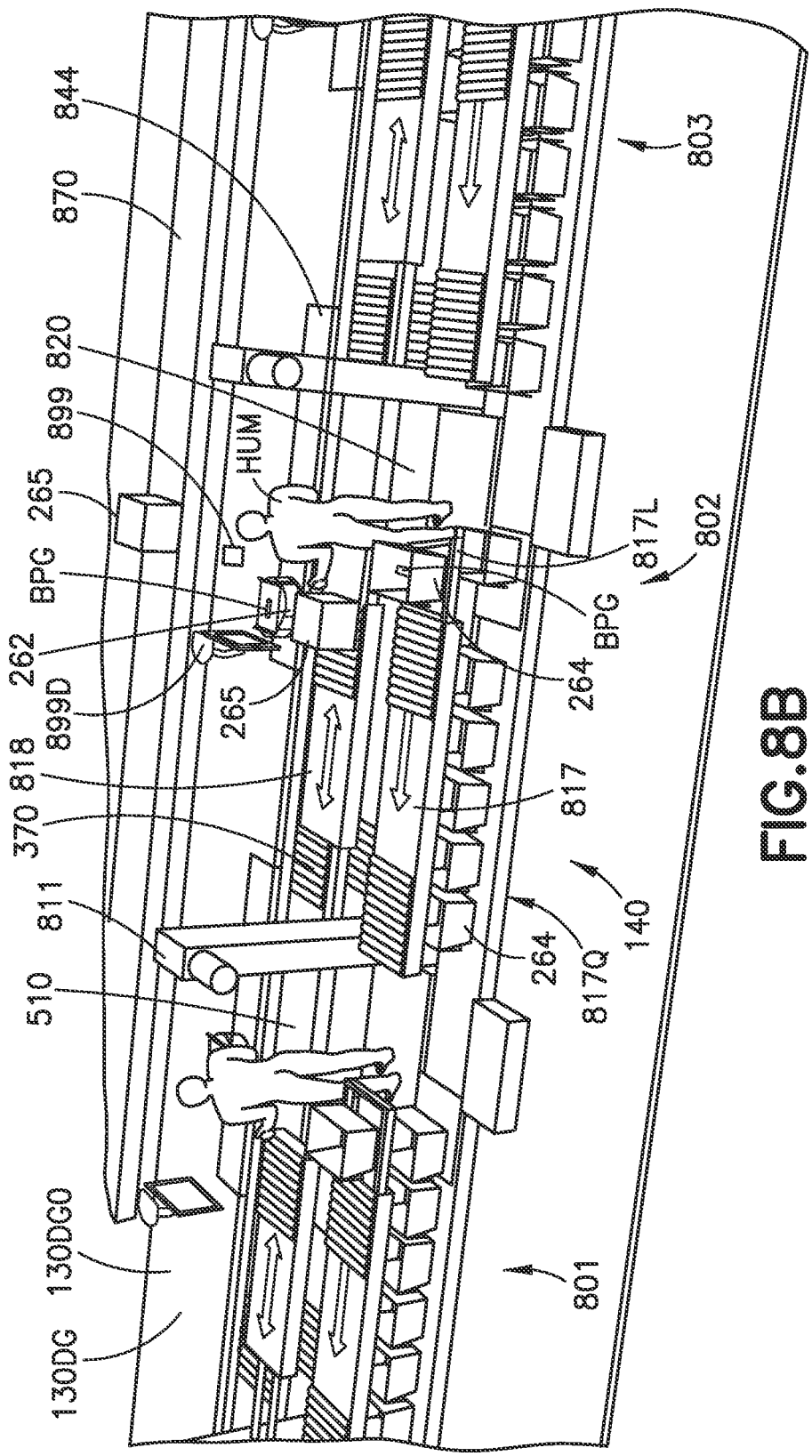

The output of the bypass conveyors 500AB, 500BB (and bypass conveyor for induction conveyor 500C) and an output of the lifts 310A, 310B is a common output (e.g., the outputs are merged into a single breakpack station input conveyor 510—see FIGS. 6C, 8A, and 8B) that delivers the supply containers 265 to the breakpack operation station 140 in the superior optimized sequence of goods that effects the predetermined sequence of breakpack goods fill into the breakpack goods container 264 in the putwall 263W as will be described herein. As also described herein, each load fill of breakpack goods BPG into a breakpack goods container 264 at the putwall is independent/orthogonal to the load fill of other breakpack goods containers BPG such that filling of two or more of the different breakpack goods containers 264 may be effected in parallel. In the example illustrated the lifts 310A, 310B moves the supply containers from induction conveyors 500A, 500C to induction conveyors 500B, where the bypass portion 500BB of induction conveyor 500B forms the common output/breakpack station input conveyor 510 (i.e., the breakpack station input conveyor 510 is a portion of the induction conveyor 500B); while in other aspects the induction conveyors 500A, 500C may merge with induction conveyor 500B with any suitable combination of ramps and multidirectional conveyor portions 370.

The lift(s) 310A, 310B are configured to deliver the supply containers 265 to a predetermined breakpack operation station 140 of the (stacked) breakpack modules 266. For example, the lifts 310A, 310B are configured to transfer supply containers 265 between the induction conveyors 500A, 500B, 500C for outputting the supply containers 265 to the breakpack station input conveyor 510. In one or more aspects, the lifts 310A, 310B are configured to sort the supply containers 265 for output from the lift(s) 310A, 310B in a predetermined order/sequence (e.g., so that the supply containers are delivered to the breakpack operation station 140 in the predetermined order, which predetermined order forms the superior optimized sequence of goods) in a manner substantially similar to that described in U.S. Pat. No. 10,442,622 issued on Oct. 15, 2019 and titled "Control System for Storage and Retrieval System," the disclosure of which is incorporated herein by reference in its entirety. For example, once the supply container(s) 265 is/are on a lift(s) 310A, 310B the supply container(s) 265 may be held (e.g., buffered) on the lift 310A, 310B until a predetermined time when the supply container(s) 265 are to be delivered to the breakpack operation station 140. In the example illustrated the lifts 310A, 310B are as circulating lifts; however, in other aspects the lifts may be any suitable lifts configured to (e.g., under control of any suitable controller, such as controller 120 and/or a dedicated lift controller) buffer any number of supply containers 265 in any suitable manner for delivery to the breakpack operation station 140 at a predetermined time. The predetermined order may correspond to a packing order of the breakpack goods BPG in the breakpack goods container 264, or any other suitable order corresponding to, for example, store plan rules. The store plan rules may incorporate, for example, an aisle layout in a customer's store or a family group of items corresponding to, for example, a particular location in the store where breakpack goods container 264 (or a pallet PAL on which the breakpack goods container 294 will be shipped) will be unloaded or a type of item. The predetermined order of the supply containers 265 to the breakpack operation station 140 (and ultimately the breakpack goods containers 294) may also correspond to a durability of the breakpack goods BPG. For example crushable breakpack goods BPG may be delivered to the breakpack operation station 140 (and ultimately the breakpack goods containers 294) after heavier more durable breakpack goods BPG are delivered to the breakpack operation station 140 (and ultimately the breakpack goods containers 294). Here, each lift 310A, 310B is common to and serves each breakpack operation station 140 of the (stacked) breakpack modules 266A-266C (see FIG. 3B).

Figure 20A:
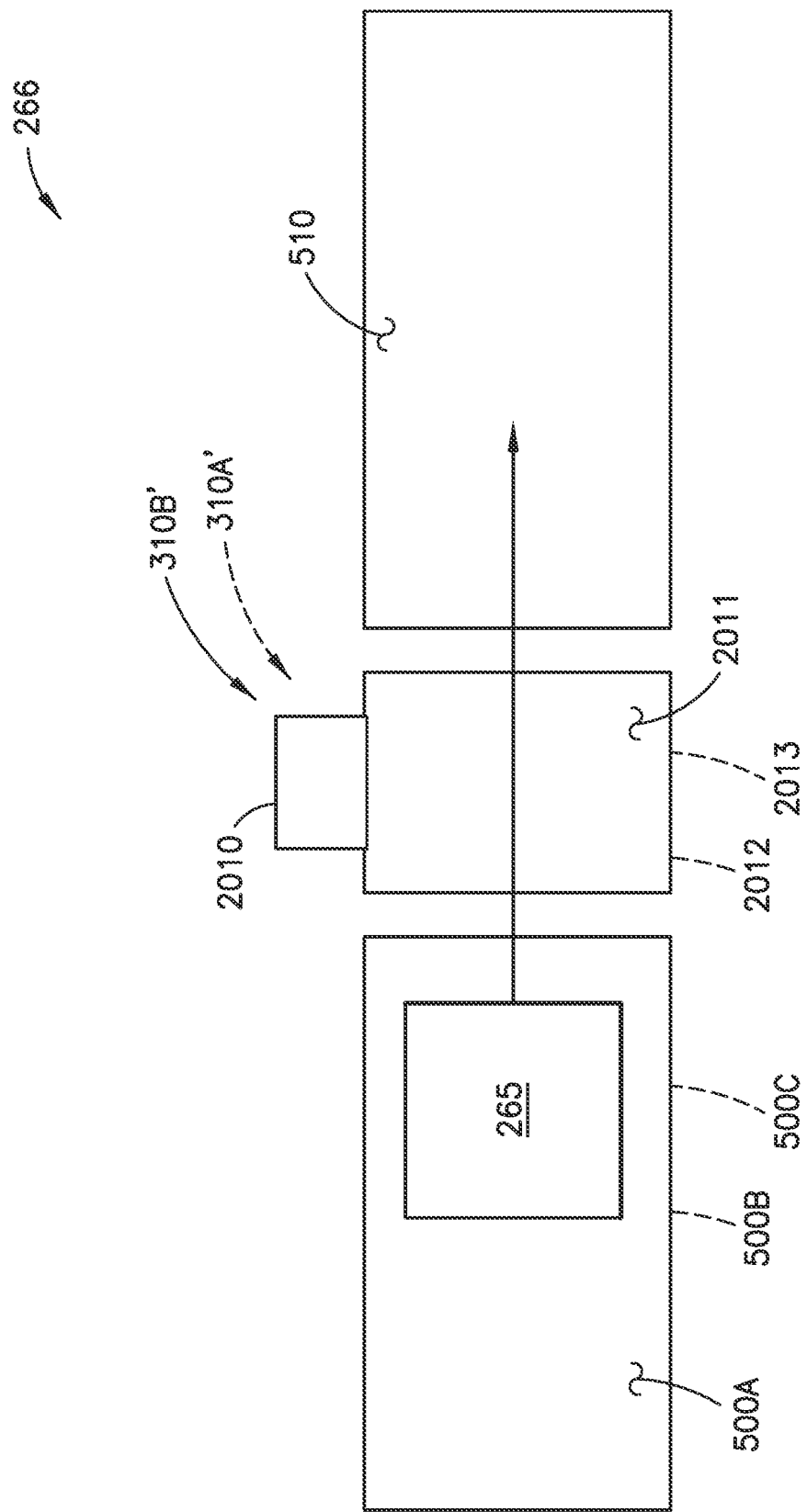
FIG. 20A is a schematic plan illustration of portions of the breakpack goods module of FIG. 2 in accordance with aspects of the disclosed embodiment.
Figure 20B:
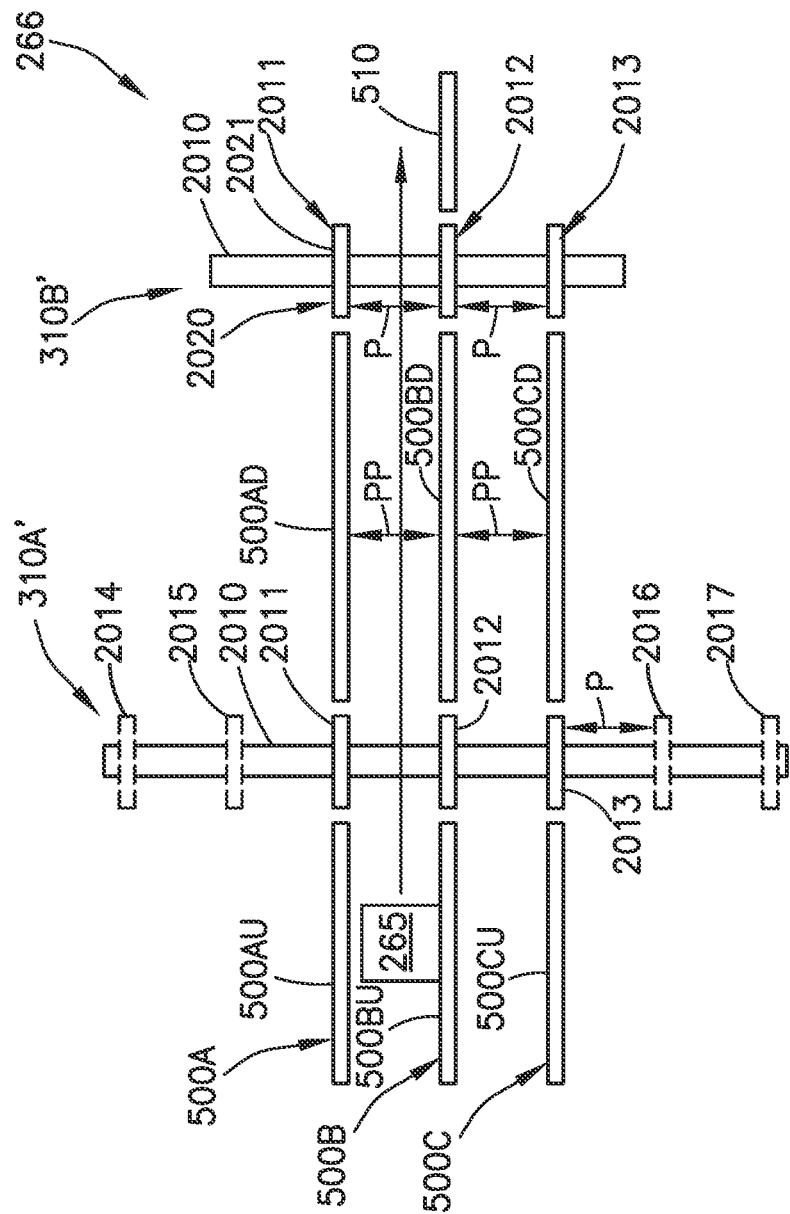
FIGS. 20B and 20C are schematic side illustrations of portions of the breakpack goods module of FIG. 2 in accordance with aspects of the disclosed embodiment.
Figure 20C:
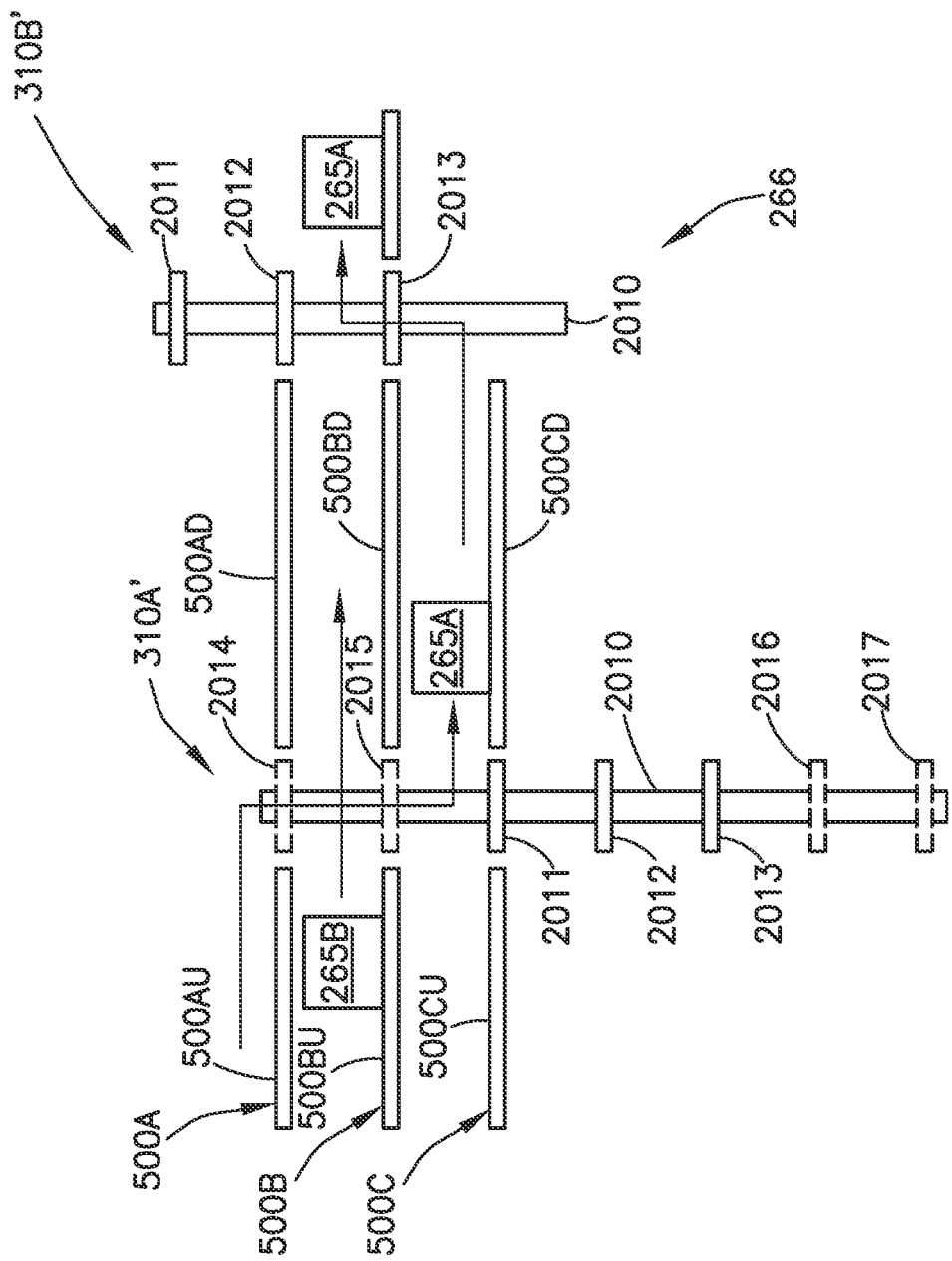

In another aspect, referring also to FIGS. 20A-20C, the breakpack module 266 includes linearly reciprocating pass-through lifts 310A', 310B' in place of the circulating lifts 310A, 310B. In still other aspects, the breakpack module 266 may include both the linearly reciprocating pass-through lifts 310A', 310B' and the circulating lifts 310A, 310B. Each of the lifts 310A', 310B' include a mast 2010 and at least three lift platforms 2011, 2012, 2013 that reciprocate along the mast 2010 under impetus of any suitable drive (e.g., chain drive, ball screw drive, etc.) The lift platforms 2011, 2012, 2013 may be spaced apart from one another along the length of the mast 2010 by a fixed pitch P (i.e., the pitch P does not change as the lift platforms 2011, 2012, 2013 reciprocate along the mast 2010) that is substantially equal to the pitch/spacing PP between the induction conveyors 500A, 500B, 500C. As will described herein, the at least three lift platforms 2011, 2012, 2013 provide for pass through of supply containers 265 "through" the lift 310A', 310B' while travelling along one or more of the induction conveyors 500A, 500B, 500C. Each lift platform 2011, 2012, 2013 of the lifts 310A', 310B' has, as a supply container seating surface, a conveyor 2021 (e.g., belt conveyor, roller bed conveyors, etc.) that is configured to, at least in part, pull supply containers 265 from an upstream portion of an induction conveyor 500A, 500B, 500C and push, at least in part, the supply containers 265 to a downstream portion of the induction conveyor 500A, 500B, 500C (or to the breakpack station input conveyor 510) as described herein.

In one or more aspects, each induction conveyor 500A, 500B, 500C includes an upstream portion 500AU, 500BU, 500CU and a downstream portion 500AD, 500BD, 500CD. Lift 310A' is disposed between the upstream portions 500AU, 500BU, 500CU and the downstream portions 500AD, 500BD, 500CD so as to transfer supply containers from the upstream portions 500AU, 500BU, 500CU to the downstream portions 500AD, 500BD, 500CD. Lift 310B' is disposed between the downstream from the downstream portions 500AD, 500BD, 500CD and the breakpack station input conveyor 510 so as to transfer supply containers 265 from the downstream portions 500AD, 500BD, 500CD to the breakpack station input conveyor 510.

As can be seen in FIG. 20A, the lifts 310A', 310B' are in-line with the induction conveyors 500A, 500B, 500C (which are stacked one above the other) so that supply containers 265 travelling along a respective one of the induction conveyors 500A, 500B, 500C are transferred to lift 310A' (which is located upstream from lift 310B' relative to the direction of travel of supply containers along the induction conveyors 500A, 500B, 500C) and/or lift 310B'. Positioning the lifts 310A', 310B' in-line with the induction conveyors provides for a more compact breakpack module 266 compared to providing the lifts alongside the induction conveyors. In this aspect, a supply container 265 may "bypass" the upstream lift 310A' by passing "through" the lift 310A'. For example, referring to FIGS. 20B and 20C, a supply container 265 travelling along induction conveyor 500B may be transferred substantially directly to the breakpack station input conveyor 510 where the lift platforms 2012 of the lifts 310A', 310B' operate as part of the induction conveyor 500B (e.g., the supply container 265 passes from the upstream portion 500BU to the lift platform 2012 of lift 310A', and then (with the lift platform held stationary, i.e., without any vertical movement of the lift platform) from the lift platform 2012 to the downstream portion 500BD. A similar pass-through transfer of the supply container 265 from the downstream portion 500BD to the breakpack station input conveyor 510 occurs with lift platform 2012 of lift 310B'. Here, as described above, the output of the induction conveyors 500A, 500B, 500C and an output of the lifts 310A', 310B' is a common output (e.g., the outputs are merged into the single breakpack station input conveyor 510—see FIGS. 20A, 20B, 20C) that delivers the supply containers 265 to the breakpack operation station 140 as will be described herein. In the example illustrated one or more of the lifts 310A', 310B' move the supply containers 265 from the upstream portions 500AU, 500BU, 500CU of the induction conveyors 500A, 500B, 500C to the downstream portion 500BD of the induction conveyor 500B (in the case of lift 310A') or to the breakpack station input conveyor 510 (in the case of lift 510B'); while in other aspects the induction conveyors 500A, 500C may merge with induction conveyor 500B with any suitable combination of ramps and multidirectional conveyor portions 370.

For example, referring to FIG. 20C, supply container 265B is placed, by a container bot 110, on input conveyor 500A. For exemplary purposes only, it is desired (such as for container sequencing in the breakpack station input sort 186 or any other suitable purpose) to transfer the supply container 265A from upstream portion 500AU of input conveyor 500A to the downstream portion 500CD of input conveyor 500C. Here the lift 310A' transfers (e.g., with platform 2011) the supply container 265A from upstream portion 500AU to downstream portion 500CD. From downstream portion 500CD the lift 310B' (with lift platform 2013) transfers the supply container 265A to the breakpack station input conveyor 510. Where the lift 310A' includes three lift platforms, the input conveyors 500A, 500B may be stopped during the transfer of the supply container 265A to the downstream portion 500CD of input conveyor 500C as there would be no lift platforms vertically aligned with the input conveyors 500A, 500B. As such, in some aspects, the lift 310A' includes additional pass-through lift platforms or diverts 2014, 2015, 2016, 2017 that serve as pass-through platforms for supply containers, such as supply container 265B, when at least one other supply container (e.g., supply container 265A) is being transferred between conveyor levels. It is noted that the pass-through lift platforms 2014, 2015, 2016, 2017 may generally not be used to transfer supply containers between conveyor levels, such transfer between conveyor levels may occur in an opportunistic manner. For example, if it is desired to transfer supply container 265B (illustrated in FIG. 20C) from upstream portion 500BU to downstream portion 500AD, the pass-through platform 2015 may be employed for such transfer rather than wait for lift platform 2011 to become aligned with input conveyor 500B after transfer of the supply container 265A to the downstream portion 500CD. In some aspects, the additional pass-through lift platforms 2014, 2015, 2016, 2017 may be employed to transfer supply containers 265 between stacked breakpack modules (e.g., see stacked breakpack modules 266A, 266B, 266C in a manner substantially similar to that described herein with respect to lifts 310A, 310B.

In a manner similar to that described above, the lift(s) 310A', 310B' are configured to deliver the supply containers 265 to a predetermined breakpack operation station 140 of the (stacked) breakpack modules 266. For example, the lifts 310A', 310B' are configured to transfer supply containers 265 between the induction conveyors 500A, 500B, 500C for outputting the supply containers 265 to the breakpack station input conveyor 510. In one or more aspects, the lifts 310A', 310B' and at least portions of the input conveyors 500A, 500B, 500C are configured to sort the supply containers 265 (e.g., the breakpack station input sort 186) for output to breakpack station input conveyor 510 in a predetermined order/sequence (e.g., so that the supply containers are delivered to the breakpack operation station 140 in the predetermined order, such as the superior optimized sequence of goods described herein). For example, downstream portions 500AD, 500BD, 500CD of the induction conveyors 500A, 500B, 500C may form buffers where supply containers are staged (or otherwise held) for a sequential transfer (e.g., according to any suitable sequence such as an order out load fill at the operator station 140, etc.) from the downstream portions 500AD, 500BD, 500CD to the breakpack station input conveyor 510 by the lift 310B'. In other aspects, a single lift 310B' may be provided such that the induction conveyors 500A, 500B, 500C (or at least portions thereof) operate (e.g., intermittently) to buffer supply cases 265 for delivery to the lift 310B' and then from the lift 310B' to the breakpack station input conveyor 510. The predetermined order forms the superior optimized sequence of goods and may correspond to a packing order of the breakpack goods BPG in the breakpack goods container 264, or any other suitable order corresponding to, for example, store plan rules. The store plan rules may incorporate, for example, an aisle layout in a customer's store or a family group of items corresponding to, for example, a particular location in the store where breakpack goods container 264 (or a pallet PAL on which the breakpack goods container 294 will be shipped) will be unloaded or a type of item. The predetermined order of the supply containers 265 to the breakpack operation station 140 (and ultimately the breakpack goods containers 294) may also correspond to a durability of the breakpack goods BPG. For example crushable breakpack goods BPG may be delivered to the breakpack operation station 140 (and ultimately the breakpack goods containers 294) after heavier more durable breakpack goods BPG are delivered to the breakpack operation station 140 (and ultimately the breakpack goods containers 294). Here, each lift 310A, 310B is common to and serves each breakpack operation station 140 of the (stacked) breakpack modules 266A-266C (see FIG. 3B).

With reference to FIGS. 3A, 6C, 7D, 8A and 8D, from the lifts 310A, 310B (or substantially directly from the container bot 110) the supply containers 265 travel along the breakpack station input conveyor 510 to the breakpack operation station 140. The breakpack operation station 140 is configured so that one or more breakpack goods BPG are unpacked from supply container(s) 265 at the breakpack operation station 140, and at least one goods bot 262 is configured so as to be loaded with the one or more breakpack goods BPG at the breakpack operation station 140 effecting the breakpack station output sort 187. Each breakpack operation station 140 has at least one operator station 801, 802, 803, 804 which may be a manual station (see FIGS. 8A and 8B—where breakpack goods BPG are picked and placed by a human operator HUM) or an automated station (see FIG. 7D—where breakpack goods are picked and placed by a robotic operator ROB). In the example illustrated there are four operator stations 801, 802, 803, 804; however, in other aspects there may be more or less than four operator stations. The picking and transfer of breakpack goods BPG at one operator station 801, 802, 803, 804 is orthogonal to (e.g., separate and distinct/independent from) the picking and transfer of breakpack goods BPG at the other operator stations 801, 802, 803, 804. For example, breakpack goods BPG picked at one operator station 801, 802, 803, 804 may be unrelated to (e.g., in goods type, in order, in pick sequence, etc.)/independent of breakpack goods BPG picked at the other operator stations 801, 802, 803, 804.

The supply containers 265 travel along the breakpack station input conveyor 510 to a predetermined operator station 801, 802, 803, 804, where a multidirectional conveyor portions 370 transfers the supply container 265 to lift 811 of the operator station 801, 802, 803, 804. The input conveyor 510 is any suitable type of conveyor such as, for example, a roller conveyors, continuous belt conveyor, etc. The conveyor is configured to position the supply container for human or robotic picking of breakpack goods BPG from the supply container 265. The lift 811 is any suitable lift configured to transfer supply containers 265 and/or breakpack goods containers 264 between conveyors (e.g., between conveyors arranged at different heights or the same height). The supply container 265 is transferred from the lift 811 to a pick conveyor 818 where the operator (human or robotic) opens the supply container and picks breakpack goods BPG for placement on a goods bot 262 and/or a breakpack goods container 264 (e.g., effecting the breakpack station output sort 187). The goods bot 262 is located in a queue 844 disposed on the goods deck 130DG adjacent the operator station 801, 802, 803, 804 and the breakpack goods container 264 is located on a place conveyor 817 of the operator station 801, 802, 803, 804 (the place conveyor is configured with a container queue 817Q and lift 817L so that as breakpack goods containers 264 are filled and removed from the operator station 801, 802, 803, 804 another breakpack goods container 264 is positioned for placement of breakpack goods in the other breakpack goods container 264.

The operator station 801, 802, 803, 804 includes any suitable sensors/tracking devices and/or instructional displays (in the case of a manual operator) to instruct and verify one or more of a predetermined product being located at the operator station for picking, placement of product(s) on the goods bot 262, placement of product(s) in breakpack goods containers 264, etc. The sensors/tracking devices and displays may be substantially similar to those described in U.S. Pat. No. 9,037,286 issued on May 19, 2015 and titled "Each Pick", the disclosure of which is incorporated herein by reference in its entirety. For example, any suitable display 899D is provided at the operator station 801, 802, 803, 804 to inform the (human) operator which product is to be picked, how many of that product are to be picked, and where to place the product (e.g., on the goods bot 262 or in a breakpack goods container 264). The operator station 801, 802, 803, 804 may also include a sensor suite 899 configured to verify a SKU of the supply container, placement of product, a quantity of product placed, an identify of a goods bot 262, and recordation of a breakpack goods container for tracking of the breakpack goods container within the automated storage and retrieval system 100.

The operator station 801, 802, 803, 804 includes a refuse conveyor 870 on which empty (to be discarded) supply containers 265 and other rubbish are placed for removal from the operator station.

With reference to FIGS. 3A, 5A, 5B, 6D, 8A, and 8B, supply containers 265 and/or partially filled breakpack goods containers 264 containing product to be placed back into storage or supply containers 265 and/or filled (e.g., filled to at least about 30% or to at least about 50% of capacity as described herein) breakpack goods containers 264 to be transferred to a transfer station TS or buffer station BS for output from the storage and retrieval system 100 (See FIG. 1A) are removed from the operator station 801, 802, 803, 804 at least in part by the pick conveyor 818. For example, the pick conveyor 818 transfers the supply containers 265 and/or breakpack goods containers 264 to the lift 811, which lift transfers the supply containers 265 and/or breakpack goods containers 264 to a container output conveyor 820. The container output conveyor 820 includes an operator station conveyor portion 820A that is disposed adjacent or at the operator station 801, 802, 803, 804, a lift 667, and stacked bot transfer conveyor portions 820B, 820C, 820D that correspond with the container bot travel surfaces 266RS1, 266RS2, 266RS3. The operator station conveyor portion 820A extends to lift 667 and is configured to transfer the supply containers 265 and/or breakpack goods containers 264 to the lift 667. The lift 667 is configured transfer the supply containers 265 and/or breakpack goods containers 264 to a predetermined one of the stacked bot transfer conveyor portions 820B, 820C, 820D where a container bot 110 disposed on a respective travel surfaces 266RS1, 266RS2, 266RS3 picks the supply containers 265 and/or breakpack goods containers 264 from the predetermined stacked conveyor portion 820B, 820C, 820D for transfer to storage or for output (effecting at least in part the breakpack output sort 189) from the automated storage and retrieval system 100.

As can be seen in FIGS. 2, 3A, 4, and 7B, the breakpack goods interface 263 has more than one breakpack goods interface locations or breakpack goods container stations 263L arrayed at least along a substantially whole edge of each of the goods deck level 130DG1, 130DG2, 130DG3 (e.g., of the goods deck 130DG) so as to form a putwall 263W, where each breakpack goods interface location 263L is configured to hold a respective breakpack goods container 264. As described herein, the putwall or multilevel breakpack goods container fill array 263W has multiple levels PWL, each level PWL having a container fill station area CFA, with breakpack goods interface locations 263L arrayed along the container fill station area CFA, and having a corresponding breakpack goods transfer deck 130DG1-130DG3 juxtaposed along the breakpack goods interface locations 263L of the container fill station area CFA. Here, the putwall 263W is different and distinct from an array of storage shelves 130SA of the storage structure 130. The putwall 263W provides at least two degrees of freedom (e.g., multi-axis diverts) for goods transfer to and from the breakpack goods interface locations 263L, e.g., the two-degrees of freedom being along a length of the goods transfer deck 130DG and one or more of across/between levels 130DG1-130DG3 and across/between gangs of levels 130DGL of the putwall 236W. Here, the putwall 263W includes more than one level of breakpack goods interface locations 263L that are distributed along each storage structure level 130L with a corresponding goods transfer deck 130DG at each level of the putwall 263W (e.g., each level of the putwall 263W corresponding to a respective level 130DG1-130DG3 of the gangs of levels 130DL). The transfer of goods between the different levels 130DG1-130DG3 and/or gangs of levels 130DGL may be effected by the goods bots 262 traversing ramps of the goods deck 130DG, by bot lifts 490 that transport goods bots 262 between the different levels 130DG1-130DG3 and/or gangs of levels 130DGL, break pack goods (BPG) lifts that transport breakpack goods PBG between the different levels where the goods bots 262 exchange the breakpack goods BPG with the breakpack goods lifts, and/or in any other suitable manner.

As the container bot 110 transfers one or more (supply) containers to a breakpack operator station 140, the container bot 110 may opportunistically (i.e., in the sense that the container bot 110 was not scheduled to retrieve the breakpack goods container 264 but happened to travelling by the breakpack goods container 264, an in the interest of efficiency the control server 120 may send commands to the container bot 110 to opportunistically retrieve the breakpack goods container 264) pick a breakpack goods container 264 (designated for transfer to storage or an outbound lift 150B) from a respect breakpack goods interface location 263L. In other aspects, a breakpack goods container 264 in storage may be located in the same picking aisle 130A as a supply container 265, where both the breakpack goods container 264 and the supply container 265 are designated (e.g., by control server 120) for transfer to the same breakpack module 266. A container bot 110 previously commanded to pick supply container 265 may be commanded by control server 120 to opportunistically pick breakpack goods container 264 while travelling along the same picking aisle (such as where the breakpack goods container 264 was designated for transfer after initial commands were issued to the container bot 110). Here the container bot 110 may travel with both the breakpack goods container 264 and the supply container 265 and transfer the supply container 265 to an breakpack operation station 140 of the breakpack module 266 and then transfer the breakpack goods container 264 to a predetermined breakpack goods interface location 263L of the same breakpack module 266.

Referring now to FIGS. 1A, 1C, 2, 3A, 3B, 4, 6A, 6B, 7A, 7B, 7C, 7D, 8A, and 8B, each breakpack operation station 140 is coupled to a respective goods deck 130DG. The breakpack goods transfer deck 130DG is separate and distinct from the travel loop 233BP formed by the container bot travel surface 266RS, and has the breakpack goods interface 263 coupling respective edges of the container autonomous transport travel loop 233BP of the container bot travel surface 266RS and the travel loop(s) DG1L, DG2L, DG3L (see FIG. 4) of the goods transfer deck 130DG described herein. Each goods deck level 130DG1, 130DG2, 130DG3 at each level of the putwall 263W is separate and distinct from each container bot transfer deck 130EXT coupled to a respective breakpack operation station 140. Here, the breakpack goods transfer deck 130DG is configured so that at least one goods bot 262 traverses the breakpack goods transfer deck 130DG and transports breakpack goods BPG from the breakpack operation station 140 into a corresponding breakpack goods container 264 for transport by at least one container bot 110 on the container transfer deck 130DC. The goods bot(s) 262 is/are arranged or otherwise configured for transporting, along the breakpack goods autonomous transport travel loops DG1L, DG2L, DG3L formed by the goods transfer deck 130DG, one or more breakpack goods BPG (unpacked from the supply container) between the breakpack operation station 140 and the breakpack goods interface 263. The container bot(s) 110 is also configured to autonomously pick (e.g., from an operator station 801, 802, 803, 804 as described herein) and place the breakpack goods containers 264 at the breakpack goods interface 263 as described herein.

As can be seen in, for example, FIG. 1B, more than one breakpack module 266 may be provided in the automated storage and retrieval system 100, where each breakpack module includes a respective putwall 263W. Here, a common portion of the multilevel container storage array (e.g., storage structure 130) and the transport area (e.g., at least the picking aisles 130A and container transfer deck 130DC) are communicably connected, via one or more of the breakpack operation station 140, to more than one of the putwall 263W. Each putwall 263W is independent of each other putwall 263W. Each putwall 263W is filled (e.g., with containers and/or breakpack goods) independent of each other putwall 263W. As a further example, each putwall 263W effects independent breakpack goods container 264 output, where each putwall 263W is accessed by the container bot(s) 110, and the independent breakpack goods container 264 output of the respective putwall 263W is independent of the breakpack goods container 264 output of each other putwall 263W so as to provide output breakpack goods containers 264 that are filled orthogonal to (e.g., separate and distinct/independent of) each other. As an example, orthogonal filling of breakpack containers 264 includes filling breakpack containers 264 with breakpack goods BPG in an order defined by the breakpack goods container 264 such that the filling of the breakpack container 264 is completed without interfacing with any other input to (e.g., to other breakpack containers 264) or outputs from the putwall 263W. Here, breakpack goods BPG for any given order are grouped with each other to form an independent batch of breakpack goods defined by a breakpack container 263 in which the grouped breakpack goods for that given order are placed for delivery directly to a customer (e.g., commercial customer or e-commerce customer) or for delivery to a distribution center). Each independent putwall 263W has different breakpack goods container stations or interface locations 263L, each disposed for holding a different respective breakpack goods container 264, independently filled relative to each other breakpack goods container 264 of each other independent putwall 263W, so that the filled different respective breakpack goods container(s) 264 defines an independent breakpack goods container output of the independent putwall 263W.

In one aspect, the goods transfer deck 130DG facilitates a decanting process where goods are picked from one container (such as a supply container 265 or any other suitable standardized container) at the breakpack operation station 140 and consolidated with goods (generally of the same type) in another (e.g., outbound as noted below) supply container 265 or standardized container at the breakpack goods interface 263, where the other supply container 265 or standardized container is returned to storage. Generally, supply containers 265 inbound to the breakpack modules 266 are picked until empty but only some (not all) of the goods from the inbound supply container may be decanted. Here, what may be referred to as outbound (i.e., outbound from the breakpack modules 266) supply containers 265 or standardized containers (such as totes, trays, etc.) may also be placed on the breakpack goods interface 263 by the container bot(s) 110 in a manner similar to that described herein for the breakpack goods containers 264 to facilitate the decanting process. In the decanting process, goods are removed from a supply container 265 (which may be an original product/good(s) case packaging) at the breakpack operation station 140 and consolidated into the outbound supply container(s) 265 or standardized container (e.g., having the same type of goods as those being removed at the breakpack operation station 140) located on the breakpack goods interface 263. Consolidation of goods having the same type from multiple supply containers 265 into a lesser number of supply containers 265 (and then returned to storage by the container bot(s) 110) may increase the storage density of the automated storage and retrieval system 100 as the supply containers 265 stored in the storage racks can be maintained in a substantially "full" state (rather than having multiple containers that are less than full with the same type of goods therein). In some aspects, the decanted goods (in the standardized container or outbound supply container) are output from the storage and retrieval system 100 via the lifts 150 to be palletized as part of a pallet load (such as at output station 160UT) or to be shipped individually (such as at output station 160EC).

The goods bots 262 may be any suitable type of autonomously guided bot with a payload configured for holding breakpack goods, not product containers (e.g., case units, pickfaces, etc.). The goods bots 262 are configured to traverse and the goods deck 130DG and transport breakpack goods BPG along the corresponding/respective goods deck 130DG, and between the goods deck 130DG at different levels (e.g., of the ganged levels 130DGL) of the putwall 263W, to each breakpack goods interface location 263L at each level of the putwall 263W. Also referring to FIG. 25, the goods bots 262 are each configured to effect pose determination and localization of the goods bot 262 within the breakpack module 266 via one or more, alone or in combination, of at least one of wheel odometry 2590, dead reckoning 2591, distance measurement and detection of fiducials with electromagnetic distance sensors or vision 2592, with two-dimensional or three-dimensional cameras 2593, informing vehicle pose and localization both longitudinally along a pathway (e.g., such as along a goods deck 130DG) and in a Z direction raising or lowering the at least one autonomous guided breakpack goods transport vehicle between levels and effect free transition of vehicle travel, at a substantially constant rate of travel in the transition, between the breakpack goods transfer deck 130DG1-130DG3 to at least one interlevel divert pathway (e.g., such as the ramps and lifts of the breakpack module 266 described herein) and vice versa. Each of the goods bots 262 has a payload hold/support 262PS configured dissimilar from a payload hold of the container bot 110. The goods bot 262, as described herein, is configured to output, from the respective payload support 262PS, the breakpack goods unit payload BPGPL (including at least one breakpack good BPG—see FIGS. 7A and 7B), transported thereon, into the breakpack goods container 264 at each breakpack goods interface location 263L at each level of the putwall 263W. The goods bots 262 are configured to autonomously travel along and across the breakpack goods autonomous transport travel loop(s) DG1L, DG2L, DG3L formed by the goods deck 130DG. The goods bots 262 are configured so as to automatically unload one or more breakpack goods BPG (retrieved from the breakpack operation station 140) from the goods bot 262 to breakpack goods containers 264 at the breakpack goods interface 263.

Figure 22:
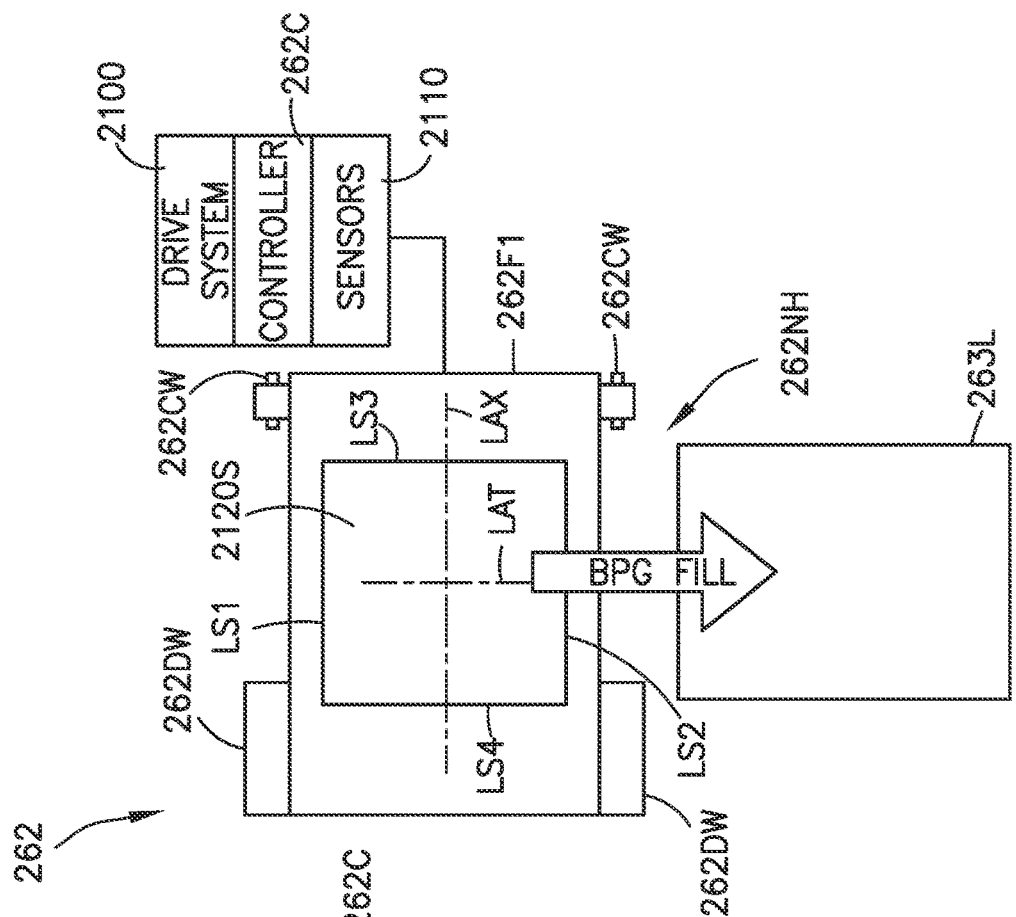
FIG. 22 is a schematic illustration of a non-holonomic goods bot having a symmetric payload hold configuration in accordance with aspects of the disclosed embodiment.
Figure 21:
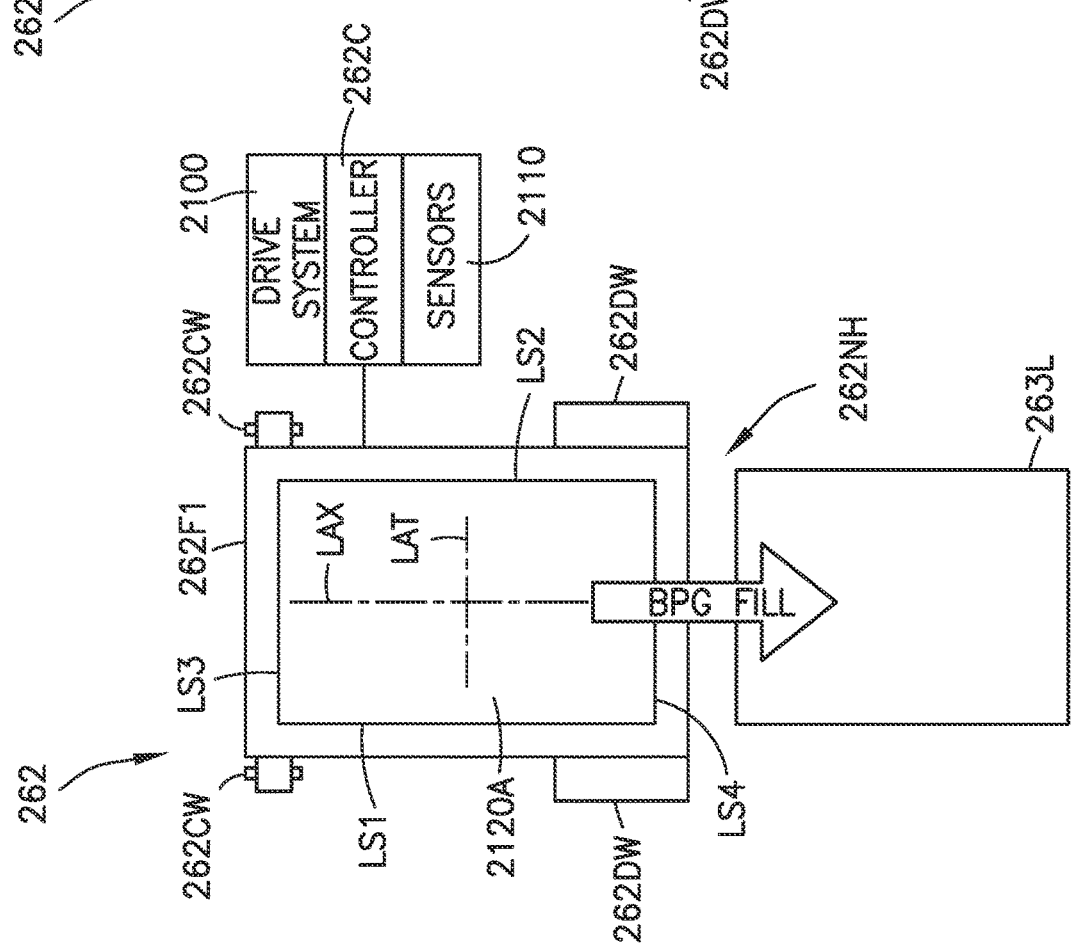
FIG. 21 is a schematic illustration of a non-holonomic goods bot having an asymmetric payload hold configuration in accordance with aspects of the disclosed embodiment.

In one or more aspects, referring also to FIGS. 21 and 22, the goods bots 262 may be non-holonomic autonomous vehicles or non-holonomic goods bots 262NH substantially similar to the container bots 110, but as noted above, with a payload hold configured dissimilar from a payload hold of the container bot 110. For example, the goods bots 262 may each include a frame or chassis 262F1, a drive system 2100, a controller 262C, and one or more sensors 2110. The drive system 2100 includes any suitable drive motor(s) configured to drive a pair of drive wheels 262DW disposed at or adjacent one end of the chassis 262F1. The drive wheels 262DW may be driven at the same rotational speed (e.g., for substantially straight line travel of a goods bot 262), at different speeds (e.g., for turning of the goods bot 262 along an arcuate travel path), and differentially in opposite directions (e.g., for pivoting the goods bot 262 about a pivot axis located substantially midway between the drive wheels 262DW). One or more caster wheels 262CW are located at another end of the chassis 262F1, opposite the drive wheels 262DW.

The chassis 262F1 includes any suitable payload hold 2120A, 2120S (integral to or coupled to the chassis 262F1 in any suitable manner) configured to hold one or more breakpack goods BPG. The payload hold 2120A, 2021S is an open container, bin, tray, or other suitable structure configured to contain/hold breakpack goods BPG for transport by the goods bot 262, where the payload hold 2120A, 2020S lacks grippers, justification, etc. that would otherwise grip and prevent movement of the breakpack goods BPG within the payload hold 2120A, 2120S.

As an example (see FIG. 21), the payload hold 2120A is an asymmetric payload hold that is longitudinally extended along the longitudinal axis LAX of the chassis 262F (e.g., the longitudinally extending sides LS1, LS2 of the payload hold 2120A are longer than the laterally extending sides LS3, LS4 of the payload hold 2120A). In this example, breakpack goods BPG may be discharged from the payload hold 2120A (e.g., to a container disposed at a breakpack goods interface location 263L) along the longitudinal direction/axis LAX of the goods bot 262 (see also FIG. 25). In other aspects, breakpack goods BPG may be discharged from the payload hold 2120A (e.g., to a container disposed at a breakpack goods interface location 263L) in a lateral direction/axis LAT of the goods bot 262 (see also FIG. 25). As another example (see FIG. 22), the payload hold 2120S is a symmetric payload hold where the longitudinally extending sides LS1, LS2 of the payload hold 2120A are substantially the same length as the laterally extending sides LS3, LS4 of the payload hold 2120A. In this example, breakpack goods BPG may be discharged from the payload hold 2120S (e.g., to a container disposed at a breakpack goods interface location 263L) along the lateral direction/axis LAT of the goods bot 262 (see also FIG. 25). In other aspects, breakpack goods BPG may be discharged from the payload hold 2120S (e.g., to a container disposed at a breakpack goods interface location 263L) in a longitudinal direction/axis LAX of the goods bot 262 (see also FIG. 25).

The sensors 2110 include any suitable navigation and/or object detection sensors that facilitate, under control of the controller 262C, traverse of the goods bot 262 along the goods deck 130DG and discharge of breakpack goods BPG at the breakpack goods interface locations 263L. The sensors 2110 may effect navigation of the respective goods bot 262 along the goods deck 130DG by employing/being configured to detect any suitable navigation aids 2510 (see FIG. 25) including but not limited to one or more of fiducials located on the storage and retrieval system 100 structure, guide tape disposed on the goods deck 130DG, indoor GPS, navigation beacons, and/or any other suitable navigation aids.

Figure 24:
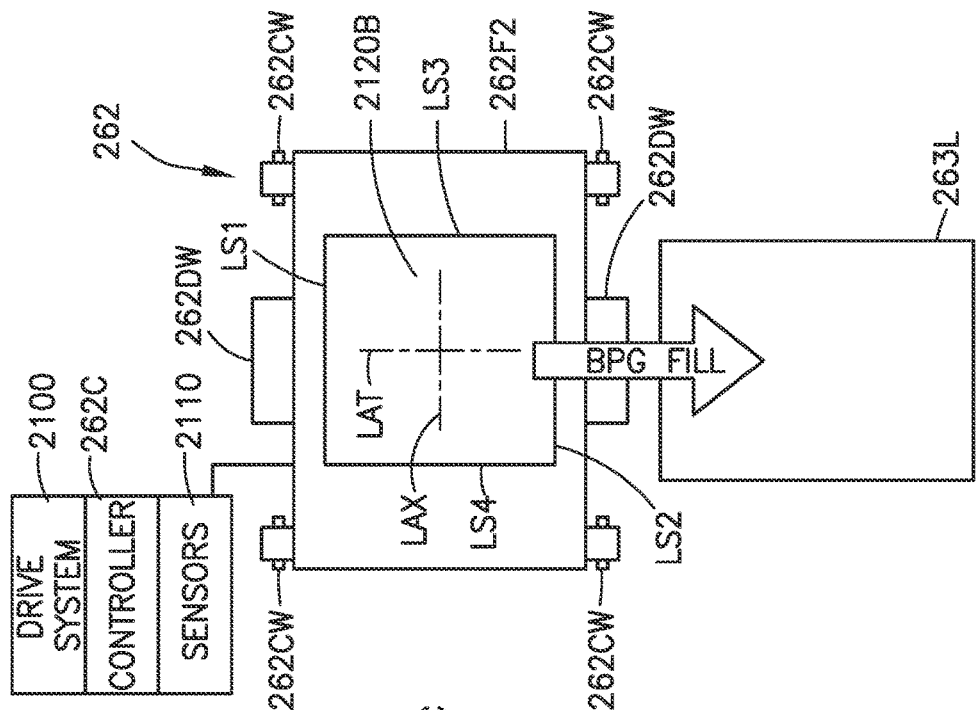
FIG. 24 is a schematic illustration of an holonomic goods bot having a symmetric payload hold configuration in accordance with aspects of the disclosed embodiment.
Figure 23:
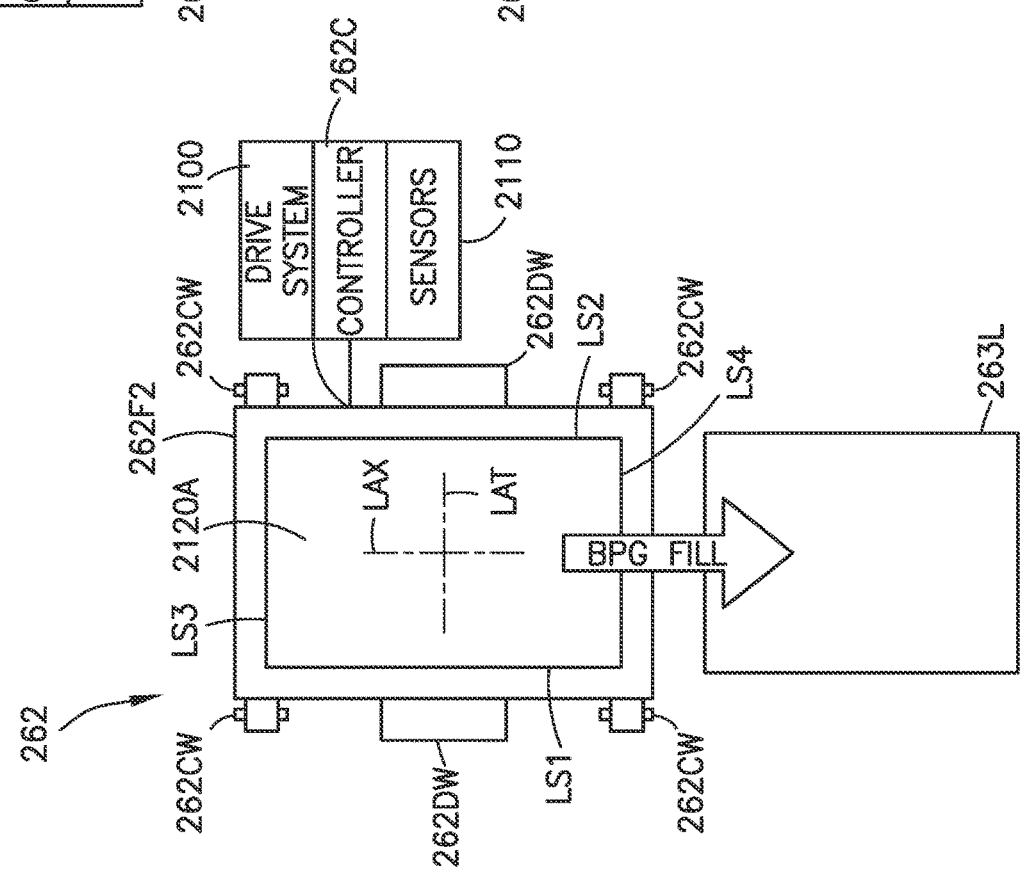
FIG. 23 is a schematic illustration of an holonomic goods bot having an asymmetric payload hold configuration in accordance with aspects of the disclosed embodiment.

In one or more aspects, referring also to FIGS. 23 and 24, the goods bots 262 may be holonomic autonomous vehicles or holonomic goods bots 262H with, as noted above, a payload hold configured dissimilar from a payload hold of the container bot 110. For example, the goods bots 262 may each include a frame or chassis 262F2, a drive system 2100, a controller 262C, and one or more sensors 2110. The drive system 2100 includes any suitable drive motor(s) configured to drive a pair of drive wheels 262DW disposed substantially midway between the longitudinal ends of the chassis 262F1. The drive wheels 262DW may be driven at the same rotational speed (e.g., for substantially straight line travel of a goods bot 262), at different speeds (e.g., for turning of the goods bot 262 along an arcuate travel path), and differentially in opposite directions (e.g., for pivoting the goods bot 262 about a pivot axis located substantially at a center of the chassis 262F2 between the drive wheels 262DW). One or more caster wheels 262CW are located at each longitudinal end of the chassis 262F2.

The chassis 262F2 includes any suitable payload hold 2120A, 2120S (integral to or coupled to the chassis 262F1 in any suitable manner) configured to hold one or more breakpack goods BPG. The payload hold 2120A, 2021S is an open container, bin, tray, or other suitable structure configured to contain/hold breakpack goods BPG for transport by the goods bot 262, where the payload hold 2120A, 2020S lacks grippers, justification, etc. that would otherwise grip and prevent movement of the breakpack goods BPG within the payload hold 2120A, 2120S.

As an example (see FIG. 23), the payload hold 2120A is an asymmetric payload hold that is longitudinally extended along the longitudinal axis LAX of the chassis 262F (e.g., the longitudinally extending sides LS1, LS2 of the payload hold 2120A are longer than the laterally extending sides LS3, LS4 of the payload hold 2120A). In this example, breakpack goods BPG may be discharged from the payload hold 2120A (e.g., to a container disposed at a breakpack goods interface location 263L) along the longitudinal direction/axis LAX of the goods bot 262 (see also FIG. 25). In other aspects, breakpack goods BPG may be discharged from the payload hold 2120A (e.g., to a container disposed at a breakpack goods interface location 263L) in a lateral direction/axis LAT of the goods bot 262 (see also FIG. 25). As another example (see FIG. 24), the payload hold 2120S is a symmetric payload hold where the longitudinally extending sides LS1, LS2 of the payload hold 2120A are substantially the same length as the laterally extending sides LS3, LS4 of the payload hold 2120A. In this example, breakpack goods BPG may be discharged from the payload hold 2120S (e.g., to a container disposed at a breakpack goods interface location 263L) along the lateral direction/axis LAT of the goods bot 262 (see also FIG. 25). In other aspects, breakpack goods BPG may be discharged from the payload hold 2120S (e.g., to a container disposed at a breakpack goods interface location 263L) in a longitudinal direction/axis LAX of the goods bot 262 (see also FIG. 25).

The sensors 2110 include any suitable navigation and/or object detection sensors that facilitate, under control of the controller 262C, traverse of the goods bot 262 along the goods deck 130DG and discharge of breakpack goods BPG at the breakpack goods interface locations 263L. The sensors 2110 may effect navigation of the respective goods bot 262 along the goods deck 130DG by employing/being configured to detect any suitable navigation aids 2510 (see FIG. 25) including but not limited to one or more of fiducials located on the storage and retrieval system 100 structure, guide tape disposed on the goods deck 130DG, indoor GPS, navigation beacons, and/or any other suitable navigation aids.

The goods bots 262 (either as a non-holonomic goods bot 262NH or a holonomic goods bot 262H) are configured with the asymmetric payload hold 2120A or the symmetric payload hold depending on a configuration of the breakpack goods containers 264 with which the goods bots 262 interface. For example, the orientation (e.g., longitudinal discharge of breakpack goods BPG or lateral discharge of breakpack goods BPG) and/or the shape (symmetric or asymmetric) of the payload hold 2120A, 2120S is matched with the orientation/shape of the breakpack goods containers 264 so as to maximize a load fill of the breakpack goods containers 264. As described herein, the load fill of a breakpack goods container may be considered maximized when the breakpack goods BPG therein occupy at least about 30% of the container volume or at least about 50% of the container volume. For example, as can be seen in FIG. 25, on filling of the breakpack goods containers 264, the goods bot 262 orients the payload hold, in particular the asymmetric payload hold 2120A, so that the orientation of the payload hold 2120A matches the orientation of the breakpack goods container 264 to be filled. As can be seen in FIG. 25, where the longitudinally extending sides 264S1, 264S2 of a longitudinally extended breakpack goods container 264 extend away from the side of the goods deck 130DG, the goods bot 262 may orient itself on the goods deck 130DG substantially transverse to the travel lanes L1, L2, L3 so as to align the longitudinally extending sides LS1, LS2 of the payload hold 2120A with the longitudinally extending sides 264S1, 264S2 of the breakpack goods container 264 for a longitudinal discharge of the breakpack goods PBG into the breakpack goods container 264. As can also be seen in FIG. 25, where the longitudinally extending sides 264S1, 264S2 of a longitudinally extended breakpack goods container 264 extend along the side of the goods deck 130DG, the goods bot 262 may orient itself on the goods deck 130DG substantially along one of the travel lanes L1, L2, L3 so as to align the longitudinally extending sides LS1, LS2 of the payload hold 2120A with the longitudinally extending sides 264S1, 264S2 of the breakpack goods container 264 for a lateral discharge of the breakpack goods PBG into the breakpack goods container 264.

The automated storage and retrieval system 100 may include non-holonomic goods bots, holonomic goods bots, or both non-holonomic goods bots and holonomic goods bots that traverse the goods deck 130DG. Suitable examples of goods bots 262 are those produced by Tompkins International of Raleigh, N.C. (United States—see for example, U.S. Pat. No. 10,248,112 issued on Apr. 2, 2019), Pegasus drive robots available from Amazon.com Inc., of Seattle Wash. (United States), and the mobile robots (such as the Latent Mobile Robot) available from Hikrobot Technology Co., Ltd. of Hangzhou, China. Other suitable examples of goods bots 262 and container bots 110 are described in U.S. patent application Ser. No. 17/358,383 filed on Jun. 25, 2021, which is a non-provisional of U.S. provisional patent application No. 63/044,721 filed on Jun. 26, 2020 and both titled "Warehousing System for Storing and Retrieving Goods In Containers," the disclosures of which are incorporated herein by reference in their entireties.

As described herein the breakpack goods autonomous transport travel loop(s) DG1L, DG2L, DG3L, formed by the goods deck 130DG, provide the goods bots 262 with random access to any and each of the breakpack goods interface locations 263L of the breakpack goods interface 263 on any and each goods deck level 130DG1, 130DG2, 130DG3 of a respective gang of goods deck levels 130DGL in which the goods bots 262 operate.

Each goods deck 130DG includes a gang of goods deck levels 130DGL. For example, each goods deck 130DG (there may be more than one goods deck stacked one above the other—see FIG. 3B) includes an operator station deck level 130DG0 and a gang of goods deck levels 130DGL (which in the example illustrated includes goods deck levels 130DG1, 130DG2, 130DG3 which are stacked substantially one above the other). Here, the operator station deck level 130DG0 is common to each goods deck level 130DG1, 130DG2, 130DG3 of the gang of goods deck levels 130DGL where the goods bots 262 navigate and/or move product on the multiple goods deck levels 130DG0, 130DG1, 130DG2, 130DG3 as part of a transport task (e.g., where the task is a real time routing of the goods bots 262 between the multiple goods deck levels 130DG0, 130DG1, 130DG2, 130DG3 to pick breakpack goods BPG, place breakpack goods BPG, and return to the operator station 801, 802, 803, 804 or other suitable location such as a goods bot induction/removal station described herein).

In the aspects of the disclosed embodiment each gang of goods deck levels 130DGL includes three goods deck levels 130DG1, 130DG2, 13DG3 stacked substantially one above the other, but in other aspects may include any suitable number of goods deck levels in the gang of goods deck levels 130DGL. Breakpack goods BPG (FIG. 7B) are transferred from the breakpack operation station 140 to a goods bot 262 of the breakpack module 266 for transport to a breakpack goods container 264 on one of the goods deck levels 130DG1, 130DG2, 130DG3 of the gang of goods deck levels 130DGL.

Figure 4:
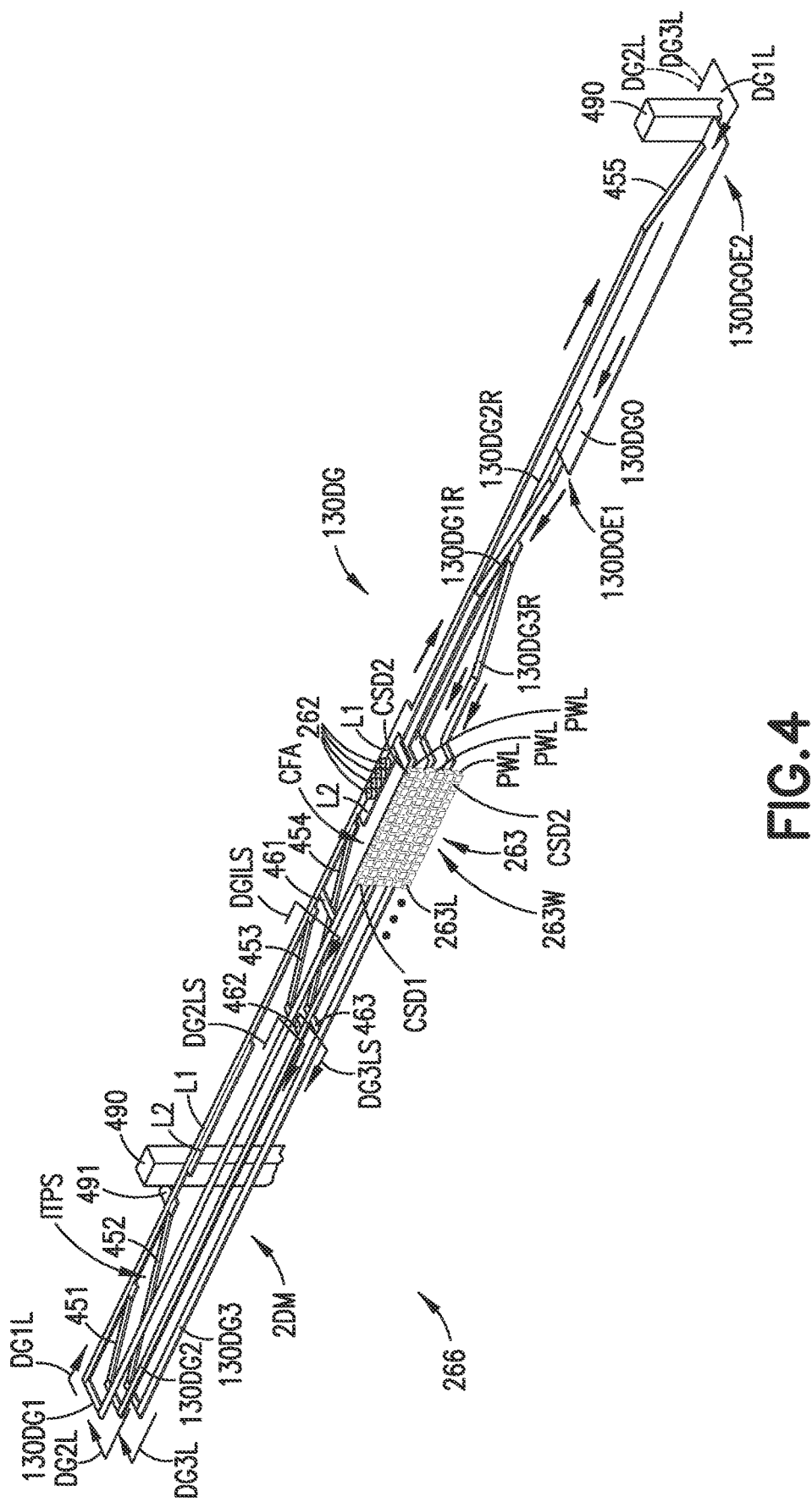
FIG. 4 is a schematic perspective illustration of a portion of the breakpack goods module of FIG. 2 in accordance with aspects of the disclosed embodiment.
Figure 5C:
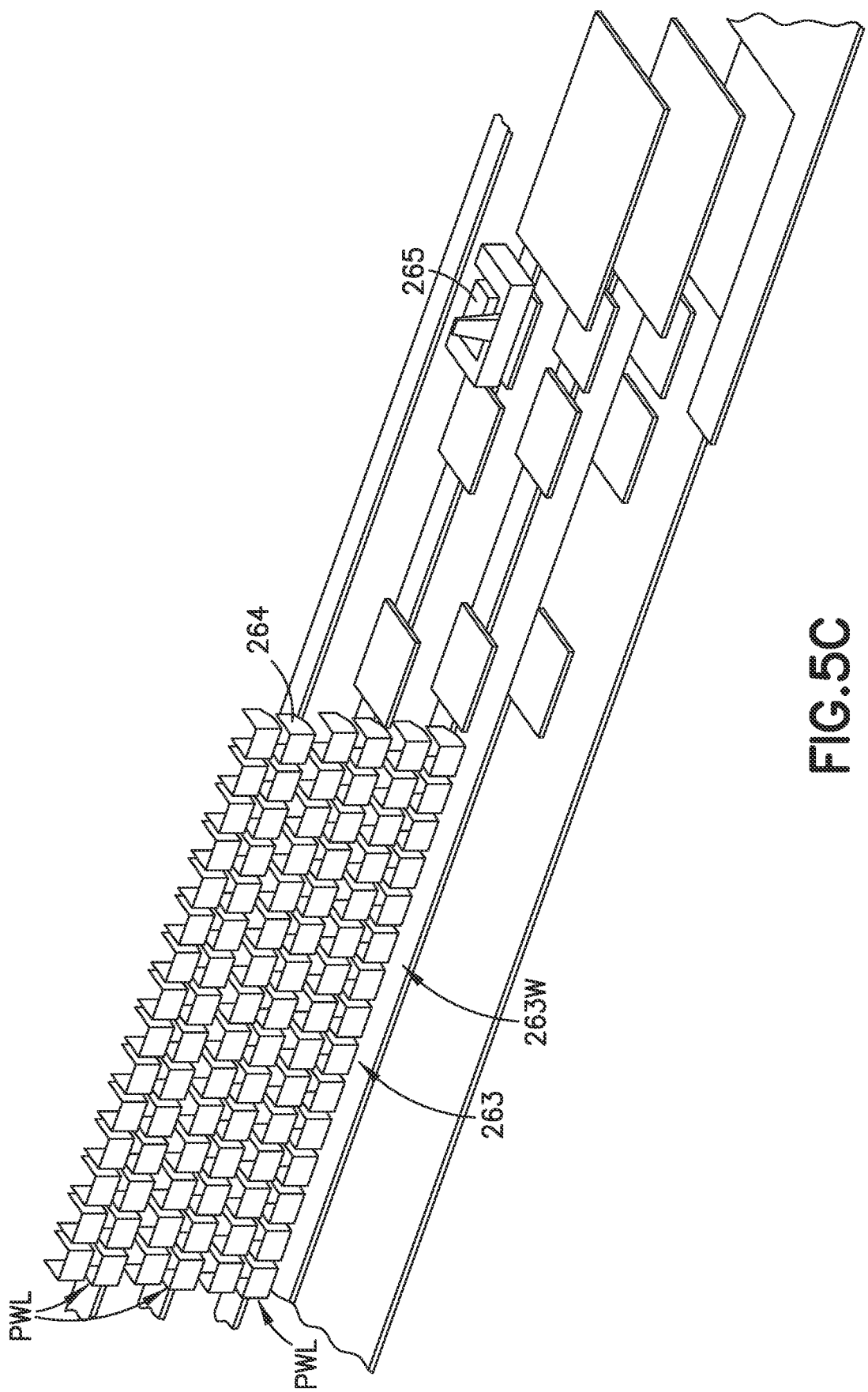

As can be seen in FIG. 4 each of the goods deck levels 130DG1, 130DG2, 130DG3 in combination with the operator station deck level 130DG0 forms a breakpack goods autonomous travel loop DG1L, DG2L, DG3L (e.g., the operator station deck level 130DG0 forms a loop portion that is common to/shared by each of the breakpack goods autonomous travel loops DG1L, DG2L, DG3L). The goods bots 262 circulate along the breakpack goods autonomous travel loops DG1L, DG2L, DG3L between the breakpack goods interface 263 (e.g., at the different goods deck levels 130DG1, 130DG2, 130DG3) and the operator stations 801, 802, 803, 804.

In the example illustrated, the operator station deck level 130DG0 is at the same level (i.e., substantially in the same plane) as the goods deck level 130DG2 (where deck transition 130DG2R is provided between goods deck level 130DG2 and operator station deck level 130DG0); but in other aspects, the operator station deck level 130DG0 may be at the same level with any one of the goods deck levels 130DG1, 130DG2, 130DG3. In still other aspects, ramps may be provided between the operator station deck level 130DG0 and each of the goods deck levels 130DG1, 130DG2, 130DG3 (e.g., the operator station deck level may not be coplanar with any of the goods deck levels). In the example illustrated, ramps 130DG1R, 130DG3R are provided between the operator station deck level 130DG0 and the goods deck levels 130DG1, 130DG3. While ramps 130DG1R, 130DG3R are illustrated any suitable lift, escalator, elevator, ladder, etc. may be provided and which the goods bots 262 are configured to traverse/climb for transitioning between the operator station deck level 130DG0 and the goods deck levels 130DG1, 130DG3).

The ramps 130DG1R, 130DG3R and the deck transition 130DG2R extend from an output end 130DG0E1 of the operator station deck level 130DG0. One or more of the goods deck levels 130DG1, 130DG2, 130DG3 extends to return to an input end 130DG0E2 of the operator station deck level 130DG0. In the example illustrated the goods deck level 130DG1 includes a return ramp 455 in communication with the input end 130DG0E2 of the operator station deck level 130DG0. The return ramp 455 is common to each of the goods deck levels 130DG1, 130DG2, 130DG3, where ramps (described below) are provided from goods deck levels 130DG2, 130DG3 to goods deck level 130DG1 so that goods bots 262 from goods deck levels 130DG2, 130DG3 access the return ramp 455.

In accordance with the disclosed embodiment, the goods bots 262 need not travel to the operator station deck level 130DG0 to transition between the goods deck levels 130DG1, 130DG2, 130DG3. For example, one or more ramps 451, 452, 453, 454 are provided between the goods deck levels 130DG1, 130DG2, 130DG3 so that the goods bots 262 can transition substantially directly between the goods deck levels 130DG1, 130DG2, 130DG3 without traversing the operator station deck level 130DG0. In some aspects, goods bots 262 bi-directionally travel on the one or more ramps 451, 452, 453, 454 to transition between the different goods deck levels 130DG1, 130DG2, 130DG3; while in other aspects travel along the one or more ramps 451, 452, 453, 454 may be uni-directional so that goods bots 262 transition from one or more of goods deck levels 130DG2, 130DG3 to goods deck level 130DG1 for return to the operator stations 801, 802, 803, 804.

One or more shunts 461, 462, 463 are provided on one or more (or each) of the goods deck levels 130DG1, 130DG2, 130DG3. The shunts 461, 462, 463 provide a transition between substantially opposite sides of the respective breakpack goods autonomous travel loop DG1L, DG2L, DG3L so as to effectively reduce a size of the breakpack goods autonomous travel loop traveled by the goods bots 262. For example, shunt 461 on goods deck level 130DG1 forms shunted breakpack goods autonomous travel loop DG1LS that effects circulation of goods bots 262 on goods deck level 130DG1 without goods bot traverse on the operator station deck level 130DG0. Shunt 462 on goods deck level 130DG2 forms shunted breakpack goods autonomous travel loop DG2LS that effects circulation of goods bots 262 on goods deck level 130DG2 without goods bot traverse on the operator station deck level 130DG0. Shunt 463 on goods deck level 130DG3 forms shunted breakpack goods autonomous travel loop DG3LS that effects circulation of goods bots 262 on goods deck level 130DG3 without goods bot traverse on the operator station deck level 130DG0. While one shunt is illustrated on each of the goods deck levels 130DG1, 130DG2, 130DG3 for exemplary purposes only, there may be more than one shunt on each of the goods deck levels 130DG1, 130DG2, 130DG3 to form any suitable number of shunted breakpack goods autonomous travel loops on the respective goods deck level 130DG1, 130DG2, 130DG3.

It is noted that at least a portion of the lanes of the travel loops DG1L, DG2L, DG3L, DG1LS, DG2LS, DG3LS are separated from each other by a physical barrier. In the example shown, while the operator station deck level 130DG0 may have multiple travel lanes similar to those of the containers deck 130D, the ramps 130DG1R, 130DG3R, 451, 452, 453, deck transition 130DG2R, and the goods deck levels 130DG1, 130DG2, 130DG3 have single lane travel surfaces (e.g., forming at least a portion of a travel loop) that are physically separated so as to prevent a goods bot 262 from moving from one lane to another (except at predetermined locations such as the shunts described herein, where the shunts also provide a respective single lane of bot travel). Here the physical separation is provided by an "air gap" at the center of the travel loops but in other aspects the physical separation may be provided by walls or other suitable structural barrier.

In other aspects, the travel surfaces of the ramps 130DG1R, 130DG3R, 451, 452, 453, deck transition 130DG2R, and the goods deck levels 130DG1, 130DG2, 130DG3, as well as the operator station deck level 130DG0, may have multiple lanes that provide for uni-directional and/or bidirectional travel of the goods bots around the respective travel loop. For example, referring also to FIG. 25, one or more of the above-noted portions of the goods deck 130DG (noting that FIG. 25 is representative of any one or more of the travel surfaces of the ramps 130DG1R, 130DG3R, 451, 452, 453, deck transition 130DG2R, the goods deck levels 130DG1, 130DG2, 130DG3, and the operator station deck level 130DG0) includes multiple travel lanes L2, L2, L3. While three travel lanes L1, L2, L3 are illustrated in FIG. 25 it should be understood that there may be more or less than three travel lanes. For example, in FIGS. 3A, 4, 7A, and 7C, at least portion of the goods deck levels 130DG1, 130DG2, 130DG3 includes multiple lanes L1, L2. The multiple lanes L1, L2, L3 allow one goods bot 262 to pass or otherwise drive around another goods bot 262 (e.g., obstacle avoidance navigation) in any suitable manner.

As an example of goods bot obstacle avoidance navigation, the goods bots 262 may be configured, e.g., through the controller 262C and sensors 2110, to effect goods bot motion with the drive system 2100 so that the goods bot 262 transitions between travel lanes L1, L2, L3 along a substantially smooth curved bot traverse path 2550 (see FIG. 25) on the goods deck 130DG transport surface. The substantially smooth curved bot traverse path 2550 connects a waypoint LW1 on one of the travel lanes L1, L2, L3 with another waypoint LW2 on another of the travel lances L1, L2, L3 with a predetermined optimal trajectory of the goods bot 262, along the substantially smooth curved bot traverse path 2550, that is determined based on a goods bot dynamic model. Suitable examples of obstacle avoidance navigation are described in, for example, U.S. Pat. No. 11,117,743 issued on Sep. 14, 2021 and titled "Storage and Retrieval System," the disclosure of which is incorporated herein by reference in its entirety.

Still referring to FIGS. 3A, 4, 7A, 7C, and 25 one of the multiple lanes (such as lane L2 in FIG. 3A, 4, 7A, and 7C or any one of lanes L1, L2, L3 in FIG. 25) may be, at least in part, a disabled goods bot lane (e.g., a breakdown lane) where goods bots in need of maintenance are stored in dynamically variable portions of the lane L2 for removal from the breakpack module 266 (such as by a goods bot lift module 490 described herein or by a human operator). For example, a disabled (or in need of maintenance) goods bot 262D (referring to FIG. 7A) that is located in lane L2 (or in other aspects lane L1 or L3) may send a signal to controller 120 indicating the goods bot 262D is disable and inform the controller 120 of its location within the breakpack module 266. The controller 120 dynamically designates the location of the disabled goods bot 262 as a breakdown zone 777 (which may be located anywhere along the lane L2 (or in other aspects lane L1, such as where the disabled goods bot 262D is located) and routes operational goods bots 262 around the dynamically designated breakdown zone 777 (where the re-routing is effected with one or more of bypass lanes or redirection through shunts/ramps). Where there are more two or more travel lanes L1, L2, L3, a designation of at least a portion of one of the travel lanes L1, L2, L3 by the controller 120 as a breakdown zone 777 (or a bypass lane) may be dynamic such that the controller 120 may temporally designate a portion of any one or more of the travel lanes L1, L2, L3, (e.g., based on the signals sent to the controller 120 by one or more disabled bots 262) as a breakdown zone 777 (or a bypass lane) for a duration that corresponds to the existence of the disabled bot in the one or more of the travel lanes L1, L2, L3. Suitable examples of bypass lanes can be found in, for example, U.S. Pat. No. 9,082,112 issued on Jul. 14, 2015 and titled "Autonomous Transport Vehicle Charging System" and U.S. Pat. No. 9,561,905 issued on Feb. 7, 2017 and titled "Autonomous Transport Vehicle," the disclosures of which are incorporated herein by reference in their entireties.

As described herein, one or more barriers 766A, 766B (FIG. 7C) may be deployed to close access to the dynamically designated breakdown zone 777 to effect removal of the disabled goods bot 262 from the breakpack module 266 in the manner described herein.

One of the multiple lanes (such as lane L2 in, e.g., FIG. 7A or any one or more of the lanes L1, L2, L3 in, e.g., FIG. 25) may be, at least in part, a buffer 778 for goods bots 262 that effects a sequenced delivery of breakpack goods BPG (e.g., breakpack order sort 188) by the goods bots 262 at the breakpack goods interface 263 of the putwall 263W (and hence a sequencing of breakpack goods BPG placed in any given one or more of the breakpack goods containers 264 disposed at the breakpack goods interface 263 of the putwall 263W—sequencing may also be provided by circulating the goods bots 262 around the travel loops). Here the controller 120 may command the goods bots 262 to traverse the travel loops or buffer themselves in the lane L2 (or lane L1 in the case where there are two lanes L1, L2 or any one of lanes L1, L2, L3, . . . Ln (where n is an integer denoting a maximum number of lanes) in the case where there are more than two lanes) until a predetermined time of delivering a breakpack goods BPG carried by the goods bot 262 is reached so that the different breakpack goods BPG are placed in the same (i.e., a common) breakpack goods container 264 in a predetermined order of mixed breakpack goods BPG (e.g., the predetermined order being any suitable order such as more fragile/smaller breakpack goods being placed in the breakpack goods container BPG after more durable/larger breakpack goods or any other suitable sequencing such as described herein). As noted herein, the sequencing may be effected on a single goods deck level 130DG1, 130DG2, 130DG3 or across/between multiple goods deck levels 130DG1, 130DG2, 130DG3 where a goods bot 262 transitions between goods deck levels 130DG1, 130DG2, 130DG3 for picking and placing breakpack goods BPG and returning to the breakpack operation station 140.

It is noted, referring also to FIG. 7B, that one or more of the breakpack goods containers 264 at the putwall 263W may be a partitioned breakpack goods container 264PP. Here, the partitioned breakpack goods container 264PP is illustrated as having two partitions P1, P2; however, in other aspects more than two partitions may be provided. Generally each breakpack goods container 264 corresponds to an order for any given (e.g., one) customer (i.e., a store, e-commerce customer, distribution center, etc.). A partitioned breakpack goods container 264PP provides for or otherwise effects batch processing of breakpack goods orders of two or more customers. For example, a distribution center customer (e.g., referred to as a common customer) that holds goods and ships those goods to its own customers (referred to herein as sub-customers) may place two separate breakpack goods orders, each order corresponding to a sub-customer. The storage and retrieval system 100 may batch the two separate breakpack goods orders (corresponding to the two sub-customers) into a single partitioned breakpack goods container 264PP for shipping to the common customer.

Figure 7C:
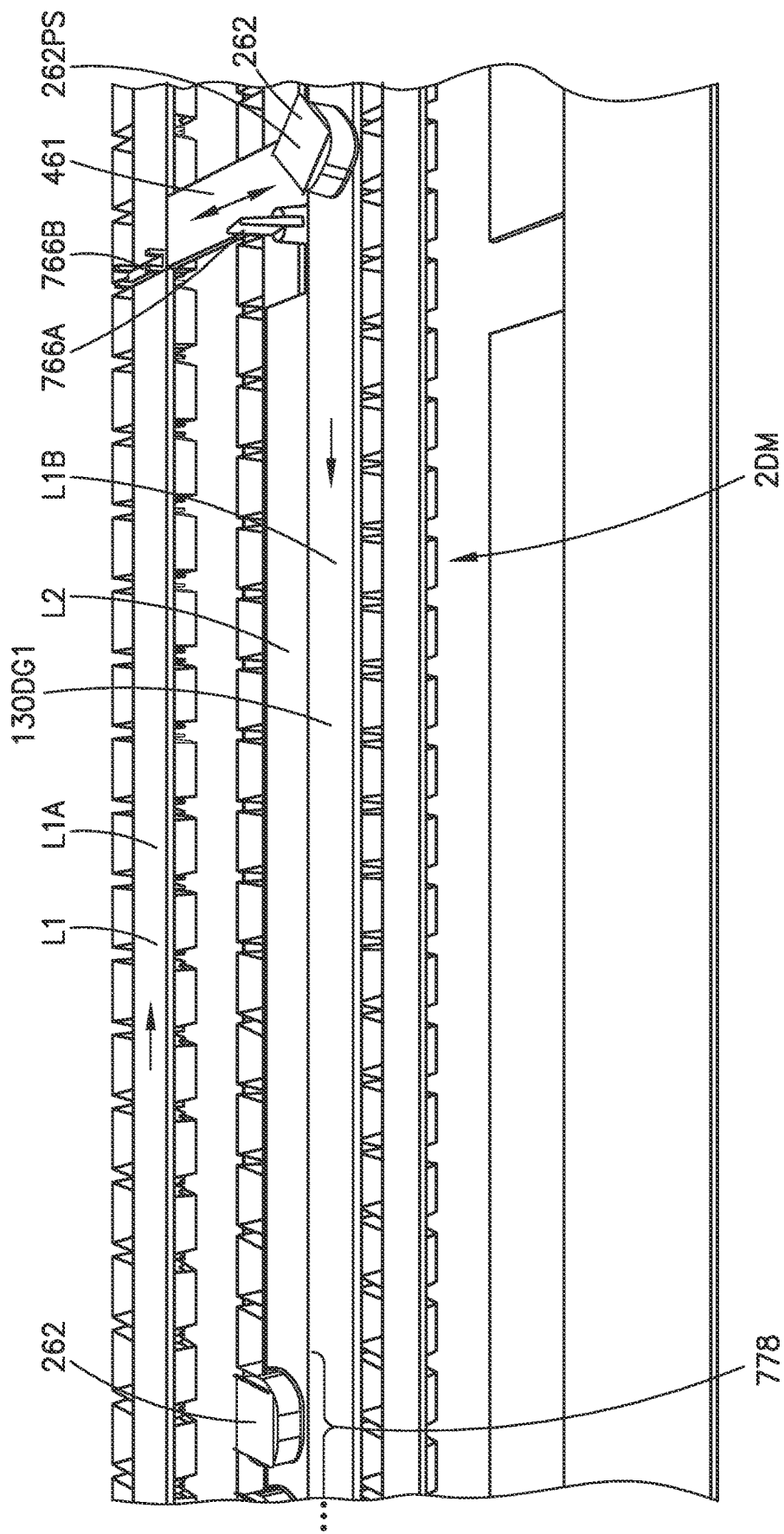
Figure 7D:
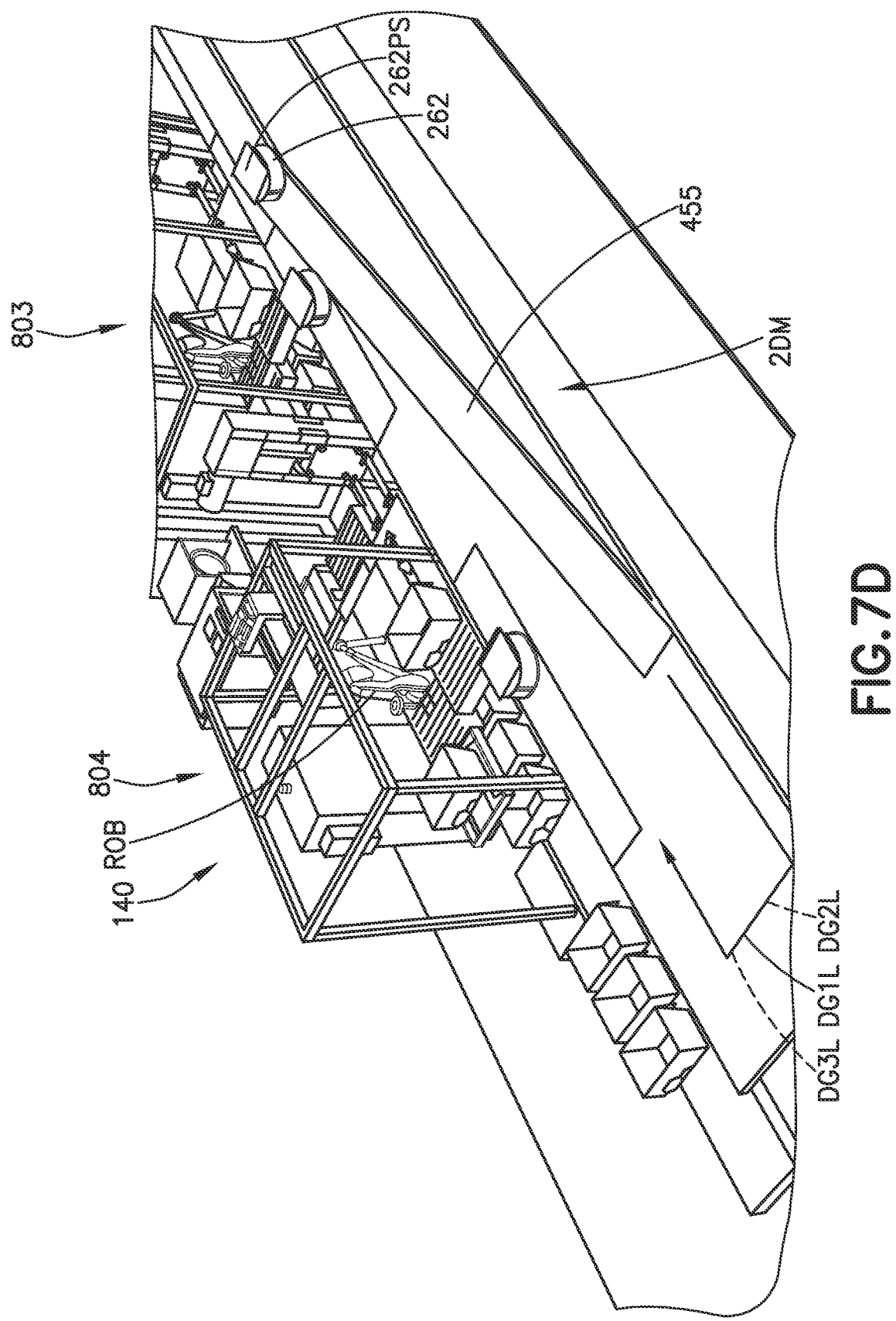

Still referring to FIGS. 3A, 4, 7A, 7C, and 25, as noted above, one of the multiple lanes (such as lane L2) may be, at least in part, a disabled goods bot lane (e.g., a breakdown lane) where goods bots 262 in need of maintenance (or are otherwise disabled) are stored for removal from the breakpack module 266 (such as by a goods bot lift module 490 described herein or by a human operator). Here, the goods deck levels 130DG1, 130DG2, 130DG3 (and/or goods deck level 130DG0) are configured to close (or otherwise restrict) access to a portion of the deck level on which the disabled goods bot is located and/or instruct goods bots 262 to leave the affected area (if they are able to leave or otherwise shut down any goods bots remaining in the affected area). For example, the goods deck levels 130DG0, 130DG1, 130DG2, 130DG3 include deployable physical barriers that are substantially similar to those described in U.S. Pat. No. 10,739,766 issued on Aug. 11, 2020 and titled "Automated Storage and Retrieval System with Integral Secured Personnel Access Zones and Remote Rover Shutdown," and in U.S. Pat. No. 10,507,988 issued on Dec. 17, 2019 and titled "Maintenance Access Zones for Storage and Retrieval Systems," the disclosures of which are incorporated herein by reference in their entireties. For example, referring to FIG. 7C, one or more portions of the goods deck 130DG includes a retractable barrier (e.g., gate, net, fence, etc.) that is deployed to close (or otherwise block) access to a respective portion of the goods deck 130DG and is retracted to permit access to the respective portion of the goods deck 130DG. As can be seen in FIG. 7C at least one barrier 766A, 766B are provided on, for example, goods deck level 130DG1 (similar barriers may be provided on the other goods deck levels). The barriers 766A, 766B are located adjacent the shunt 461 alongside (e.g., so as to block or close) respective portions L1A, L1B of the lane L2. The barriers 766A, 766B are positions on the goods deck level 130DG1 so as to permit access to the shunt 761 when one or more of the barriers 766A, 766B are deployed so that goods bots 262 continue to operate within the open (e.g., unblocked) portions of the breakpack module 266. In one or more aspects, while the breakpack goods autonomous travel loop DG1L, DG2L, DG3L are generally described as having a common travel direction (i.e., goods bot travel in a single circulation direction), when a barrier 766A, 766B is deployed one or more portions of the breakpack goods autonomous travel loops DG1L, DG2L, DG3L may allow (e.g., under traffic management control of controller 120) bidirectional goods bot 262 travel.

Where a portion of a goods deck level 130DG1, 130DG2, 130DG3 (and/or goods deck level 130DG0) is closed, operation of the breakpack module 266 may continue uninterrupted by directing/re-directing goods bots to different goods deck levels 130DG1, 130DG2, 130DG3 (and/or goods deck level 130DG0) for placing breakpack goods BPG in breakpack goods containers 264 or by directing/redirecting goods bots around the closed portion(s) of the goods deck levels 130DG1, 130DG2, 130DG3 (and/or goods deck level 130DG0) using the ramps 451-453, 130DG1R-130DG3R and shunts 461 (see FIGS. 2 and 4). The controller 120 may be configured to re-direct a goods bot 262 on the fly (e.g., during performance of a goods bot task) along a different travel route (other than a previously planned route) or to a different breakpack goods container 264 (other than a previously determined breakpack goods container) on the fly (i.e., during fulfillment of a bot task) so as to avoid a closed portion of a goods deck level 130DG1, 130DG2, 130DG3 (and/or goods deck level 130DG0) and maintain uninterrupted operation of the breakpack module 266.

Figure 10:
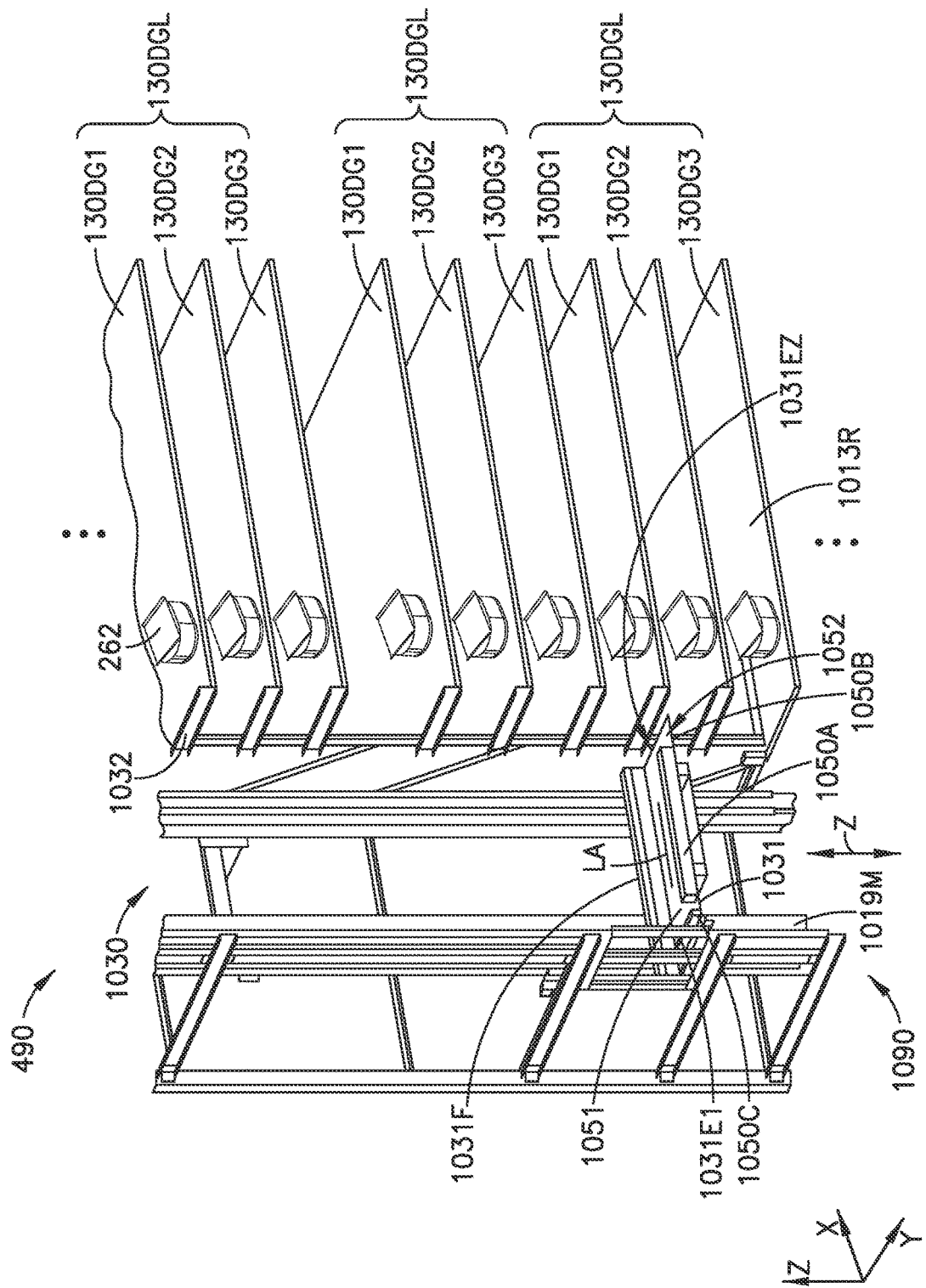
FIG. 10 is an exemplary schematic perspective illustration of a breakpack goods bot induction/removal system of the breakpack goods module of FIG. 2 in accordance with aspects of the disclosed embodiment.

As can be seen in FIG. 4 and also in FIG. 10, the goods deck 130DG includes at least one goods bot lift module 490 for inputting and/or removing goods bots 262 to and/or from the breakpack module 266. In one or more aspects, the at least one goods bot lift module 490 facilitates removal of disabled goods bots 262D and/or effects input and removal of goods bots 262 to/from the breakpack module 266 for any suitable reason. For example, goods bots 262 may be input or removed depending on load balancing (e.g., a predetermined throughput), goods bot congestion/traffic, goods bot maintenance, and/or any other suitable criteria. The goods bot lift module 490 may be substantially similar to that described in U.S. Pat. No. 10,221,013 issued on Mar. 5, 2019 and titled "Storage and Retrieval System Rover Interface," the disclosure of which is incorporated herein by reference in its entirety. As an example, the at least one goods bot lift module 490 can be interfaced with the goods deck(s) 130DG. As can be seen in FIGS. 4 and 10, the at least one goods bot lift module 490 is interfaced with the goods deck levels 130DG1, 130DG2, 130DG3 of a stack of gangs of goods deck levels 130DGL; while in other aspects the at least one goods bot lift module 490 is interfaced with the one or more than one (stacked) operator station deck level 130DG0 (see FIG. 4) in a manner substantially similar to that illustrated in FIG. 10. The interface between the at least one goods bot lift module 490 and the goods decks 130DG may be disposed at a predetermined location of the goods decks 130DG so that the input and exit of goods bots 262 to each goods deck 130DG is substantially decoupled from throughput of the breakpack module 266 (e.g. the input and output of the goods bots 262 at each goods deck level does not affect throughput). In one aspect the at least one goods bot lift module 490 may interface with a spur or staging area 491 (e.g. goods bot loading platform—see FIG. 4) that is connected to or forms part of the goods deck 130DG for each goods deck level 130DG1, 130DG2, 130DG3 and/or operator station deck level 130DG0. In other aspects the at least one goods bot lift module 490 may interface substantially directly with the operator station deck level 130DG0 and/or one or more of the goods deck levels 130DG1, 130DG2, 130DG3.

It is noted that the goods deck 130DG and/or staging area 491 may include any suitable barrier 1032 that substantially prevents a goods bot 262 from traveling off of the goods deck 130DG and/or staging area 491 at the lift module interface. In one aspect the barrier 1032 may be a movable barrier that may be movable between a deployed position for substantially preventing the goods bot 262 from traveling off of the goods deck 130DG and/or staging area 491 and a retracted position for allowing the goods bot 262 to transit between a lift platform 1031 of the goods bot lift module 490 and the goods deck 130DG and/or staging area 491.

In addition to inputting or removing goods bots 262 to and from the breakpack module 266, in one aspect, each goods bot lift module 490 may also transport goods bots 110 between goods deck levels 130GD0, 130DG1, 130DG2, 130DG3 of a gang of goods deck levels 130DGL and/or between goods deck levels 130DG0, 130DG1, 130DG2, 130DG3 of different (e.g., stacked) gangs of goods deck levels 130DGL without removing the goods bots 262 from the breakpack module 266. The controller 120 may utilize the goods bots lift modules 490 to effect goods bot balancing where a work load between the goods deck levels 130DG1, 130DG2, 130DG3 and/or between different gangs of goods deck levels 130DGL is balanced through the introduction of goods bots 262 from outside the breakpack module 266 into a predetermined goods deck level 130DG0, 130DG1, 130DG2, 130DG3 and/or a predetermined gang of goods deck levels 130DGL, removal of goods bots 262 from the breakpack module 266, and/or transfer of goods bots 262 between goods deck levels 130DG0, 130DG1, 130DG2, 130DG3 and/or gangs of goods deck levels 130DGL without removing the goods bots 262 from the breakpack module 266. It is noted that in one aspect the transfer of goods bots 262 between different goods deck levels 130DG0, 130DG1, 130DG2, 130DG3 and/or gangs of goods deck levels 130DGL with the goods bot lift modules 490 is performed independent of goods bot payload transfer (e.g. breakpack goods BPG are not disposed on the goods bot 262 when transferred between deck levels or gangs of deck levels using the goods bot lift modules 490). In other aspects, the goods bot 262 may carry a payload (e.g., breakpack goods BPG) while being transferred between storage deck levels or gangs of deck levels using the goods bot lift modules 490.

For exemplary purposes only, each goods bot 262 lift module 490 may include a substantially rigid frame 1030 and a lift platform 1031 movably coupled to the frame 1030. The frame 1030 may have any suitable configuration for allowing the lift platform 1031 to move between the deck levels 130DG1, 130DG2, 130DG3 and/or deck levels 130DG0. The rover lift module 190 may include any suitable drive system 1019M that is coupled to the lift platform 1031 for causing movement of the lift platform 1031 in the direction of arrow Z between the deck levels 130DG1, 130DG2, 130DG3 and/or deck levels 130DG0.

The lift platform 1031 includes a frame 1031F that forms a goods bot support 1051 having at least one opening 1052 for allowing a goods bot 262 to transit to and from the goods bot support 1051. The frame 1031F may have any suitable configuration and may be movably coupled to the frame 1030 and drive system 1019M in any suitable manner. The movable coupling between frame 1031F and the frame 1030 may also include any suitable guide members to substantially prevent movement of the lift platform 1031 in the X-Y plane. For exemplary purposes, the frame 1031F may further include one or more fences 1050A-1050C that substantially surround the goods bot support 1051 for substantially preventing the goods bot 262 from driving or otherwise moving off of the lift platform 1031 during, for example, transport of the goods bot 262. At least one of the fences 1050A-1050C may be movably mounted to the frame 1031F for allowing the goods bot 262 to transit between the rover support 1051 and, for example, the goods deck 130DG (and/or staging area 491). In one aspect the frame 1031F includes a first end 1031E1 and a second end 1031E2 longitudinally separated from the first end 1031E1. The goods bot 262 may travel onto and off of the lift platform 1031 along the longitudinal axis LA such that one or more of the fences 1050B, 1050C located at the first and second ends 1031E1, 1031E2 can be moved between a first position for allowing the goods bot 262 to enter or exit the lift platform 1031 and a second position for retaining the goods bot 262 on the lift platform 1031. Fence 1050A may be similarly pivotable to allow for loading or removing the goods bot 262 onto/from the lift platform 1031 from, for example a floor (or other "ground" level) of a warehouse in which the automated storage and retrieval system 100 is disposed. In other aspects the goods bot 262 may be loaded on the lift platform 1031 in any suitable manner.

Figure 11:
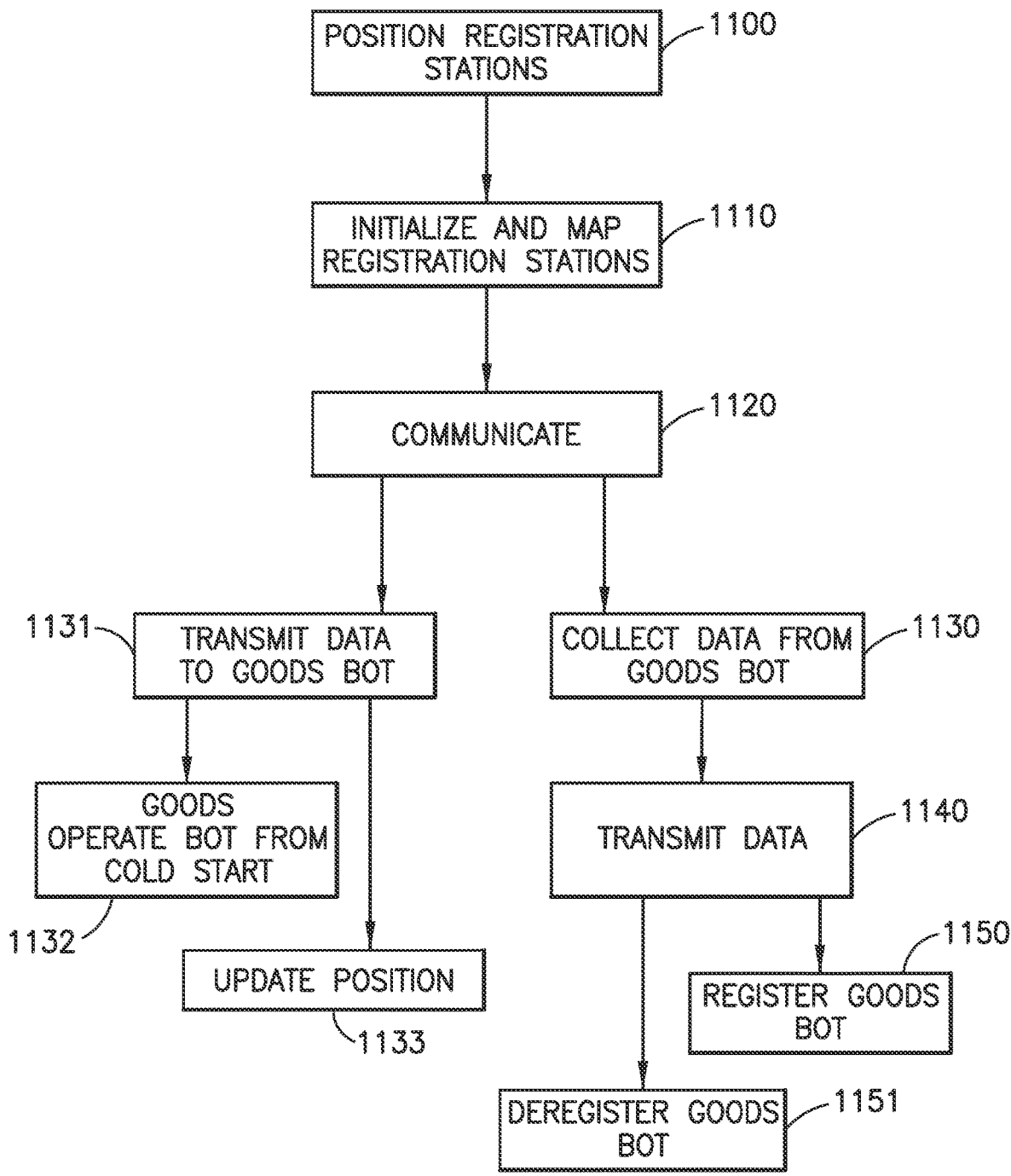
FIG. 11 is an exemplary flow diagram of an operation method of the breakpack goods bot induction/removal system of FIG. 10 in accordance with aspects of the disclosed embodiment.

It may be desired that any goods bot 262 have capability to commence operation substantially anywhere within a breakpack module 266. To do so, it is advantageous that a goods bot start position be determined in a substantially autonomous manner. In one aspect the registration station(s) 1013R may be distributed throughout the breakpack module 266 to provide a goods bot 262, which lacks goods bot prepositioning data, with sufficient positional data so that the controller 262C (FIG. 1A) of the goods bot 262 is capable of determining where the goods bot 262 is within the automated storage and retrieval system 100 (FIG. 11, Block 1100). The registration stations 1013R may provide a goods bot 262 location and/or automatic registration system to allow onset, offset and updated registrations of a goods bot for e.g. goods bot cold start (where the goods bot lacks prepositioning data) and goods bot induction/extraction update at any desired locations throughout the automated storage and retrieval system 100. The location of each registration station 1013R may be mapped within a reference frame (e.g. global three dimensional reference space, in other aspects the global reference space may have any suitable number of dimensions) of the structure of automated storage and retrieval system 100. It is noted that when the goods bot 262 and the registration stations interface, the location of the registration station the goods bot 262 is interfacing with is sent to both the goods bot 262 and the controller 120 to enable one or more of autonomous goods bot control and control of the goods bot 262 by the controller 120.

The goods transfer deck(s) 130DG of the breakpack modules 266 may be arranged with any suitable rover entry/exit features, such as the goods bot 262 lift modules 490 or any other structural features (e.g. ports, openings, platforms) for facilitating physical induction and extraction of goods bots 262 on each deck level 130DG0, 130DG1m, 130DG2, 130DG3 of the breakpack module 266. In one aspect the registration stations 1013R may be positioned at and associated with specific entry/exit stations, in a manner substantially similar to that described above with respect to the goods bot 262 lift modules 490. The registration stations 1013R may be initialized and mapped to the storage three dimensional reference space with any suitable controller, such as control server 120 (FIG. 11, Block 1110). Each registration station 1013R may interface with or otherwise communicate with a goods bot(s) 262 (which may lack bot prepositioning data) (FIG. 11, Block 1120) that is within a predetermined proximity and/or orientation to the registration station 1013R. In one aspect the goods bot 262 may communicate with the registration station 1013R to provide the goods bot 262 with location data where the goods bot 262 lacks prepositioning data (FIG. 11, Block 1131) so that the goods bot 262 may perform pick, place, and return operations (FIG. 11, Block 1132). As noted above, the registration stations 1013R may also be used at goods bot 262 induction and extraction points, such as the goods bot 262 lift module 490, to tell the goods bot 262 which location the goods bot 262 is being inserted into or taken from. In another aspect, the registration station 1013R may collect data from the goods bot 262 (FIG. 11, Block 1130) and transmit that data to the controller 120 (FIG. 11, Block 1140) where the data may be sufficient for autonomous goods bot registration (FIG. 11, Block 1150) with the controller 120 (i.e. the data may provide a unique goods bot identification and a location of the goods bot in the global three dimensional reference space of the automated storage and retrieval system 100). This allows the controller 120 to effect goods bot 262 induction into, for example, a breakpack module 266 which may be related to the global three dimensional reference space. Conversely goods bot 262 extraction may be performed so that a goods bot is deregistered (FIG. 11, Block 1151) from the automated storage and retrieval system 100, in a manner substantially similar to that described above, when the goods bot 262 exits the breakpack module 266. The goods bot registration and deregistration may automatically update the system software with the induction or extraction information (e.g. which goods bot 262 is being inserted or removed, in what breakpack module 266, and on what deck level 130DG0, 130DG1, 130DG2, 130DG3), as well as automatically check other configuration settings of the automated storage and retrieval system 100.

In one aspect, the registration stations 1013R may also serve as position updates (e.g. the goods bot 262 has preposition data) where the registration station 1013R provides positioning data to a goods bot 262 to update or otherwise correct a location of the goods bot 262 within the breakpack module 266 (FIG. 11, Block 1133). In one or more aspects, the registration stations 1013R may be placed throughout the breakpack module 266 to provide continuous updates of good bot position. A communicator 262T of the goods bot 262 may also be configured to obtain data from the registration stations 1013R in any suitable manner. The registration stations 1013R can be used by the goods bot 262 to determine where the goods bot 262 is during normal operation if the goods bot 262 ever needs to reset itself.

With reference to FIGS. 3A, 4, 6A, 6B, 7A-7D, 8A, and 8B, as described herein, the goods bots 262 are configured to transport breakpack goods BPG between the operator stations 801, 802, 803, 804 of the breakpack operation station 140 and the breakpack goods containers 264 located at the breakpack goods interface 263. For example, controller 120 may instruct a goods bot 262 to pick up a breakpack good BPG from any one of the operator stations, such as operator station 802 (illustrated in FIG. 8B) and deliver the breakpack good BPG to a predetermined breakpack goods container 264 in a predetermined breakpack goods interface location 263LP disposed along goods deck level 130DG1 (illustrated in FIG. 7B). Here an operator, such as human operator HUM (or a robotic operator ROB), places the breakpack good BPG on the goods bot 262, which is located in queue 844 on the goods deck 130DG. From the operator station 802 the goods bot 262 traverses the operator station deck level 130DG0 to ramp 130DG1R so that the goods bot 262 enters goods deck level 130DG1. As described herein, where there is an obstruction, such as a closed portion of goods deck level 130DG1, the controller 120 may on the fly re-route the goods bot 262 around the obstruction such as by redirecting the goods bot along a travel path that includes traversing one or more of the other goods deck levels 130DG2, 130DG3, shunts 461, and/or ramps 451-454.

In one or more aspects, the goods bot 262 is configured with any suitable sensor(s) 733 configured to verify an identity of breakpack goods container 264 located at the predetermined breakpack goods interface location 263LP. The sensor(s) 733 include one or more of an optical sensor (e.g., bar code reader), radio frequency identification (RFID) tag reader, or any other suitable sensor for reading any suitable identification indicia/tag of the breakpack goods container 264. With the goods bot 262 located at the predetermined breakpack goods interface location 263LP, the goods bot 262 verifies an identity of the breakpack goods container 264 located at the predetermined breakpack goods interface location 263LP. Where the correct breakpack goods container 264 is located at the predetermined breakpack goods interface location 263LP the goods bot 262 is configured to transfer the breakpack goods BPG to the breakpack goods container 264. Where the goods bot 262 determines that an incorrect breakpack goods container 264 is located at the predetermined breakpack goods interface location 263LP, the goods bot 262 is configured to communicate the same to the controller 120 and the controller 120 may, on the fly, reassign the task of the goods bot 262 so as to redirect the goods bot 262 to another breakpack goods container at the breakpack goods interface 263 (e.g., on the same or different level), redirect the goods bot 262 to a buffer area of the goods deck 130DG to await delivery of the correct breakpack goods container (or a supply container from which the breakpack goods was removed or includes the same SKU as the breakpack goods BPG), and/or redirect the goods bot 262 back to the breakpack operation station 140.

With the breakpack good BPG delivered to a breakpack goods container 264 for transport by a container bot 110 to storage or out of the automated storage and retrieval system 100, the goods bot 262 may return to the breakpack operation station 140 for transport of another breakpack goods BPG. In other aspects, the goods bot 262 may traverse to and be removed from the breakpack module 266 or be transferred to another breakpack module by a goods bot lift module 490.

As noted above, the breakpack goods container 264 with the delivered (one or more) breakpack goods BPG (e.g., from one goods bot 262 or multiple breakpack goods from any number of goods bots 262) disposed therein is picked from the goods deck level 130DG by a containers bot 110 traveling along a container bot travel surface 266RS1, 266RS2, 266RS3 that corresponds with the goods deck level 130DG to effect transport of the breakpack goods container 264 to storage or out of the automated storage and retrieval system 100 (see FIG. 3A where, for example, container bot travel surface 266RS1 corresponds to and serves goods deck level 130DG1, container bot travel surface 266RS2 corresponds to and serves goods deck level 130DG2, and container bot travel surface 266RS3 corresponds to and serves goods deck level 130DG3). In one aspect, the container bot(s) 110 is configured to transport the breakpack goods containers 264 from the breakpack goods interface 263 to the container outfeed station TS, for outfeed of the breakpack goods containers 264, and to transport other breakpack goods containers 264 from the breakpack goods interface 263 to the container storage locations 130S that are breakpack goods container storage locations 130SB for storage in a manner similar to that described in U.S. provisional patent application No. 63/044,721 filed on Jun. 26, 2020 and titled "Warehousing System for Storing and Retrieving Goods In Containers," the disclosure of which was previously incorporated herein by reference in its entirety.

With reference to FIGS. 2, 3A, 4, 7B, 8B, and 27 an exemplary operation of the breakpack module or automated order fulfillment system 266 will be described. A multilevel breakpack goods container fill array or putwall 263W is provided (FIG. 27, Block 2700). Each level PWL of the putwall 263W having a container fill station area CFA, with breakpack goods container stations 263L arrayed along the container fill station area CFA (e.g., along the goods deck 130DG), and having a corresponding breakpack goods transfer deck 130DG1-130DG3 juxtaposed along the breakpack container stations 263L of the container fill station area (see FIG. 4). The method includes traversing and transporting, with at least one goods bot 262, breakpack goods (FIG. 27, Block 2710) along the corresponding breakpack goods transfer deck 130DG1-130DG3, and between corresponding breakpack goods transfer decks 130DG1-130DG3 at different levels PWL of the multilevel breakpack goods container fill array 263W, to each breakpack goods container station 263L at each level PWL. Each breakpack goods container station 263L is disposed to hold a breakpack goods container 264 accessed by and filled by the at least one goods bot 262 with a predetermined breakpack goods fill payload BPGFP, and the least one goods bot 262 has a payload support 262PS (see, e.g., FIG. 7B) for holding at least one breakpack goods BPG unit for transport by the at least one goods bot 262.

The corresponding transfer deck 130DG1-130DG3 at each level PWL is communicably joined to other transfer decks 130DG1-130DG3 corresponding to each other level PWL of the putwall 263 by interlevel transit autonomous guided breakpack goods transport vehicle pathways ITPS that traverse between the corresponding breakpack goods transfer deck 130DG1-130DG3 at each level PWL and other breakpack goods transfer decks 130DG1-130DG3 corresponding to each other level PWL so that the at least one goods bot 262 transits, via the interlevel transit autonomous guided breakpack goods transport pathways ITPS from the corresponding breakpack goods transfer deck 130DG1-130DG3 to each other breakpack goods transfer deck 130DG1-130DG3 corresponding to each other level PWL, and transports the predetermined breakpack goods BPG fill payload loaded on the at least one goods bot 262 on one level PWL and fills the breakpack goods container 264 at each breakpack goods container station 263L at a different level PWL. Here, the corresponding breakpack goods transfer decks 130DG1-130DG3 at each level PWL and interlevel transit autonomous guided breakpack goods transport pathways ITPS form at least a two-dimensional matrix of autonomous guided breakpack goods transport vehicle divert pathways including at least one interlevel divert pathway (e.g., ramps, lifts, etc. as described herein) and at least one intralevel divert pathway (e.g., bypasses or shunts as described herein), so that the at least one goods bot 292 freely diverts, on the fly, via at least one of the at least one interlevel divert pathway and the at least one interlevel divert pathway from an initial breakpack goods container station destination CSD1 to a divert breakpack goods container station destination CSD2 on at least one of a common level PWL and a different level PWL as the initial container station destination CSD1 (see FIG. 4). Here, the corresponding breakpack goods transfer deck 130DG1-130DG3 at each level PWL is non-deterministic and the at least one interlevel divert pathway is non-deterministic so that the at least one goods bot 262 may freely transition between the corresponding breakpack goods transfer deck 130DG1-130DG3 to the at least one interlevel divert pathway and vice versa.

With reference to FIGS. 2, 3A, 4, 7B, 8B, and 26 an exemplary operation of the automated storage and retrieval system 100 will be described for storing and retrieving goods. The storage structure 130 is provided as described herein (FIG. 26, Block 2600). The containers (e.g., breakpack goods containers and/or supply containers) are transported (FIG. 26, Block 2610), with at least container bot 110, accessed to and from container storage locations/spaces 130S on each of the storage shelves in the array of storage shelves 130SA on each level of the storage structure 130 to a breakpack operation station 140, where the at least one container bot 110 traverses the container transfer deck 130DC and picking aisles 130A on each level, and is distinct from the container transfer deck 130DC, and at least one of the container bots 110 is located on each level of the storage structure 130. The putwall 263W is provided (FIG. 26, Block 2620) and includes more than one levels of breakpack goods interface locations 263L distributed along each level with a corresponding breakpack goods transfer deck 130DG at each level of the putwall 263W. The breakpack goods BPG are transported (FIG. 26, Block 2630), by at least one goods bot 262, along the corresponding breakpack goods transfer deck 1230DG, and between corresponding breakpack goods transfer decks 130DG (e.g., 130DG1-130DG3) at different levels of the putwall 263W, to each breakpack goods interface location 263L at each level of the putwall 263W. Operation of the container bot 110 is effected (FIG. 26, Block 2640), with the controller 120, between the container storage locations 130S, the breakpack operation station 140, and a breakpack goods container 264 located at a breakpack goods interface location 263L of the putwall 263W.

Figure 9:
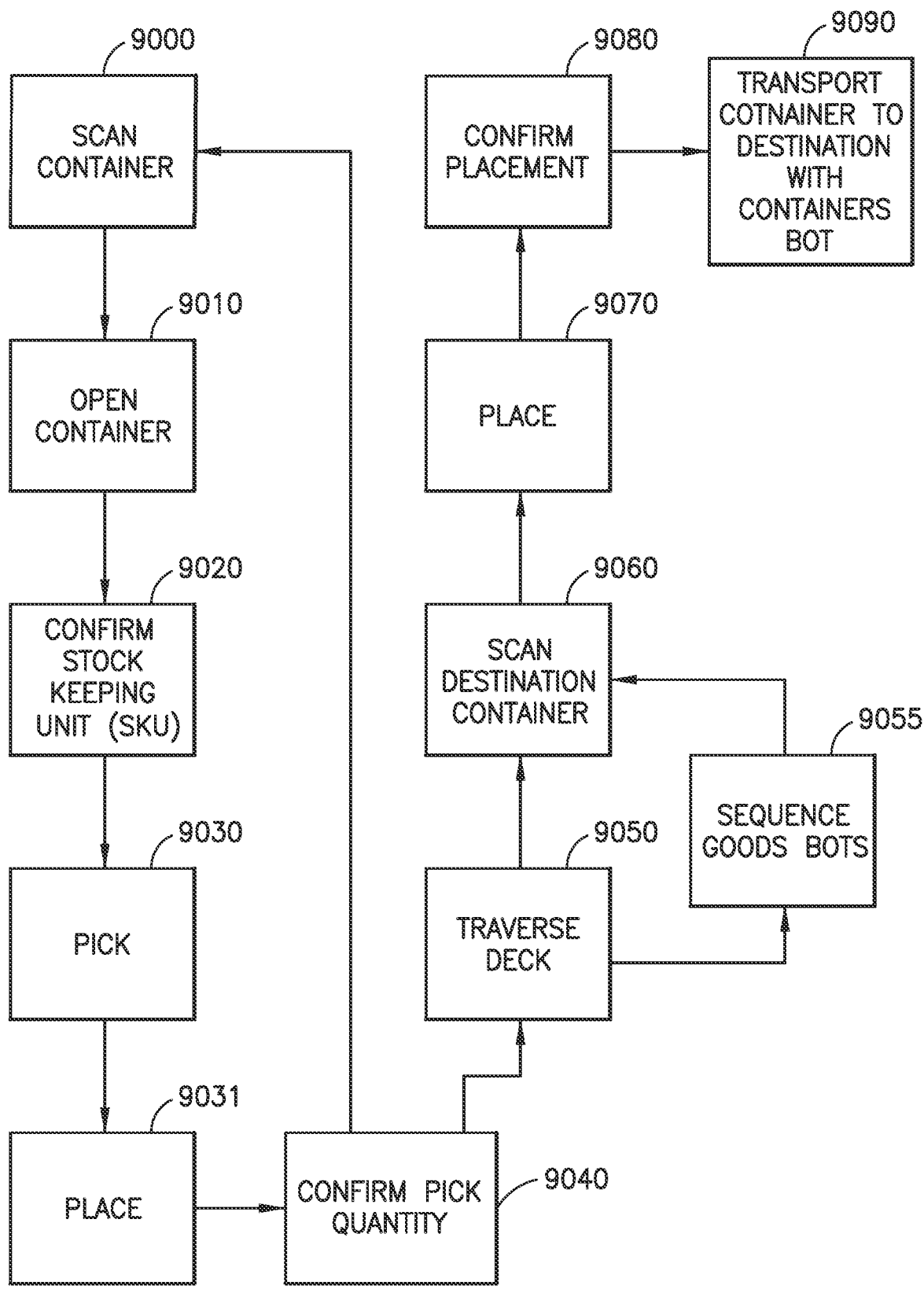
FIG. 9 is an exemplary flow diagram of a breakpack operation method of the breakpack goods module of FIG. 2 in accordance with aspects of the disclosed embodiment.

With reference to FIGS. 2, 3A, 4, 7B, 8B, 9, 9A, and 9B an exemplary operation of the breakpack module 266 will be described. As described above, the container bots 110 are configured to transfer containers (e.g., supply containers 265, empty breakpack goods containers 264E, partially filled breakpack goods containers 264PF, and/or any suitable containers having any suitable state/level of fullness) to the breakpack module 266. These supply containers 265 and breakpack goods containers 264 are delivered to one or more of the operator stations 140 and the breakpack goods interface 263. For example, the container bots 110 are configured to deliver supply containers 265 (or breakpack containers 264) to the operator stations 801-804 of the breakpack operation station 140 in the manner described above (e.g., the container bot 110 delivers the supply containers substantially directly to the breakpack operation station 140 or to the lifts 310A, 310B which sort/sequence the supply containers 265 for delivery to the breakpack operator station 140) (FIG. 9B, Block 19150). In one aspect, after placing the supply container 265 at, for example, conveyor 500A, the container bot 110 may pick an empty breakpack container 264E (or partially filled breakpack container 264PF) (FIG. 9B, Block 19100) from an empty breakpack container lift 222 that is disposed adjacent conveyor 500A and/or in communication with container output conveyor 820, where the container bot picks the empty breakpack container 264E substantially directly from the empty breakpack container lift 222 or from the container output conveyor 820 (where the empty breakpack container is transferred from the lift 222 to the conveyor 820 in any suitable manner, such as by multidirectional drive/conveyor units/portions 370). The empty breakpack container 264E may then be placed at a predetermined empty breakpack goods interface location 263L of the breakpack goods interface 263 (FIG. 9B, Block 19110).

After delivering/placing the empty breakpack container 264E to the predetermined empty breakpack goods interface location(s) 263L, the container bot 110 picks one or more other different breakpack container(s) 264 (e.g., (filled or partially filled, or empty) from one or more other different breakpack goods interface location(s) 263L of the putwall 263W (FIG. 9B, Block 19120) for transfer to a breakpack goods container storage location 19000 or for transfer out of the storage and retrieval system 100 (e.g., such as part of a pallet load or other outbound container as described herein in accordance with a predetermined order out sequence corresponding to the breakpack output sort 189). Here, the container bot 110 places the one or more other different breakpack container(s) 264 at a storage location 130S, a transfer station TS, a buffer station BS, or substantially directly to a lift 150 (FIG. 9B, Block 19130). The container bot 110 may pick another supply container (FIG. 19140) for placement at the breakpack goods module 266 in the manner described above (e.g., return to FIG. 9B, Block 19150). Here, the container bot 110 swaps a supply container 265 for an empty breakpack goods container 264E at a location between the operator station 140 and the breakpack goods interface 263 and then swaps the empty breakpack goods container 264E for a filled or partially filled breakpack goods container at the breakpack goods interface 263.

In another aspects, as described herein, the container bot 110 may facilitate a decanting of breakpack goods or supply containers. For example, a partially filled supply container 265 or partially filled breakpack goods container 264 may be delivered from the operator station 140 to container output conveyor 820. The container bot 110 may pick the partially filled supply container 265 or partially filled breakpack goods container 264 (FIG. 9B, Block 19100) after placing a supply container at the operator station 140 (FIG. 9B, Block 19150). The container bot 110 places the partially filled supply container 265 or partially filled breakpack goods container 264 at a predetermined breakpack goods interface location 263L (FIG. 9B, Block 19110) so that the partially filled supply container 265 or partially filled breakpack goods container 264 is filled with like SKU goods as described herein.

After delivering/placing the partially filled supply container 265 or partially filled breakpack goods container 264 to the predetermined empty breakpack goods interface location(s) 263L, the container bot 110 picks one or more other different breakpack container(s) 264 (e.g., (filled or partially filled, or empty) from one or more other different breakpack goods interface location(s) 263L (FIG. 9B, Block 19120) for transfer to a breakpack goods container storage location 19000 or for transfer out of the storage and retrieval system 100 (e.g., such as part of a pallet load or other outbound container in accordance with a predetermined order out sequence). Here, the container bot 110 places the one or more other different breakpack container(s) 264 at a storage location 130S, a transfer station TS, a buffer station BS, or substantially directly to a lift 150 (FIG. 9B, Block 19130). The container bot 110 may pick another supply container (FIG. 9B, Block 19140) for placement at the breakpack goods module 266 in the manner described above (e.g., return to FIG. 9B, Block 19150). Here, the container bot 110 swaps a supply container 265 for partially filled supply container 265 or partially filled breakpack goods container 264 at a location between the operator station 140 and the breakpack goods interface 263 and then swaps the partially filled supply container 265 or partially filled breakpack goods container 264 for a filled or another partially filled breakpack goods container at the breakpack goods interface 263.

In still another aspect, the container bots 110 are configured to deliver empty breakpack goods containers 264 substantially directly to the breakpack goods interface 263 from any suitable empty breakpack container lift 222. The empty breakpack container lift 222 may be located adjacent the container deck 130DC at an entrance to the breakpack goods module 266 and/or adjacent the conveyor 500A as described above. The container bots 110 may be commanded by the controller 120 (or other suitable controller) to pick a breakpack goods container 264 from the empty breakpack goods container lift 222 or any suitable breakpack goods container storage location 19000 (FIG. 9B, Block 19100). The breakpack goods container storage locations 19000 are disposed on one or more of the storage deck levels 130L and are accessible by the container bots 110 from one or more of the containers deck 130DC and picking aisles 130A. For example, the breakpack goods container storage locations 19000 may be one or more of dedicated locations for storage of breakpack goods containers 264; storage spaces 130S located alongside (or along) the picking aisles 130A; and container holding locations of a transfer station TS or buffer station BS. In other aspects, the container bots 110 may pick empty breakpack containers 264 from the lifts 150 without the breakpack containers 264 entering storage.

Figure 9A:
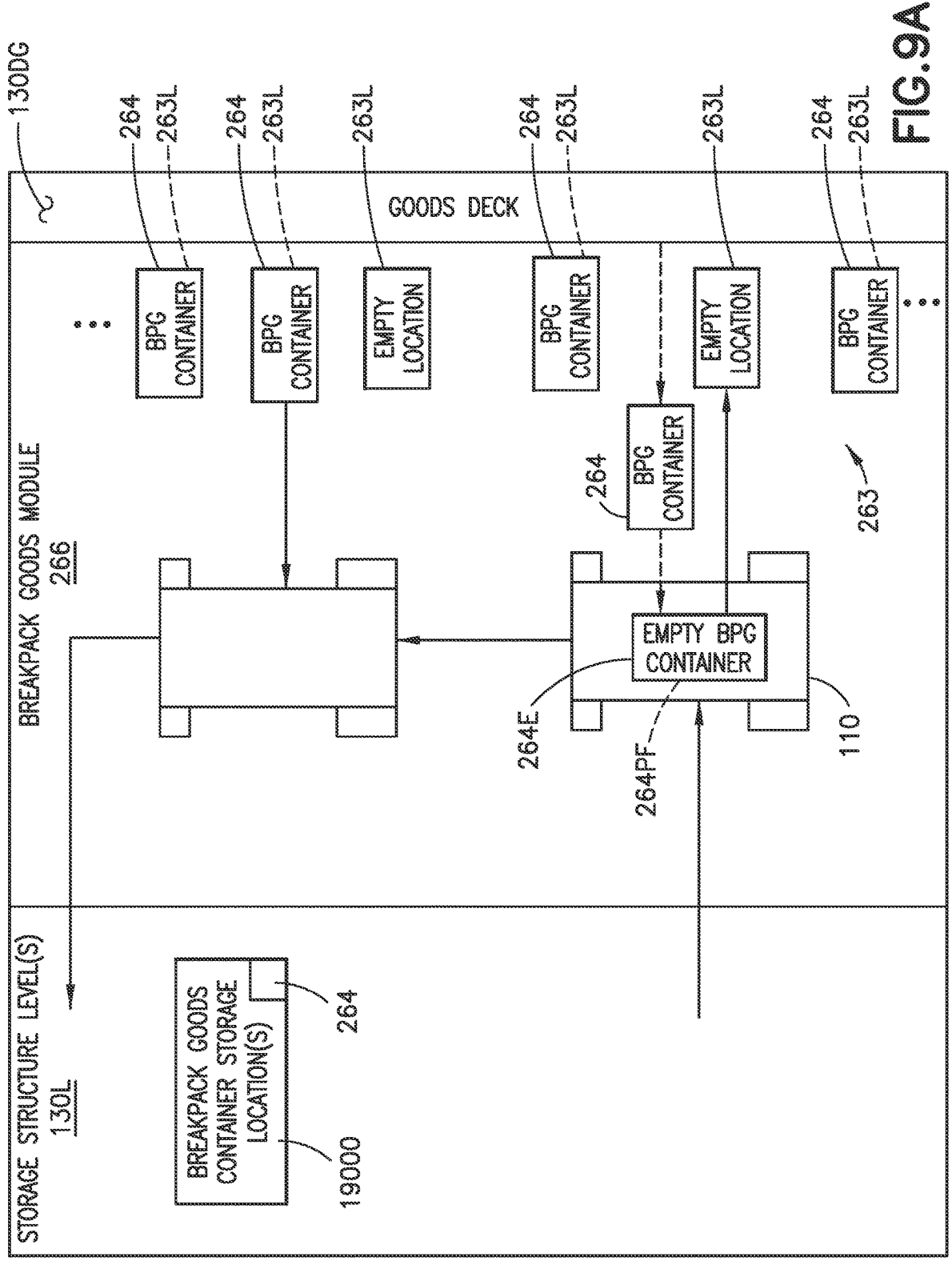
FIG. 9A is a schematic illustration of breakpack goods transfer in accordance with aspects of the disclosed embodiment.

The container bot 110 transfers one or more empty breakpack good(s) containers 264 from the breakpack goods container lift 222 and/or breakpack goods container storage location 19000 to the breakpack goods interface 263 (FIG. 9A, Block 19110), such as for example, an empty breakpack goods interface location 263L (see FIG. 9A) or, in other aspects, to the breakpack operator station 140 in the manner describe above with respect to the supply containers 265. In one aspect, the container bot 110 delivers empty breakpack container(s) 264E to the predetermined empty breakpack goods interface location(s) 263L as illustrated in FIG. 9A; while in other aspects partially filled breakpack goods containers 264PF are delivered to the empty breakpack goods interface location(s) 263L by the container bot(s) 110. As may be realized, with the containers bots 110 ability to sort containers onboard the container bots 110 as described herein, the container bots 110 may create the empty breakpack goods interface location(s) 263L by first picking a filled or partially filled breakpack container 264 from the predetermined breakpack goods interface location 263L and then placing the empty breakpack goods container (carried by the container bot) to the just created breakpack goods interface location 263L (e.g., a filled breakpack container is swapped with an empty breakpack container at the predetermined breakpack goods interface location 263L).

After delivering the empty breakpack container 264E and/or partially filled breakpack container 264PF to a predetermined empty breakpack goods interface location(s) 263L, the container bot 110 (with or without the filled or partially filled breakpack container carried thereon from the swapping of the filled or partially filled breakpack container with the empty breakpack container) picks one or more other different breakpack container(s) 264 (e.g., (filled or partially filled, or empty) from one or more other different breakpack goods interface location(s) 263L (FIG. 9B, Block 19120) for transfer to a breakpack goods container storage location 19000 or for transfer out of the storage and retrieval system 100 (e.g., such as part of a pallet load or other outbound container in accordance with a predetermined order out sequence). In other aspects, after delivering an empty breakpack container 264E and/or partially filled breakpack container 264PF to a predetermined empty breakpack goods interface location(s) 263L, the container bot 110 may leave the breakpack station 266 without picking a breakpack container from the breakpack goods interface 263. In still other aspects, after delivering an empty breakpack container 264E and/or partially filled breakpack container 264PF to a predetermined empty breakpack goods interface location(s) 263L, the container bot 110 may pick an empty or partially filled supply container 265 from the container output conveyors 820 for transfer to storage or for transfer out of the storage and retrieval system in the manner noted above. The container bot 110 may then pick another empty breakpack goods container or a supply container for transfer to a breakpack goods module 266.

Referring again to the supply containers 265, at the operator station 801-804 the supply container(s) 265 is/are scanned (FIG. 9, Block 9000) by sensor suite 899 to verify that the supply container is the expected supply container. The operator (human operator HUM or robotic operator ROB) opens the supply container 265 (FIG. 9, Block 9010) and confirms that the stock keeping units SKU of the breakpack goods BPG within the supply container 265 are correct (FIG. 9, Block 9020) with any suitable sensors of the sensor suite 899 or instructional information presented on the display 899D of the operator station 801-804. The operator picks (FIG. 9, Block 9030) a desired number of breakpack goods BPG from the supply container 265 and places (FIG. 9, Block 9031) the breakpack goods BPG into a breakpack goods container 264 or onto a goods bot 262. The sensor suite 899 is configured to confirm the pick quantity (FIG. 9, Block 9040) of the breakpack goods placed by the operator in any suitable manner (e.g., such as through any suitable vision system that tracks the movement of the breakpack goods and/or operators hands, by determining tier weight change of the container 264/goods bot 262, etc.).

Where the breakpack good(s) BPG are placed in the breakpack goods container 264, the breakpack goods container 264 is transported from the operator station to the container output conveyor 820 as described above. The container bot 110 picks the breakpack goods container 264 from the container output conveyor 820 and transports the breakpack goods container to storage or to a transfer station TS or buffer station BS for outputting the breakpack goods container 264 from the automated storage and retrieval system 100. Where the breakpack good(s) BPG are placed on the goods bot 262 (e.g., waiting in queue 844 on the operator station deck level 130DG0 adjacent the operator station 801-804), the goods bot 262 traverse the goods deck 130DG (FIG. 9, Block 9050) to a predetermined breakpack goods container 264 at the breakpack goods interface 263 on a predetermined goods deck level 130DG1, 130DG2, 130DG3 (e.g., in the manner described above). In one or more aspects, the goods bots 262 may be sequenced (FIG. 9, Block 9055) in any suitable manner (such as by waiting in a buffer 778 (see FIG. 7C) or circulating around one or more travel loops DG1L, DG2L, DG3L, DG1LS, DG2LS, DG3LS (FIG. 4). In one or more aspects, with the goods bot 262 at the predetermined breakpack goods interface location 263L of a breakpack goods interface 263 (e.g., corresponding to the predetermined (destination) breakpack goods container 264), the goods bot 262 scans the breakpack goods container 264 (FIG. 9, Block 9060) to verify that the breakpack goods container 264 at the predetermined breakpack goods interface location 263L is the expected predetermined breakpack goods container 264. With the predetermined breakpack goods container 264 verified, the goods bot 262 places (FIG. 9, Block 9070) the breakpack good(s) BPG into the predetermined breakpack goods container 264 and confirms placement (FIG. 9, Block 9080) of the breakpack goods BPG in the predetermined breakpack goods container 264 with sensors 733 of the goods bot 262 (or with any other suitable sensors of the breakpack goods module 266 configured to identify placement of breakpack goods at the breakpack goods interface locations 263L). In the manner described above, the container bot 110 picks the predetermined breakpack goods container 264 from the predetermined breakpack goods interface location 263L and transports the breakpack goods container 264 to any suitable destination (e.g., to storage or to a transfer station TS or buffer station BS for outputting the breakpack goods container 264 from the automated storage and retrieval system 100) (FIG. 9, Block 9090).

Figure 12A:
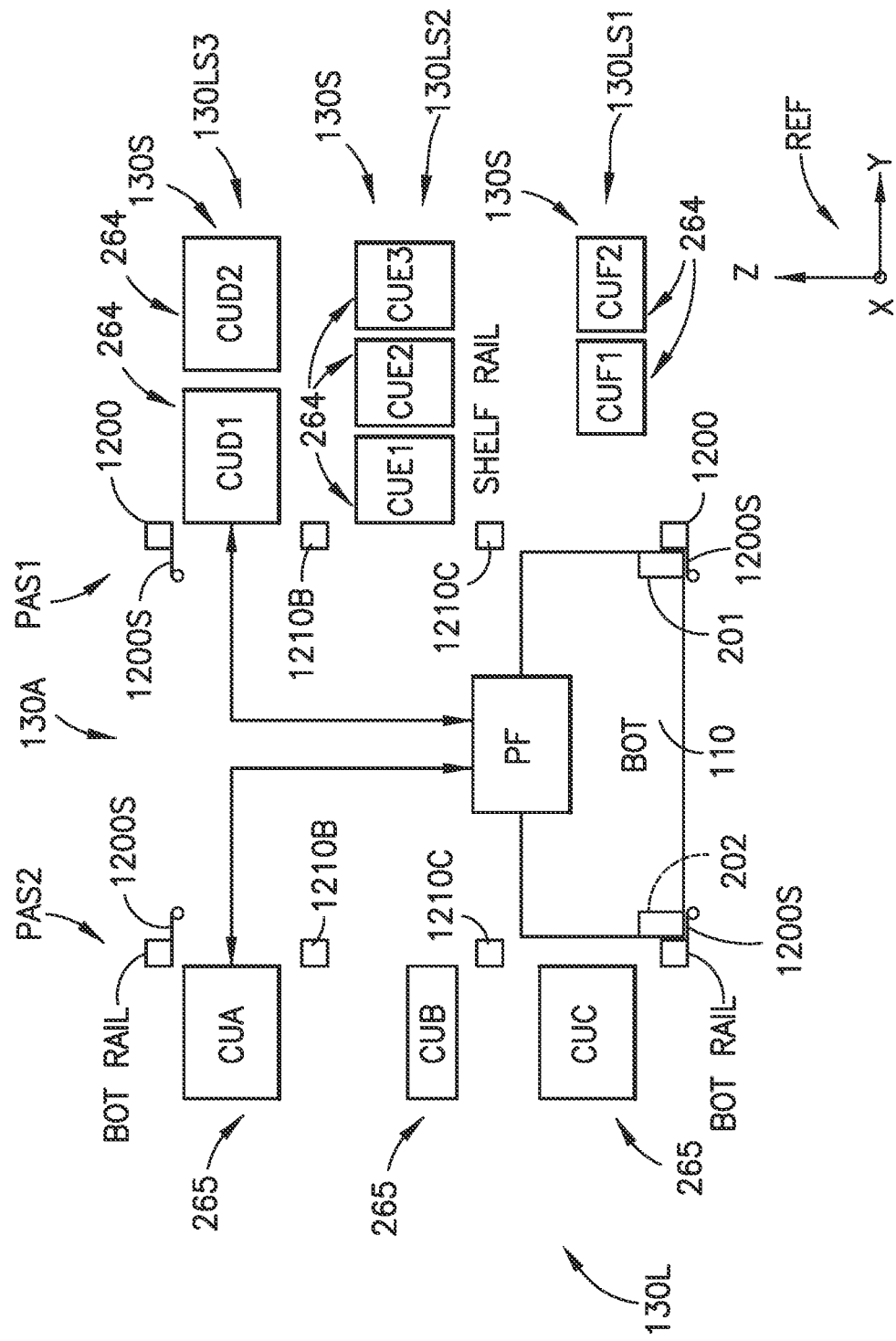
FIGS. 12A, 12B, and 12C are schematic illustrations of portions of the automated storage and retrieval system of FIGS. 1A, 1B, 1C, and 1E in accordance with aspects of the disclosed embodiment.
Figure 12B:
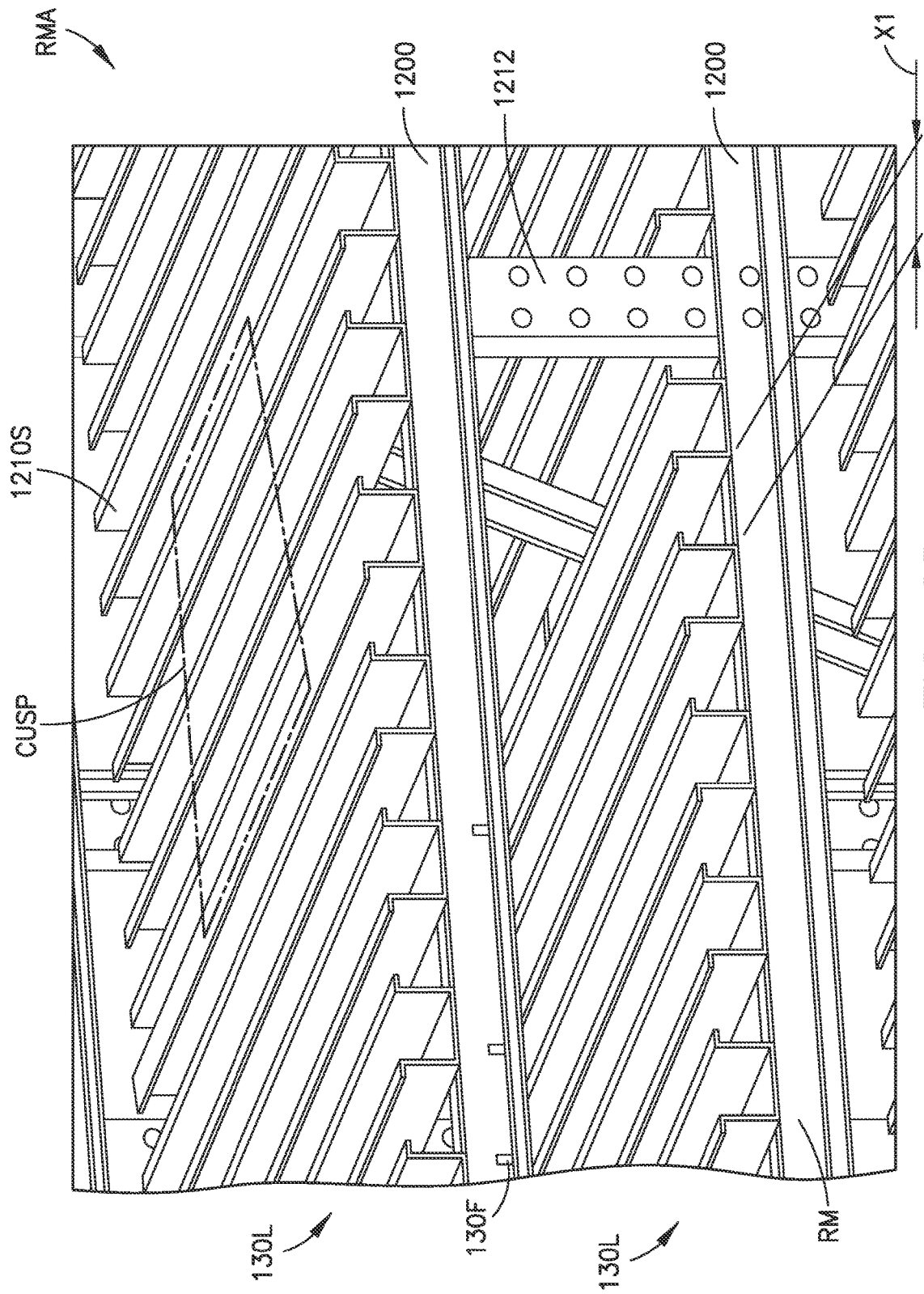

Referring to FIGS. 12A and 12B the rack module array RMA of the storage structure 130 includes vertical support members 1212 and horizontal support members (also referred to herein as rails) 1200 that define the high density automated storage array as will be described in greater detail below. Rails 1200S (also referred to as an aisle deck or deck) may be mounted to one or more of the vertical and horizontal support members 1212, 1200 in, for example, picking aisles 130A and be configured so that the container bots 110 ride along the rails 1200S through the picking aisles 130A. At least one side of at least one of the picking aisles 130A of at least one storage level 130L may have one or more storage shelves (e.g. formed by rails 1210, 1200 and slats 1210S). In one aspect the one or more shelves may be provided at differing heights so as to form multiple shelf levels 130LS1-130LS3 between the storage or deck levels 130L defined by the transfer decks 130B (and the rails 1200S which form an aisle deck). Accordingly, there are multiple rack shelf levels 130LS1-130LS3, corresponding to each storage level 130L, extending along one or more picking aisles 130A communicating with the container transfer deck 130DC of the respective storage level 130L. As may be realized, the multiple rack shelf levels 130LS1-130LS3 effect each storage level 130L having stacks of stored case units/supply containers 265 (or case layers) and/or stacks of stored breakpack goods containers 264 (or breakpack layers) that are accessible from a common deck 1200S of a respective storage level 130L (e.g. the stacks of stored cases are located between storage levels).

As may be realized, container bots 110 traversing a picking aisle 130A, at a corresponding storage level 130L, have access (e.g. for picking and placing case units and/or breakpack goods containers) to each storage space 130S that is available on each shelf level 130LS1-130LS3, where each shelf level 130LS1-130LS3 is located between adjacent vertically stacked storage levels 130L on one or more side(s) PAS1, PAS2 (see e.g. FIG. 1B) of the picking aisle 130A. As noted above, each of the storage shelf levels 130LS1-130LS3 is accessible by the container bot 110 from the rails 1200 (e.g. from a common picking aisle deck 1200S that corresponds with a container transfer deck 130DC on a respective storage level 130L). As can be seen in FIGS. 12A and 12B there are one or more intermediate shelf rails 1210B, 1210C vertically spaced (e.g. in the Z direction) from one another (and from rails 1200) to form multiple stacked storage spaces 130S each being accessible by the container bot 110 from the common rails 1200S. As may be realized, the horizontal support members 1200 also form shelf rails (in addition to shelf rails 1210) on which case units are placed.

Each stacked shelf level 130LS1-130LS3 (and/or each single shelf level as described below) of a corresponding storage level 130L defines an open and undeterministic two dimensional storage surface (e.g. having a case unit/breakpack goods container support plane CUSP as shown in FIG. 12B) that facilitates a dynamic allocation of pickfaces (e.g., supply containers 265) and/or breakpack goods containers 264 both longitudinally (e.g. along a length of the aisle or coincident with a path of bot travel defined by the picking aisle) and laterally (e.g. with respect to rack depth, transverse to the aisle or the path of bot travel). Dynamic allocation of the pickfaces and case units that make up the pickfaces is provided, for example, in the manner described in U.S. Pat. No. 8,594,835 issued on Nov. 26, 2013, the disclosure of which is incorporated by reference herein in its entirety. While supply containers 265 are illustrated in FIG. 12A as being stored on side PAS2 of picking aisle 130A and breakpack goods containers 264 are shown stored on side PAS1 of picking aisle 130A, in other aspects, there may be a mix of supply containers 265 and breakpack goods containers 264 stored on a common side PAS1, PAS2 (e.g., either one or both of sides PAS1, PAS2) of the picking aisle 130A and/or a mix of supply containers 265 and breakpack goods containers 264 stored on a common shelf surface.

Figure 12C:
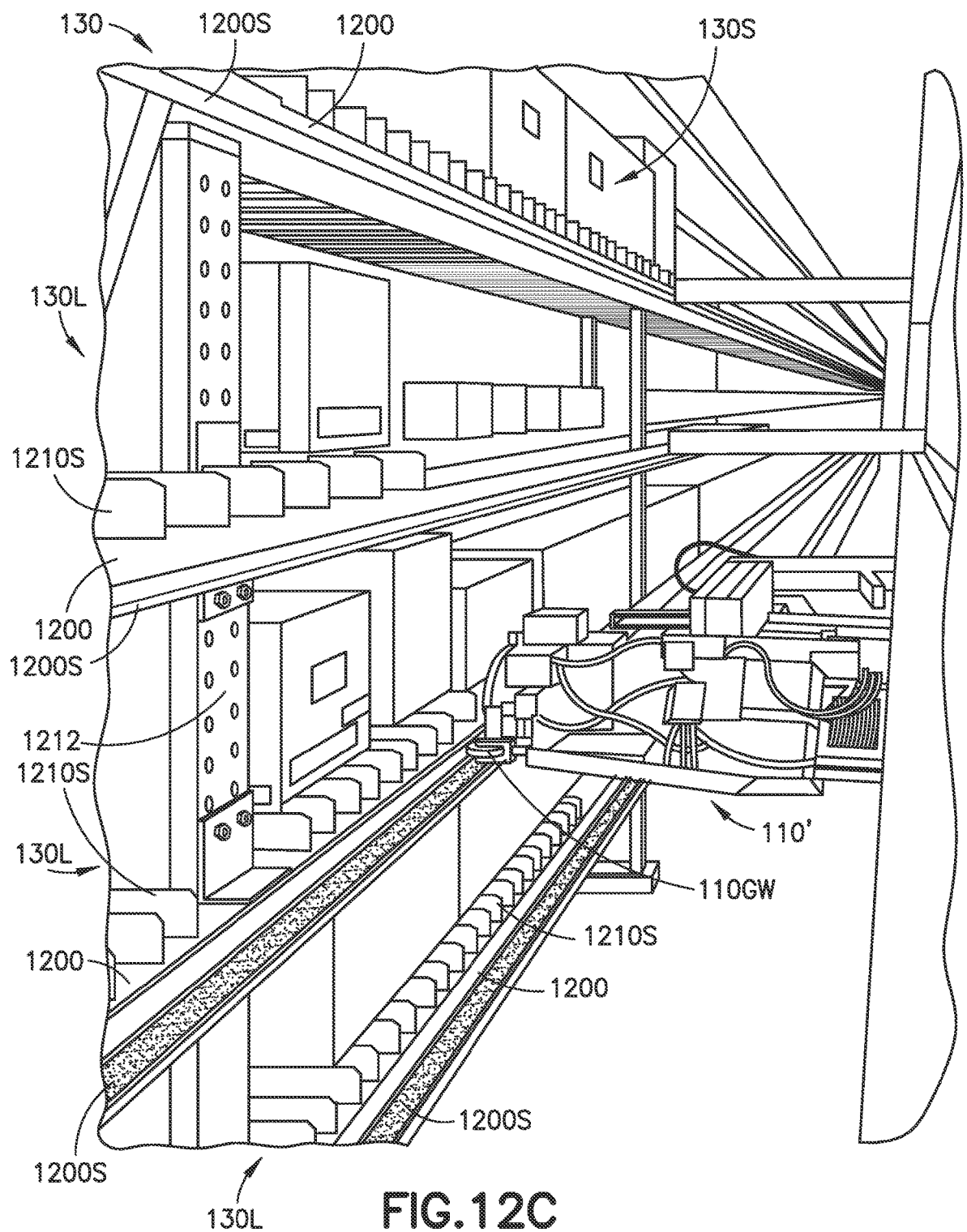
Figure 13A:
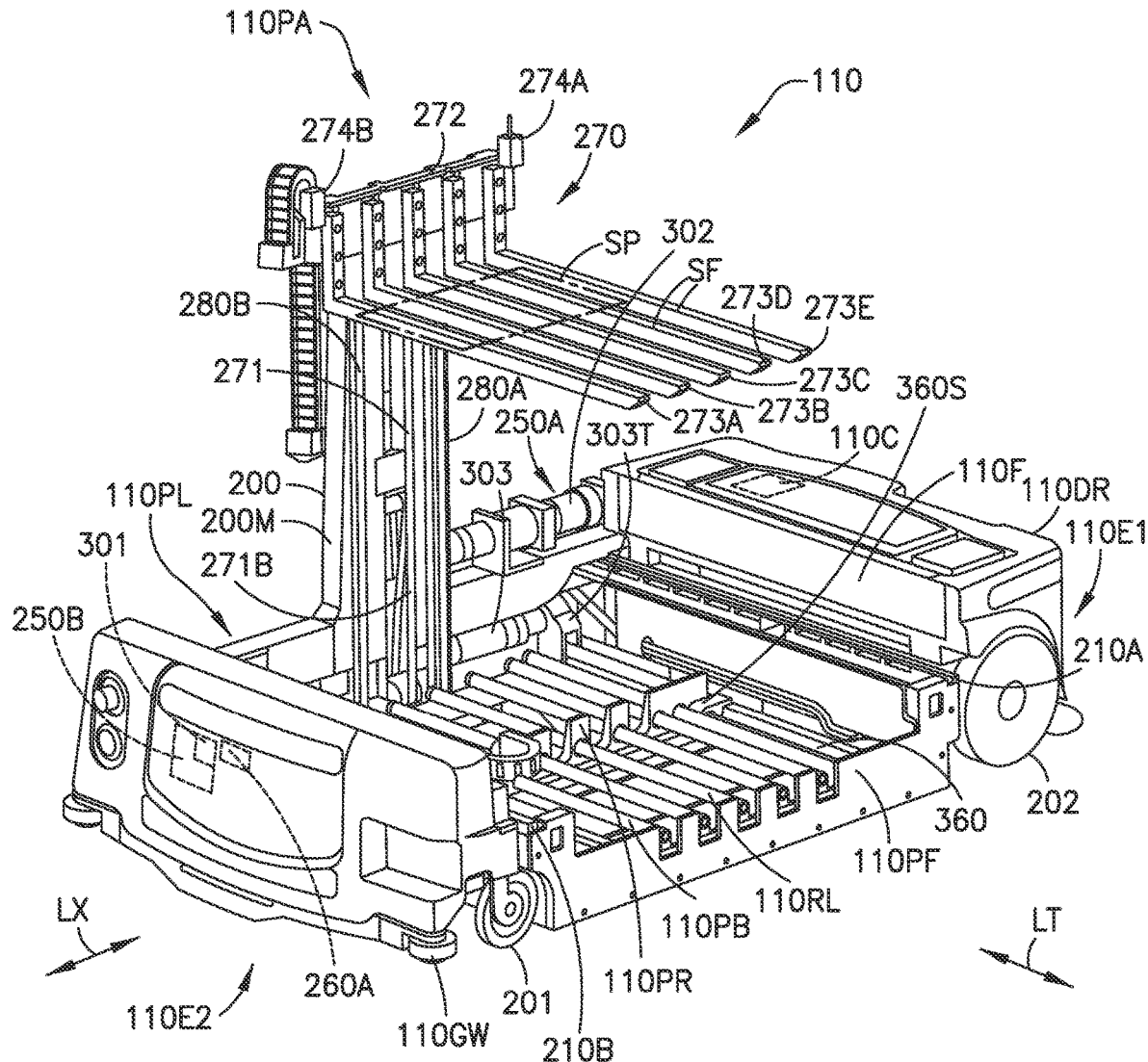
FIG. 13A is a schematic illustration of a transport vehicle in accordance with aspects of the disclosed embodiment.
Figure 13B:
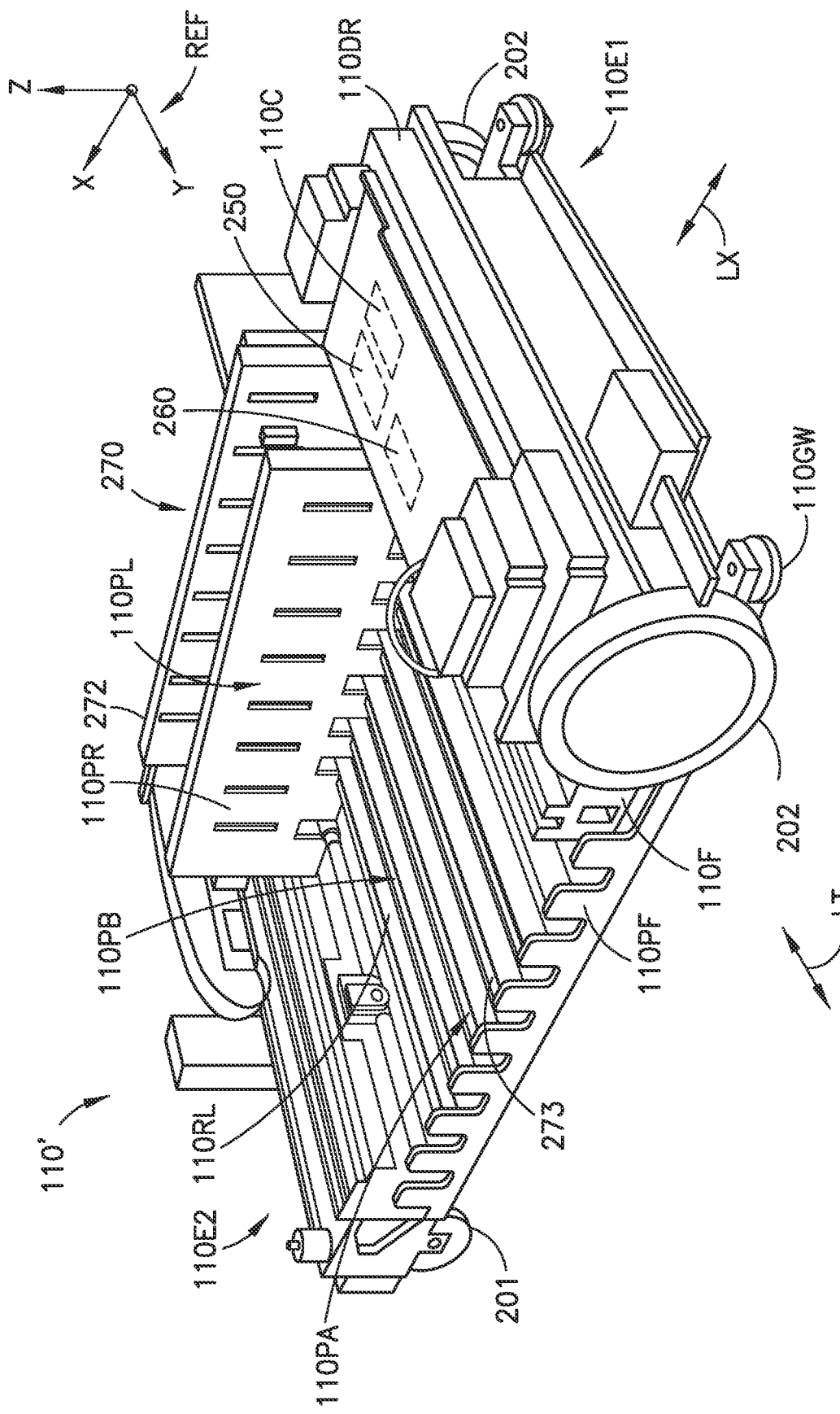
FIG. 13B is a schematic illustration of a transport vehicle in accordance with aspects of the disclosed embodiment.

In one aspect, referring to FIGS. 12C and 13B each of the storage levels 130L includes a single level of storage shelves to store a single level of case units (e.g. each storage level includes a single case unit support plane CUSP) and the container bots 110 are configured to transfer case units to and from the storage shelves of the respective storage level 130L. For example, the container bot 110' illustrated in FIG. 13B is substantially similar to container bot 110 described herein however, the container bot 110' is not provided with sufficient Z-travel of the transfer arm 110PA for placing case units on the multiple storage shelf levels 130LS1-130LS3 (e.g. accessible from a common rail 1200S) as described above. Here the transfer arm drive 250 (which may be substantially similar to one or more of drive 250A, 250B) includes only sufficient Z-travel for lifting the case units from the case unit support plane CUSP of the single level of storage shelves, for transferring the case units to and from the payload area 110PL and for transferring the case units between the fingers 273 of the transfer arm 110PA and the payload bed 110PB. Suitable examples of container bots 110' can be found in, for example, U.S. patent application Ser. No. 13/326,993 filed on Dec. 15, 2011, the disclosure of which is incorporated herein by reference in its entirety.

Referring again to FIG. 1B each container transfer deck 130DC or storage level 130L includes one or more lift pickface interface/handoff stations TS (referred to herein as interface stations TS) where case unit(s) (e.g. individual case units, pickfaces, supply containers, etc.), totes and/or breakpack goods containers 264 are transferred between the lift load handling devices LHD and container bots 110 on the container transfer deck 130DC. The interface stations TS are located at a side of the container transfer deck 130DC opposite the picking aisles 130A and rack modules RM, so that the container transfer deck 130DC is interposed between the picking aisles and each interface station TS. As noted above, each container bot 110 on each picking level 130L has access (via a respective container transfer deck 130DC) to each storage location 130S, each picking aisle 130A and each lift 150 on the respective storage level 130L, as such each container bot 110 also has access to each interface station TS on the respective level 130L. In one aspect the interface stations are offset from high speed bot travel paths HSTP along the container transfer deck 130DC so that container bot 110 access to the interface stations TS is undeterministic to bot speed on the high speed travel paths HSTP. As such, each container bot 110 can move a case unit(s) (e.g. individual case units, pickfaces (built by the bot), supply containers, etc.), totes and/or breakpack goods containers 264 from every interface station TS to every storage space 130S corresponding to the deck level 130L and vice versa.

In one aspect the interface stations TS are configured for a passive transfer (e.g. handoff) of case units (e.g. individual case units, pickfaces, supply containers, etc.), totes and/or breakpack goods containers 264 between the container bot 110 and the load handing devices LHD of the lifts 150 (e.g. the interface stations TS have no moving parts for transporting the case units) which will be described in greater detail below. For example, also referring to FIG. 14 the interface stations TS and/or buffer stations BS include one or more stacked levels TL1, TL2 of transfer rack shelves RTS (e.g. so as to take advantage of the lifting ability of the container bot 110 with respect to the stacked rack shelves RTS) which in one aspect are substantially similar to the storage shelves described above (e.g. each being formed by rails 1210, 1200 and slats 1210S) such that container bot 110 handoff (e.g. pick and place) occurs in a passive manner substantially similar to that between the container bot 110 and the storage spaces 130S (as described herein) where the case units or totes are transferred to and from the shelves. In one aspect the buffer stations BS on one or more of the stacked levels TL1, TL2 also serve as a handoff/interface station with respect to the load handling device LHD of the lift 150. In one aspect, where the bots, such as container bots 110', are configured for the transfer of case units (e.g. individual case units, pickfaces, supply containers, etc.), totes and/or breakpack goods containers 264 to a single level 130L of storage shelves, the interface stations TS and/or buffer stations BS also include a single level of transfer rack shelves (which are substantially similar to the storage rack shelves of the storage levels 130L described above with respect to, for example, FIG. 12B). As may be realized, operation of the storage and retrieval system with container bots 110' serving the single level storage and transfer shelves is substantially similar to that described herein. As may also be realized, load handling device LHD (or lift) handoff (e.g. pick and place) of case units (e.g. individual case units, pickfaces, supply containers, etc.), totes and/or breakpack goods containers 264 to the stacked rack shelves RTS (and/or the single level rack shelves) occurs in a passive manner substantially similar to that between the container bot 110 and the storage spaces 130S (as described herein) where the case units, totes and/or breakpack goods containers 264 are transferred to and from the shelves. In other aspects the shelves may include transfer arms (substantially similar to the container bot 110 transfer arm 110PA shown in FIG. 13A, although Z direction movement may be omitted when the transfer arm is incorporated into the interface station TS shelves) for picking and placing case units, totes and/or breakpack goods containers 264 from one or more of the container bot 110 and load handling device LHD of the lift 150. Suitable examples of an interface station with an active transfer arm are described in, for example, U.S. patent application Ser. No. 12/757,354 filed on Apr. 9, 2010, the disclosure of which is incorporated by reference herein in its entirety.

In one aspect, the location of the container bot 110 relative to the interface stations TS occurs in a manner substantially similar to bot location relative to the storage spaces 130S. For example, in one aspect, location of the container bot 110 relative to the storage spaces 130S and the interface stations TS occurs in a manner substantially similar to that described in U.S. patent application Ser. No. 13/327,035 filed on Dec. 15, 2011 (now U.S. Pat. No. 9,008,884) and Ser. No. 13/608,877 filed on Sep. 10, 2012 (now U.S. Pat. No. 8,954,188), the disclosures of which are incorporated herein by reference in their entireties. For example, referring to FIGS. 1A and 12B, the container bot 110 includes one or more sensors 110S that detect the slats 1210S or a locating feature 130F (such as an aperture, reflective surface, RFID tag, etc.) disposed on/in the rail 1200. The Slats and/or locating features 130F are arranged so as to identify a location of the container bot 110 within the storage and retrieval system, relative to e.g. the storages spaces and/or interface stations TS. In one aspect the container bot 110 includes a controller 110C that, for example, counts the slats 1210S to at least in part determine a location of the container bot 110 within the storage and retrieval system 100. In other aspects the location features 130F may be arranged so as to form an absolute or incremental encoder which when detected by the container bot 110 provides for a container bot 110 location determination within the storage and retrieval system 100.

As may be realized, referring to FIG. 14, the transfer rack shelves RTS at each interface/handoff station TS define multi-load stations (e.g. having one or more storage case unit holding locations for holding a corresponding number of case units or totes) on a common transfer rack shelf RS. As noted above, each load of the multi-load station is a single case unit/tote/breakpack goods container or a multi-case pickface (e.g. having multiple case units/totes/breakpack goods containers that are moved as a single unit) that is picked and paced by either the container bot 110 or load handling device LHD. As may also be realized, the bot location described above allows for the container bot 110 to position itself relative to the multi-load stations for picking and placing the case units/totes and pickfaces from a predetermined one of the holding locations of the multi-load station. The interface/handoff stations TS define multi-place buffers (e.g. buffers having one or more case holding location—see FIG. 13B—arranged along, for example, the X axis of the container bot 110 as the container bot 110 interfaces with the interface station TS) where inbound and/or outbound case units/totes/breakpack goods containers and pickfaces are temporarily stored when being transferred between the container bots 110 and the load handling devices LHD of the lifts 150.

In one aspect one or more peripheral buffer/handoff stations BS (substantially similar to the interface stations TS and referred to herein as buffer stations BS) are also located at the side of the container transfer deck 130DC opposite the picking aisles 130A and rack modules RM, so that the container transfer deck 130DC is interposed between the picking aisles and each buffer station BS. The peripheral buffer stations BS are interspersed between or, in one aspect as shown in FIGS. 1B and 14, otherwise in line with the interface stations TS. In one aspect the peripheral buffer stations BS are formed by rails 1210, 1200 and slats 1210S and are a continuation of (but a separate section of) the interface stations TS (e.g. the interface stations and the peripheral buffer stations are formed by common rails 1210, 1200). As such, the peripheral buffer stations BS, in one aspect, also include one or more stacked levels TL1, TL2 of transfer rack shelves RTS as described above with respect to the interface stations TS while in other aspects the buffer stations include a single level of transfer rack shelves. The peripheral buffer stations BS define buffers where case units/totes/breakpack goods containers and/or pickfaces are temporarily stored when being transferred from one container bot 110 to another different container bot 110 on the same storage level 130L as will be described in greater detail below. As maybe realized, in one aspect the peripheral buffer stations are located at any suitable location of the storage and retrieval system including within the picking aisles 130A and anywhere along the container transfer deck 130DC.

Still referring to FIGS. 1B and 14 in one aspect at least the interface stations TS are located on an extension portion or pier 130BD that extends from the container transfer deck 130DC, although in other aspects a length of the interface stations TS may be arranged and extend along the container transfer deck. In one aspect, the pier 130BD is similar to the picking aisles where the container bot 110 travels along rails 1200S affixed to horizontal support members 1200 (in a manner substantially similar to that described above). In other aspects, the travel surface of the pier 130BD may be substantially similar to that of the container transfer deck 130DC. Each pier 130BD is located at the side of the container transfer deck 130DC, such as a side that is opposite the picking aisles 130A and rack modules RM, so that the container transfer deck 130DC is interposed between the picking aisles and each pier 130BD. The pier(s) 130BD extends from the transfer deck at a non-zero angle relative to at least a portion of the high speed bot transport path HSTP. In other aspects the pier(s) 130BD extend from any suitable portion of the container transfer deck 130DC including the ends 130BE1, 130BE2 of the container transfer deck 130DCD. As may be realized, peripheral buffer stations BSD (substantially similar to peripheral buffers stations BS described above) may also be located at least along a portion of the pier 130BD.

Referring now to FIGS. 15A, 15B, 13B and 16, as described above, in one aspect the interface stations TS are passive stations and as such the load transfer device LHD of the lifts 150A, 150B have active transfer arms or pick heads 4000A. In one aspect the inbound lift modules 150A and the outbound lift modules 150B have different types of pick heads (as described in U.S. Pat. No. 9,856,083 previously incorporated by reference herein in its entirety) while in other aspects the inbound lift modules 150A and the outbound lift modules 150B have the same type of pick head similar to pick head 4000A. The pick heads of the lifts 150A, 150B may, at least in part, define the Y throughput axis as described herein. In one aspect, both the inbound and outbound lift modules 150A, 150B have a vertical mast 4002 along which a slide 4001 travels under the motive force of any suitable lift drive unit (e.g. connected to, for example, control server 120) configured to lift and lower the slide (and the pick head 4000A mounted thereto). The inbound lift module(s) 150A include a pick head 4000A mounted to the slide 4001 so that as the slide moves vertically the pick head 4000A moves vertically with the slide 4001. In this aspect the pick head 4000A includes one or more tines or fingers 4273 mounted to a base member 4272. The base member 4272 is movably mounted to one or more rail 4360S of frame 4200 which in turn is mounted to the slide 4001. Any suitable drive unit 4005, such as a belt drive, chain drive, screw drive, gear drive, etc. (which is substantially similar in form but may not be similar in capacity to drive 4002D as the drive 4005 may be smaller than drive 4002D) is mounted to the frame 4200 and coupled to the base member 4272 for driving the base member 4272 (with the finger(s)) in the direction of arrow 4050 (e.g., extension direction 4050A and retraction direction 4050B). The outbound lift module(s) 150B may be substantially similar to inbound lift module(s) 150A.

Figure 15A:
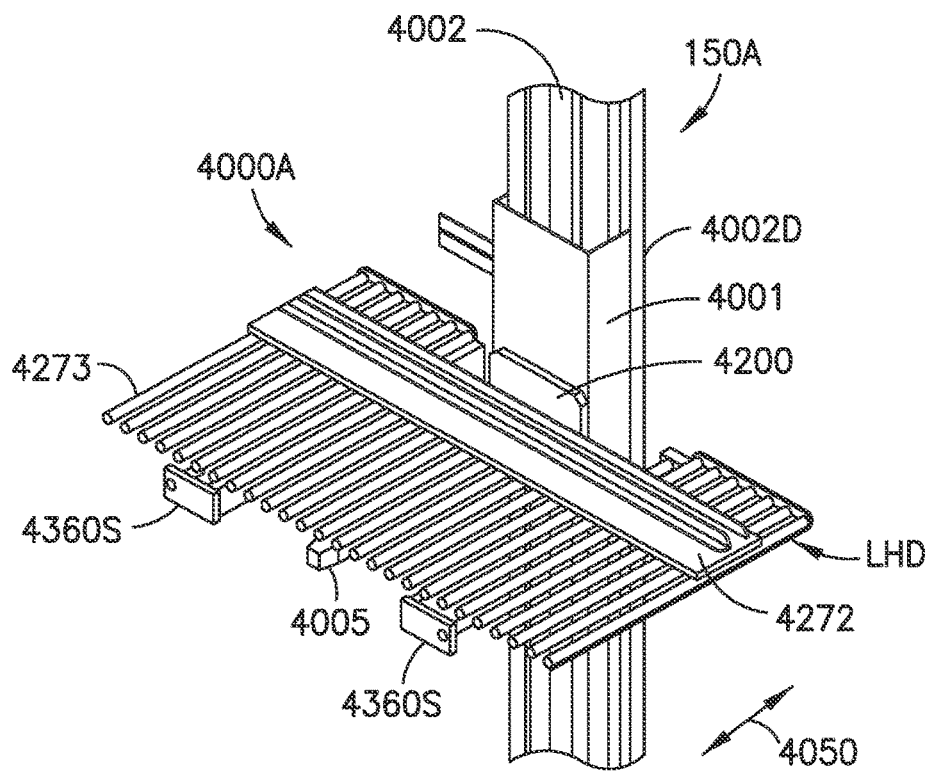
FIGS. 15A and 15B are schematic illustrations of a portion of the storage and retrieval system of FIGS. 1A, 1B, 1C, and 1E in accordance with aspects of the disclosed embodiment.
Figure 15B:
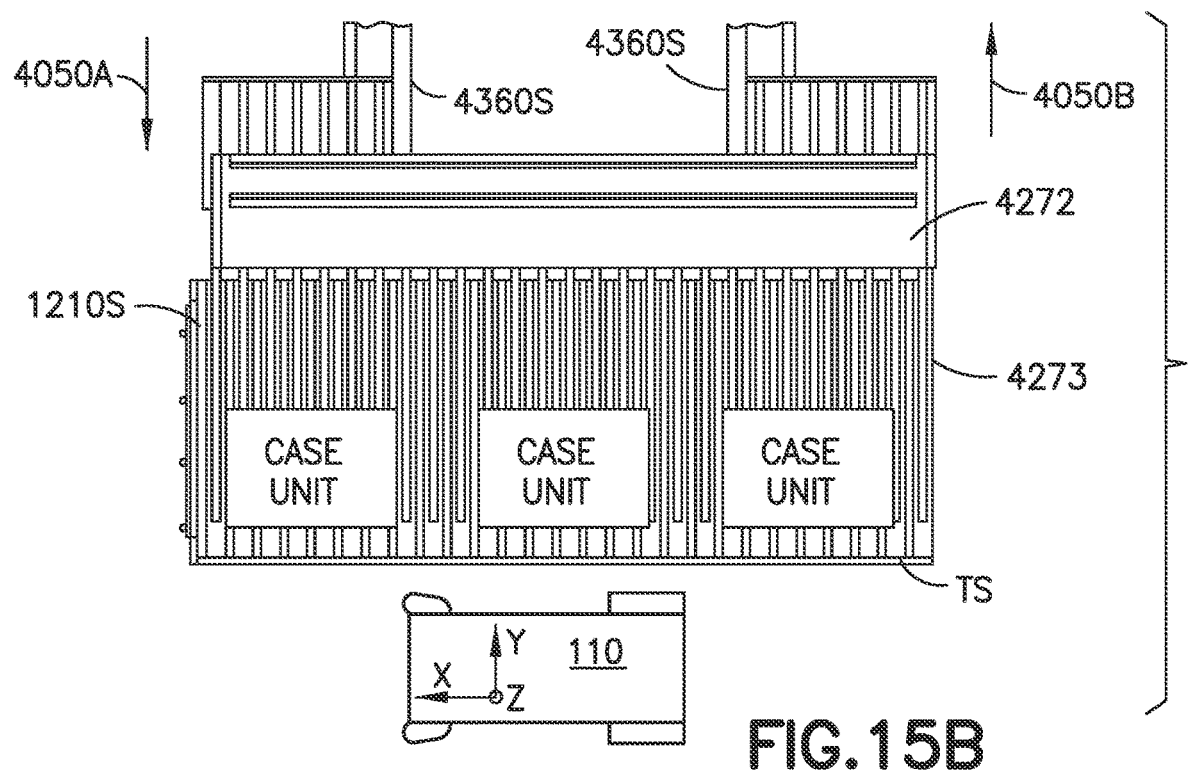
Figure 16:
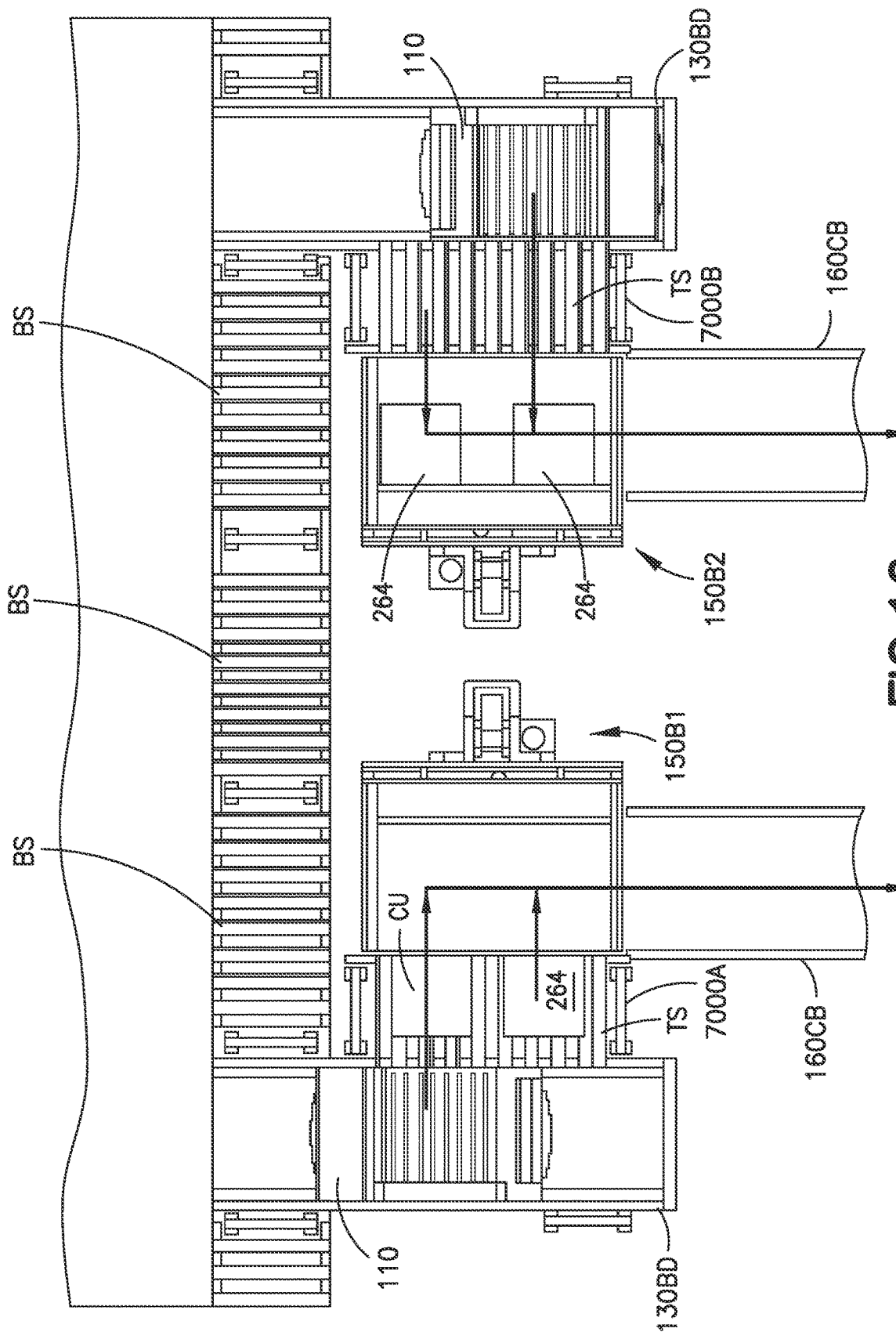
FIG. 16 is a schematic illustration of a portion of the storage and retrieval system of FIGS. 1A, 1B, 1C, and 1E in accordance with aspects of the disclosed embodiment.

As may be realized, the lift modules 150A, 150B are under the control of any suitable controller, such as control server 120, such that when picking and placing case unit(s) and/or breakpack goods containers the pick head 4000A is raised and/or lowered to a predetermined height corresponding to an interface station TS at a predetermined storage level 130L. As may be realized, the lift modules 150A, 150B provide the Z throughput axis (relative to both the bot frame of reference REF and the rack frame of reference REF2) of the storage and retrieval system where the output lift modules 150B sort case units on the fly for delivery to the output stations 160US as will be described below. At the interface stations TS the pick head 4000A or individual portion thereof (e.g. effector or load handling device LHD), corresponding to one or more case unit holding location(s) of the interface station TS from which one or more case unit(s) are being picked, is extended so that the fingers 4273 are interdigitated between the slats 1210S (as illustrated in FIG. 15B) underneath the case unit(s) (and/or breakpack goods containers) being picked. The lift 150A, 150B raises the pick head 4000A to lift the case unit(s) from the slats 1210S and retracts the pick head 4000A for transport of the case unit(s) and/or breakpack goods container to another level of the storage and retrieval system, such as for transporting the case unit(s) to one or more of output stations 160UT, 160EC. Similarly, to place one or more case unit(s) the pick head 4000A or individual portion thereof (e.g. effector or load handling device LHD), corresponding to one or more case unit holding location(s) of the interface station TS from which one or more case unit(s) are being placed, is extended so that the fingers 4273 are above the slats. The lift 150A, 150B lowers the pick head 4000A to place the case unit(s) on the slats 1210S and so that the fingers 4273 are interdigitated between the slats 1210S underneath the case unit(s) being picked.

Referring now to FIG. 13A, as noted above, the container bot 110 includes a transfer arm 110PA that effects the picking and placement of case units from the stacked storage spaces 130S, interface stations TS and peripheral buffer stations BS, BSD defined at least in part, in the Z direction) by one or more of the rails 1210A-1210C, 1200 (e.g. where the storage spaces, interface stations and/or peripheral buffer stations may be further defined in the X and Y directions, relative to either of the rack frame of reference REF2 or the bot frame of reference REF, through the dynamic allocation of the case units as described above). As may be realized, the bot defines the X throughput axis and, at least in part, the Y throughput axis (e.g. relative to the bot frame of reference REF) as will be described further below. The container bots 110, as noted above, transport case units between each lift module 150 and each storage space 130S on a respective storage level 130L. The container bots 110 include a frame 110F having a drive section 110DR and a payload section 110PL. The drive section 110DR includes one or more drive wheel motors each connected to a respective drive wheel(s) 202 for propelling the container bot 110 along the X direction (relative to the bot frame of reference REF so as to define the X throughput axis). As may be realized, the X axis of bot travel is coincident with the storage locations when the container bot 110 travels through the picking aisles 130A. In this aspect the container bot 110 includes two drive wheels 202 located on opposite sides of the container bot 110 at end 110E1 (e.g. first longitudinal end) of the container bot 110 for supporting the container bot 110 on a suitable drive surface however, in other aspects any suitable number of drive wheels are provided on the container bot 110. In one aspect each drive wheel 202 is independently controlled so that the container bot 110 may be steered through a differential rotation of the drive wheels 202 while in other aspects the rotation of the drive wheels 202 may be coupled so as to rotate at substantially the same speed. Any suitable wheels 201 are mounted to the frame on opposite sides of the container bot 110 at end 110E2 (e.g. second longitudinal end) of the container bot 110 for supporting the container bot 110 on the drive surface. In one aspect the wheels 201 are caster wheels that freely rotate allowing the container bot 110 to pivot through differential rotation of the drive wheels 202 for changing a travel direction of the container bot 110. In other aspects the wheels 201 are steerable wheels that turn under control of, for example, a bot controller 110C (which is configured to effect control of the container bot 110 as described herein) for changing a travel direction of the container bot 110. In one aspect the container bot 110 includes one or more guide wheels 110GW located at, for example, one or more corners of the frame 110F. The guide wheels 110GW may interface with the storage structure 130, such as guide rails (not shown) within the picking aisles 130A, on the container transfer deck 130DC and/or at interface or transfer stations for interfacing with the lift modules 150 for guiding the container bot 110 and/or positioning the container bot 110 a predetermined distance from a location to/from which one or more case units are placed and/or picked up as described in, for example, U.S. patent application Ser. No. 13/326,423 filed on Dec. 15, 2011 the disclosure of which is incorporated herein by reference in its entirety. As noted above, the container bots 110 may enter the picking aisles 130A having different facing directions for accessing storage spaces 130S located on both sides of the picking aisles 130A. For example, the container bot 110 may enter a picking aisle 130A with end 110E2 leading the direction of travel or the bot may enter the picking aisle 130A with end 110E1 leading the direction of travel.

The payload section 110PL of the container bot 110 includes a payload bed 110PB, a fence or datum member 110PF, a transfer arm 110PA and a pusher bar or member 110PR. In one aspect the payload bed 110PB includes one or more rollers 110RL that are transversely mounted (e.g. relative to a longitudinal axis LX of the container bot 110) to the frame 110F so that one or more case units and/or breakpack goods containers carried within the payload section 110PL can be longitudinally moved (e.g. justified with respect to a predetermined location of the frame/payload section and/or a datum reference of one or more case units) along the longitudinal axis of the bot, e.g., to position the case unit and/or breakpack goods containers at a predetermined position within the payload section 110PL and/or relative to other case units and/or breakpack goods containers within the payload section 110PL (e.g. longitudinal forward/aft justification of case units). In one aspect the rollers 110RL may be driven (e.g. rotated about their respective axes) by any suitable motor for moving the case units and/or breakpack goods containers within the payload section 110PL. In other aspects the container bot 110 includes one or more longitudinally movable pusher bar (not shown) for pushing the case units and/or breakpack goods containers over the rollers 110RL for moving the case unit(s) and/or breakpack goods container(s) to the predetermined position within the payload section 110PL. The longitudinally movable pusher bar may be substantially similar to that described in, for example, U.S. patent application Ser. No. 13/326,952 filed on Dec. 15, 2011, the disclosure of which was previously incorporated by reference herein in its entirety. The pusher bar 110PR is movable in the Y direction, relative to the container bot 110 reference frame REF to effect, along with the fence 110PF and or pick head 270 of the transfer arm 110PA, a lateral justification of case unit(s) and/or breakpack goods container(s) within the payload area 110PL in the manner described in U.S. Provisional Patent Application No. 62/107,135 filed on Jan. 23, 2015, previously incorporated herein by reference in their entireties.

Still referring to FIG. 13A, the case units and/or breakpack goods containers are placed on the payload bed 110PB and removed from the payload bed 110PB with the transfer arm 110PA along the Y throughput axis. The transfer arm 110PA includes a lift mechanism or unit 200 located substantially within the payload section 110PL as described in, for example, U.S. Provisional Patent Application No. 62/107,135 filed on Jan. 23, 2015, previously incorporated herein by reference in their entireties. The lift mechanism 200 provides both gross and fine positioning of pickfaces (which may include either case units or breakpack goods containers, or both case units and breakpack goods containers) carried by the container bot 110 which are to be lifted vertically into position in the storage structure 130 for picking and/or placing the pickfaces and/or individual case units to the storage spaces 130S (e.g. on a respective storage level 130L on which the container bot 110 is located). For example, the lift mechanism 200 provides for picking and placing case units at the multiple elevated storage shelf levels 130LS1-130LS3, TL1, TL2 accessible from the common picking aisle or the breakpack goods interface locations 263L accessible from the container bot travel surface(s) 266RS (see e.g. FIGS. 2, 12A, and 14).

The lift mechanism 200 is configured so that combined robot axis moves are performed (e.g. combined substantially simultaneous movement of the pusher bar 110PR, lift mechanism 200, pick head extension and fore/aft justification mechanism(s) such as, e.g., the longitudinally movable pusher bar described above), so that different/multi-SKU or multi-pick payloads are handled by the container bot 110. In one aspect, the actuation of the lifting mechanism 200 is independent of actuation of the pusher bar 110PR as will be described below. The decoupling of the lift mechanism 200 and pusher bar 110PR axes provides for combined pick/place sequences effecting a decreased pick/place cycle time, increased storage and retrieval system throughput and/or increased storage density of the storage and retrieval system as described above. For example, the lift mechanism 200 provides for picking and placing case units at multiple elevated storage shelf levels accessible from a common picking aisle and/or interface station deck 1200S as described above.

The lifting mechanism may be configured in any suitable manner so that a pick head 270 of the container bot 110 bi-directionally moves along the Z axis (e.g. reciprocates in the Z direction—see FIG. 13A). In one aspect, the lifting mechanism includes a mast 200M and the pick head 270 is movably mounted to the mast 200M in any suitable manner. The mast is movably mounted to the frame in any suitable manner so as to be movable along the lateral axis LT of the container bot 110 (e.g. in the Y direction so as to define the Y throughput axis). In one aspect the frame includes guide rails 210A, 210B to which the mast 200 is slidably mounted. A transfer arm drive 250A, 250B may be mounted to the frame for effecting at least movement of the transfer arm 110PA along the lateral axis LT (e.g. Y axis) and the Z axis. In one aspect the transfer arm drive 250A, 250B includes an extension motor 301 and a lift motor 302. The extension motor 301 may be mounted to the frame 110F and coupled to the mast 200M in any suitable manner such as by a belt and pulley transmission 260A, a screw drive transmission (not shown) and/or a gear drive transmission (not shown). The lift motor 302 may be mounted to the mast 200M and coupled to pick head 270 by any suitable transmission, such as by a belt and pulley transmission 271, a screw drive transmission (not shown) and/or a gear drive transmission (not shown). As an example, the mast 200M includes guides, such as guide rails 280A, 280B, along which the pick head 270 is mounted for guided movement in the Z direction along the guide rails 280A, 280B. In other aspects the pick head is mounted to the mast in any suitable manner for guided movement in the Z direction. With respect to the transmissions 271, a belt 271B of the belt and pulley transmission 271 is fixedly coupled to the pick head 270 so that as the belt 271 moves (e.g. is driven by the motor 302) the pick head 270 moves with the belt 271 and is bi-directionally driven along the guide rails 280A, 280B in the Z direction. As may be realized, where a screw drive is employed to drive the pick head 270 in the Z direction, a nut may be mounted to the pick head 270 so that as a screw is turned by the motor 302 engagement between the nut and screw causes movement of the pick head 270. Similarly, where a gear drive transmission is employed a rack and pinion or any other suitable gear drive may drive the pick head 270 in the Z direction. In other aspects any suitable linear actuators are used to move the pick head in the Z direction. The transmission 260A for the extension motor 301 is substantially similar to that described herein with respect to transmission 271.

Still referring to FIG. 13A the pick head 270 of the container bot 110 transfers case units between the container bot 110 and a case unit and/or breakpack goods container pick/place location such as, for example, the storage spaces 130S, peripheral buffer stations BS, BSD, interface stations TS (see FIGS. 1B and 14), induction conveyor 500A, 500B, 500C for transfer of supply containers 265 to the breakpack operation station 140 (see FIGS. 5A and 5C), and/or breakpack goods interface 263 (see FIG. 6D), and in other aspects substantially directly between the container bot 110 and a lift module(s) 150. In one aspect, the pick head 270 includes a base member 272, one or more tines or fingers 273A-273E and one or more actuators 274A, 274B. The base member 272 is mounted to the mast 200M, as described above, so as to ride along the guide rails 280A, 280B. The one or more tines 273A-273E are mounted to the base member 272 at a proximate end of the tines 273A-273E so that a distal end of the tines 273A-273E (e.g. a free end) is cantilevered from the base member 272. Referring again to FIG. 12B, the tines 273A-273E are configured for insertion between slats 1210S that form the case unit support plane CUSP of the storage shelves (and similar slats of the peripheral buffer stations BS, BSD, interface stations TS, and/or container support surfaces of the breakpack modules 266 (e.g., such as of the induction conveyor 500A-500C, the container output conveyors 820, and breakpack goods interface locations 263L).

One or more of the tines 273A-273E is movably mounted to the base member 272 (such as on a slide/guide rail similar to that described above) so as to be movable in the Z direction. In one aspect any number of tines are mounted to the base member 272 while in the aspect illustrated in the figures there are, for example, five tines 273A-273E mounted to the base member 272. Any number of the tines 273A-273E are movably mounted to the base member 272 while in the aspect illustrated in the figures, for example, the outermost (with respect to a centerline CL of the pick head 270) tines 273A, 273E are movably mounted to the base member 272 while the remaining tines 273B-273D are immovable relative to the base member 272.

In this aspect the pick head 270 employs as few as three tines 273B-273D to transfer smaller sized case units (and/or groups of case units/breakpack goods containers) to and from the container bot 110 and as many as five tines 273A-273E to transfer larger sized case units (and/or groups of case units/breakpack goods containers) to and from the container bot 110. In other aspects, less than three tines are employed (e.g. such as where more than two tines are movably mounted to the base member 272) to transfer smaller sized case units. For example, in one aspect all but one tine 273A-273E is movably mounted to the base member so that the smallest case unit being transferred to and from the container bot 110 without disturbing other case units on, for example, the storage shelves has a width of about the distance X1 between slats 1210S (see FIG. 12B).

The immovable tines 373B-373D define a picking plane SP of the pick head 270 and are used when transferring all sizes of case units, breakpack goods containers (and/or pickfaces of case units and/or breakpack goods containers) while the movable tines 373A, 373E are selectively raised and lowered (e.g. in the Z direction with the actuators 274A, 274B) relative to the immovable tines 373B-373D to transfer larger case units (and/or pickfaces). Still referring to FIG. 13A an example is shown where all of the tines 273A-273E are positioned so that a case unit support surface SF of each tine 273A-273E is coincident with the picking plane SP of the pick head 270 however, as may be realized, the two end tines 273A, 273E are movable so as to be positioned lower (e.g. in the Z direction) relative to the other tines 273B-273D so that the case unit support surface SF of tines 273A, 273E is offset from (e.g. below) the picking plane SP so that the tines 273A, 273E do not contact the one or more case units or breakpack goods containers (and/or pickfaces of case units and/or breakpack goods containers) carried by the pick head 270 and do not interfere with any unpicked case units or breakpack goods containers positioned in storage spaces 130S on the storage shelves or any other suitable case unit/breakpack goods container holding location.

The movement of the tines 273A-273E in the Z direction is effected by the one or more actuators 274A, 274B mounted at any suitable location of the transfer arm 110PA. In one aspect, the one or more actuators 274A, 274B are mounted to the base member 272 of the pick head 270. The one or more actuators are any suitable actuators, such as linear actuators, capable of moving one or more tines 273A-273E in the Z direction. In the aspect illustrated in, for example, FIG. 13A there is one actuator 274A, 274B for each of the movable tines 273A, 273E so that each moveable tine is independently movable in the Z direction. In other aspects one actuator may be coupled to more than one movable tine so that the more than one movable tine move as a unit in the Z direction.

As may be realized, movably mounting one or more tines 273A-273E on the base member 272 of the pick head 270 provides for full support of large case units, breakpack goods containers, and/or pickfaces (e.g., of case units and/or breakpack goods containers) on the pick head 270 while also providing the ability to pick and place small case units or breakpack goods containers without interfering with other case units or breakpack goods containers positioned on/at, for example, the storage spaces, interface stations, peripheral buffer stations, and/or container holding areas of the breakpack modules 266 (as described herein). The ability to pick and place variably sized case units without interfering with other case units on/at the storage spaces, interface stations, peripheral buffer stations, breakpack operation stations, and/or breakpack goods interfaces reduces a size of a gap GP (see FIG. 12A) between case units on the storage shelves thereof. As may be realized, because the tines 273B-273D are fixed to the base member 272 there is no duplicative motion when picking/placing case units as the lifting and lowering of case units and/or pickfaces to and from the case unit holding location is effected solely by the lift motor 301, 301A.

Referring again to FIG. 13A, it is again noted that the pusher bar 110PR is movable independent of the transfer arm 110PA. The pusher bar 110PR is movably mounted to the frame in any suitable manner such as by, for example, a guide rod and slide arrangement and is actuated along the Y direction (e.g. in a direction substantially parallel to the extension/retraction direction of the transfer arm 110PA). In one aspect at least one guide rod 360 is mounted within the payload section 110PL so as to extend transversely relative to the longitudinal axis LX of the frame 110F. The pusher bar 110PR may include at least one slide member 360S configured to engage and slide along a respective guide rod 360. In one aspect, at least the guide rod/slide arrangement holds the pusher bar 110PR captive within the payload section 110PL. The pusher bar 110PR is actuated by any suitable motor and transmission, such as by motor 303 and transmission 303T. In one aspect the motor 303 is a rotary motor and the transmission 303T is a belt and pulley transmission. In other aspects the pusher bar 110PR may be actuated by a linear actuator having substantially no rotary components.

Figure 17A:
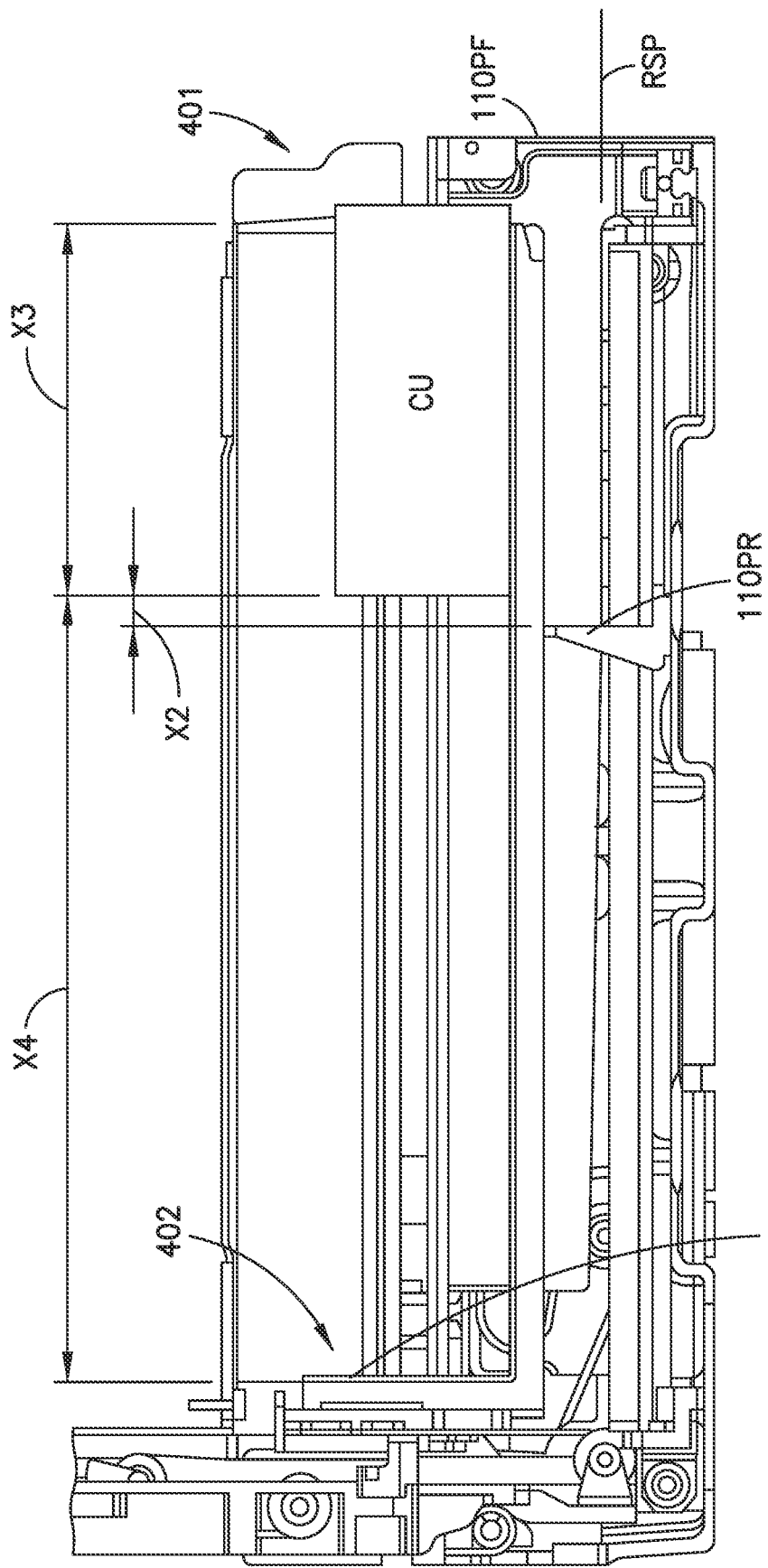
Figure 17B:
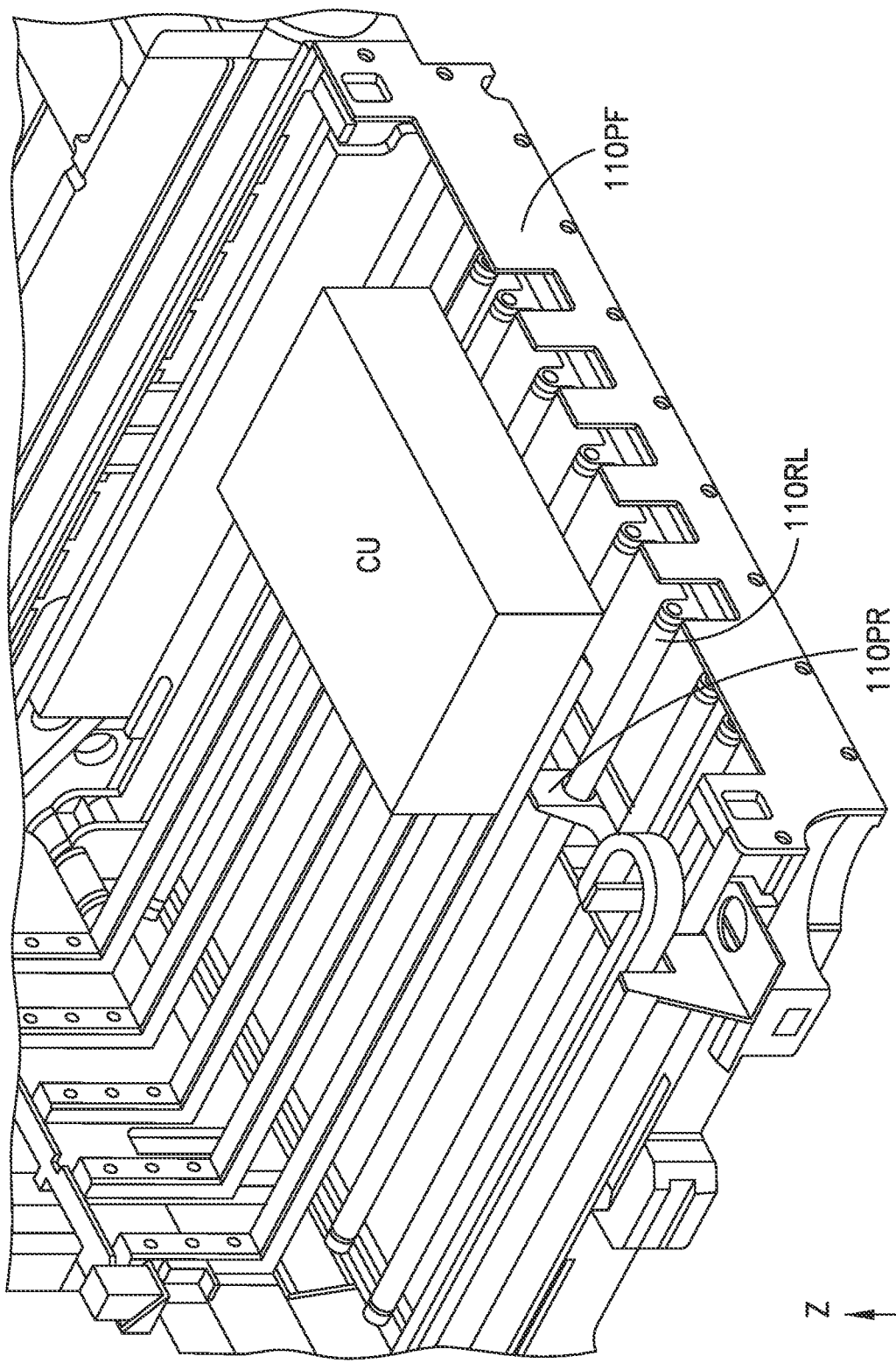
Figure 17C:
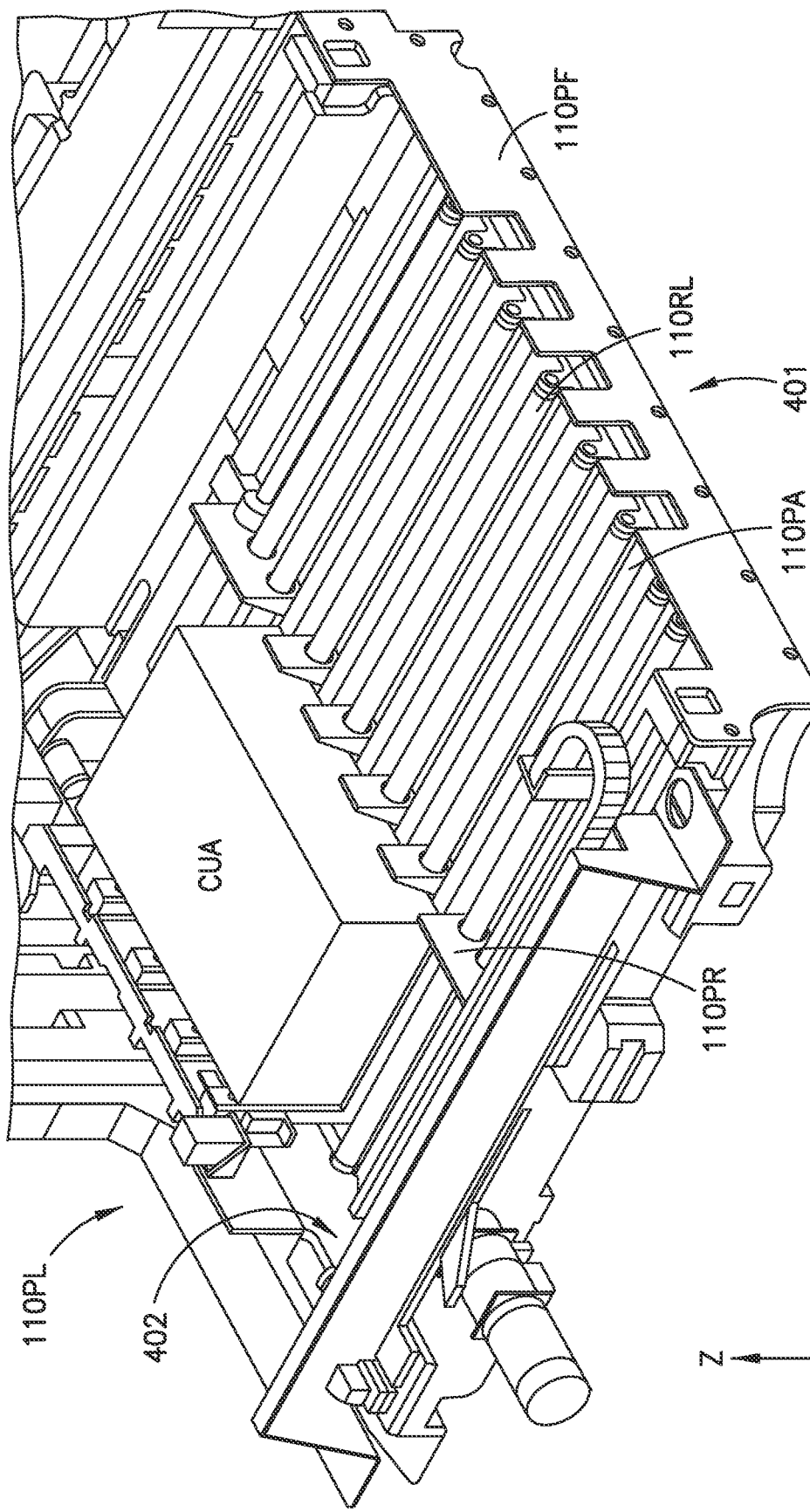

The pusher bar 110PR is arranged within the payload section 110PL so as to be substantially perpendicular to the rollers 110RL and so that the pusher bar 110PR does not interfere with the pick head 270. As can be seen in FIG. 17C, the container bot 110 is in a transport configuration where at least one case unit/breakpack goods container would be supported on the rollers 110RL (e.g. the rollers collectively form the payload bed). In the transport configuration the tines 273A-273E of the pick head 270 are interdigitated with the rollers 110RL and are located below (along the Z direction) a case unit support plane RSP (see FIG. 17A) of the rollers 110RL. The pusher bar 110PR is configured with slots 351 (FIG. 17D) into which the tines 273A-273E pass where sufficient clearance is provided within the slots 351 to allow the tines to move below the case unit support plane RSP and to allow free movement of the pusher bar 110PR without interference from the tines 273A-273E. The pusher bar 110PR also includes one or more apertures through which the rollers 110RL pass where the apertures are sized to allow free rotation of the rollers about their respective axes. As may be realized, the independently operable pusher bar 110PR does not interfere with the rollers 110RL, extension of the transfer arm 110PA in the transverse direction (e.g. Y direction) and the lifting/lowering of the pick head 270.

Figure 18:
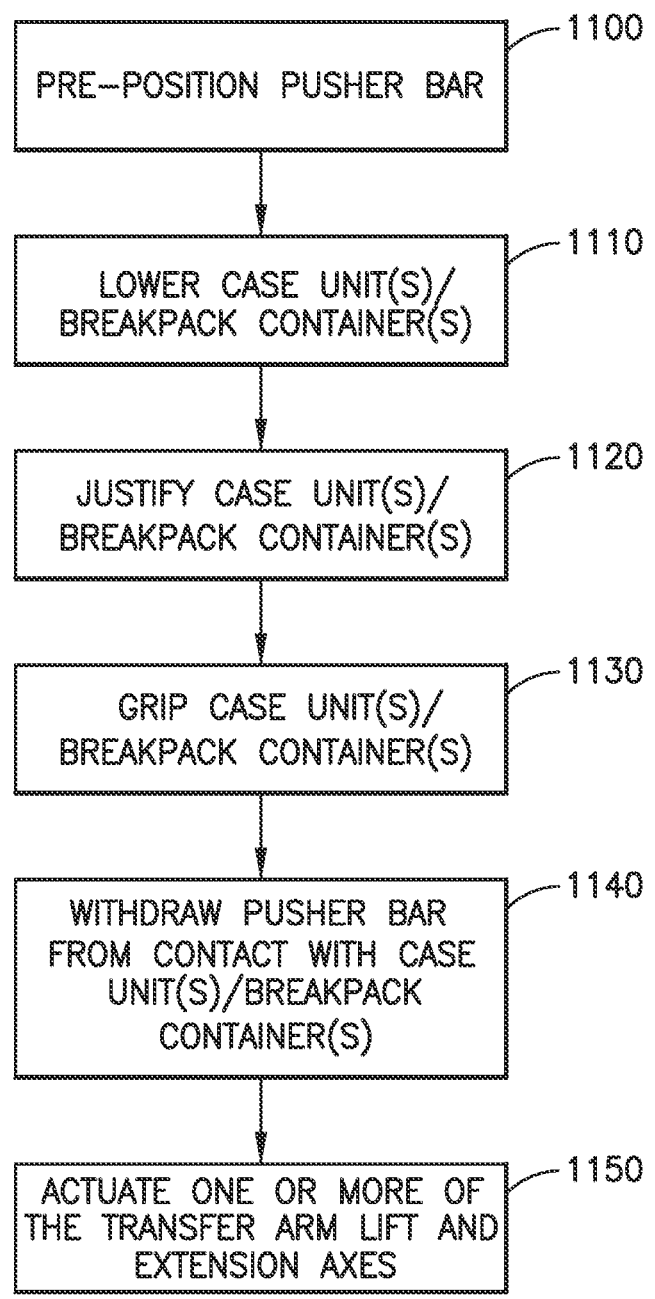
FIGS. 18 and 19 are exemplary flow diagrams in accordance with aspects of the disclosed embodiment.

As noted above, because the pusher bar 110PR is a separate, standalone axis of the container bot 110 that operates free of interference from the pick head 270 extension and lift axes, the pusher bar 110PR can be operated substantially simultaneously with the lifting and/or extension of the transfer arm 110PA. The combined axis moves (e.g. the simultaneous movement of the pusher bar 110PR with the transfer arm 110PA extension and/or lift axes) provides for increased payload handling throughput in and along the Y throughput axis and effects an ordered (e.g. according to a breakpack sequence, which may be based at least in part on the predetermined load out sequence) multi-pick of two or more case units and/or breakpack goods containers from a common picking aisle, in one common pass of the picking aisle for transfer to breakpack operation station 140. For example, referring to FIGS. 17A-17B during a transfer arm 110PA multi-pick/place sequence the pusher bar 110PR is prepositioned (as the case unit(s), breakpack goods container(s), and/or pickface is/are being picked and transferred into the payload section 110PL) to a location that is a predetermined distance X2 away from the contact depth X3 (e.g. the depth of the tines occupied by the case unit(s), breakpack goods container(s), and/or pickface CU when being picked/placed from a storage space or other holding location) (FIG. 18, Block 1100). The distance X2 is a minimized distance that only allows sufficient clearance between pusher bar 110PR and the case unit(s)/breakpack goods container(s) to allow the case unit(s)/breakpack goods container(s) to be seated on the rollers 110RL. As the case unit(s) CU and/or breakpack goods container(s) 264 are lowered onto the rollers 110RL (FIG. 18, Block 1110) the distance travelled by the pusher bar 110PR to contact the case unit(s) CU and/or breakpack goods container(s) 264 is a shorter distance X2 when compared to moving from a back side (or rear) 402 (relative to the lateral direction and an access side 401 of the payload section 110PL) of the payload section 110PL a distance X4 as with conventional transport vehicles. When the case unit(s) CU and/or breakpack goods container(s) 264 are lowered by the transfer arm 110PA and transferred to the rollers 110RL so as to be solely supported by the rollers 110RL, the pusher bar 110PR is actuated to forward (relative to the lateral direction and an access side 401 of the payload section 110PL) justify the case unit(s) CU and/or breakpack goods container(s) 264 (FIG. 18, Block 1120). For example, the pusher bar 110PR may push the case unit(s) CU and/or breakpack goods container(s) 264 laterally in the Y direction so that the case unit(s) contact the fence 110PF (which is located at the access side 401 of the payload section 110PL so that a case unit reference datum may be formed through contact between the case unit(s) CU/breakpack goods container(s) 264 and the fence 110PF. In one aspect the pusher bar 110PR may engage or otherwise grip the case unit(s) CU and/or breakpack goods container(s) 264 during transport of the case units/breakpack goods containers (e.g. so as to hold the case unit(s) and/or breakpack goods container(s) 264 against the fence 110PF) for maintaining the case unit(s) CU and/or breakpack goods container(s) 264 in a predetermined spatial relationship with each other and a reference frame REF (FIG. 13A) of the container bot 110 (FIG. 18, Block 1130). When placing the case unit(s) and/or breakpack goods container(s) 264 the pusher bar 110PR, after justifying the case unit(s) CU and/or breakpack goods container(s) 264 against the fence 110PF, is withdrawn (e.g. in the Y direction) from contact with the case unit(s) CU and/or breakpack goods container(s) 264 (FIG. 18, Block 1140). Substantially immediately after the pusher bar 110PR disengages the case unit(s) CU and/or breakpack goods container(s) 264 one or more of the lift axis (e.g. in the Z direction) and extension axis (e.g. in the Y direction) of the transfer arm 110PA are actuated substantially simultaneously with the withdrawing movement of the pusher bar 110PR (FIG. 18, Block 1150). In one aspect both the lift and extension axes are actuated when the pusher bar is withdrawn from contact with the case unit(s) CU and/or breakpack goods container(s) 264 while in other aspect one of the lift and extension axes is actuated. As may be realized, the simultaneous movement of the transfer arm 110PA lift axis and/or extension axis with the withdrawal of the pusher bar 110PR as well as the decreased distance the pusher moves to justify the case unit(s) CU and/or breakpack goods container(s) 264 decreases the time needed to transfer case unit(s) CU and/or breakpack goods container(s) 264 to and from the container bot 110 and increases throughput of the storage and retrieval system 100.

As an example of case manipulation on the container bot 110, referring also to FIGS. 17C-17F, container(s) CUA (which may be a supply container 265 (e.g., a pickface, case unit(s), etc.) or a breakpack goods container 264) may be picked from a holding location (e.g. such as storage spaces 130S in a common picking aisle for effecting the ordered multi-pick, and in other aspects from a lift interface station TS, breakpack goods interface location(s) 263L of a breakpack goods interface 263, and/or a case unit buffer station BS located in a picking aisle or on the transfer deck) and transferred into the payload section 110PL. As the container(s) CUA is being transferred into the payload section 110PL the pusher bar 110PR may be pre-positioned adjacent the fence 110PF so that the pusher bar 110PR is positioned between the container(s) CUA and the fence 110PF when the container(s) CUA is lowered for transfer to the rollers 110RL. The pusher bar 110PR is actuated to push the container(s) CUA (resting on the rollers 110RL) in the Y direction towards the back (e.g. rear) 402 of the payload section 110PL so that the container(s) CUA contacts a justification surface 273JS (FIG. 17A) of the tines 273A-273E and is justified to the back 402 of the payload section 110PL.

In one aspect, the container bot 110 continues to traverse the common picking aisle in the same direction XC (e.g. so that all of the case units in the ordered multi-pick are picked in the common pass of the picking aisle with the container bot 110 travelling in a single direction) and stops at another predetermined storage space 130S according to the predetermined breakpack sequence (which breakpack sequence may at least in part be determined by an order out sequence of goods from the automated storage and retrieval system 100 for order fulfillment). As noted above, the pusher bar 110PR remains in contact with (e.g. grips) the container(s) CUA during transport of the case unit(s) between case unit holding locations so that the container(s) CUA remains in a predetermined location at the back 402 of the payload section 110PL (and/or at a predetermined location longitudinally) relative to the reference frame REF of the container bot 110. To pick subsequent containers, from for example, the another storage space of the common picking aisle the pusher bar 110PR is moved in the Y direction to disengage the container(s) CUA and the lift and extension axes of the transfer arm 110PA are actuated to retrieve another container(s) CUB from the other storage space 130S2 (or in other aspects from e.g. a lift/handoff interface station TS, breakpack goods interface location(s) 263L, and/or a buffer/handoff station BS as noted above). While the container(s) CUB are being picked the pusher bar 110PR is positioned in the Y direction adjacent the back 402 of the payload section 110PL so as to be located between the container(s) CUA and the justification surface 273JS of the tines 273A-273E. The container(s) CUB are transferred into the payload section and lowered/placed on the rollers 110RL so that the containers CUA, CUB are arranged relative to each other along the Y axis. The pusher bar 110PR is actuated in the Y direction to push the containers CUA, CUB towards the fence 110PF to forward justify the containers CUA, CUB and grip/hold the containers CUA, CUB for transport to a breakpack module 266. As may be realized, in one aspect the containers CUA, CUB are placed at a holding location together as a unit while in other aspects the containers CUA, CUB are sorted, e.g. transported to and placed at separate positions of a common holding location, such as at a common support surface 140S of breakpack operation station 140 or at different case unit holding locations, such as for example, placement of container CUB at breakpack operation station 140 and container CUA at a lift 150B or other holding location (such as another breakpack operation station 140 of another breakpack module 266. For example, referring also to FIGS. 1B and 16, the container bot 110 carrying the multi-pick payload transfers the containers CUA, CUB of the multi-pick payload to one or more interface stations TS (which include buffer shelves) corresponding to output lifts 150B.

Figure 17D:
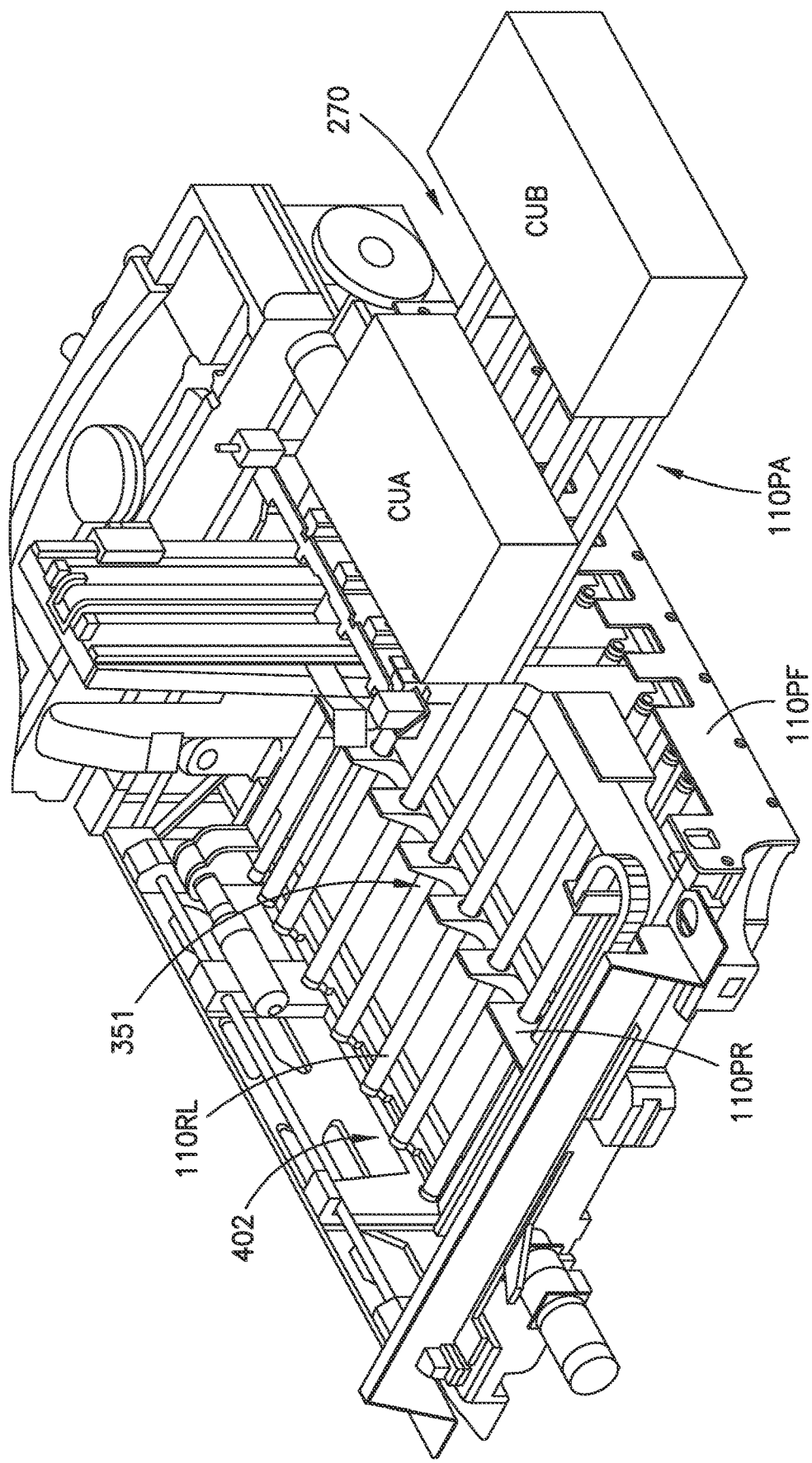
Figure 17E:
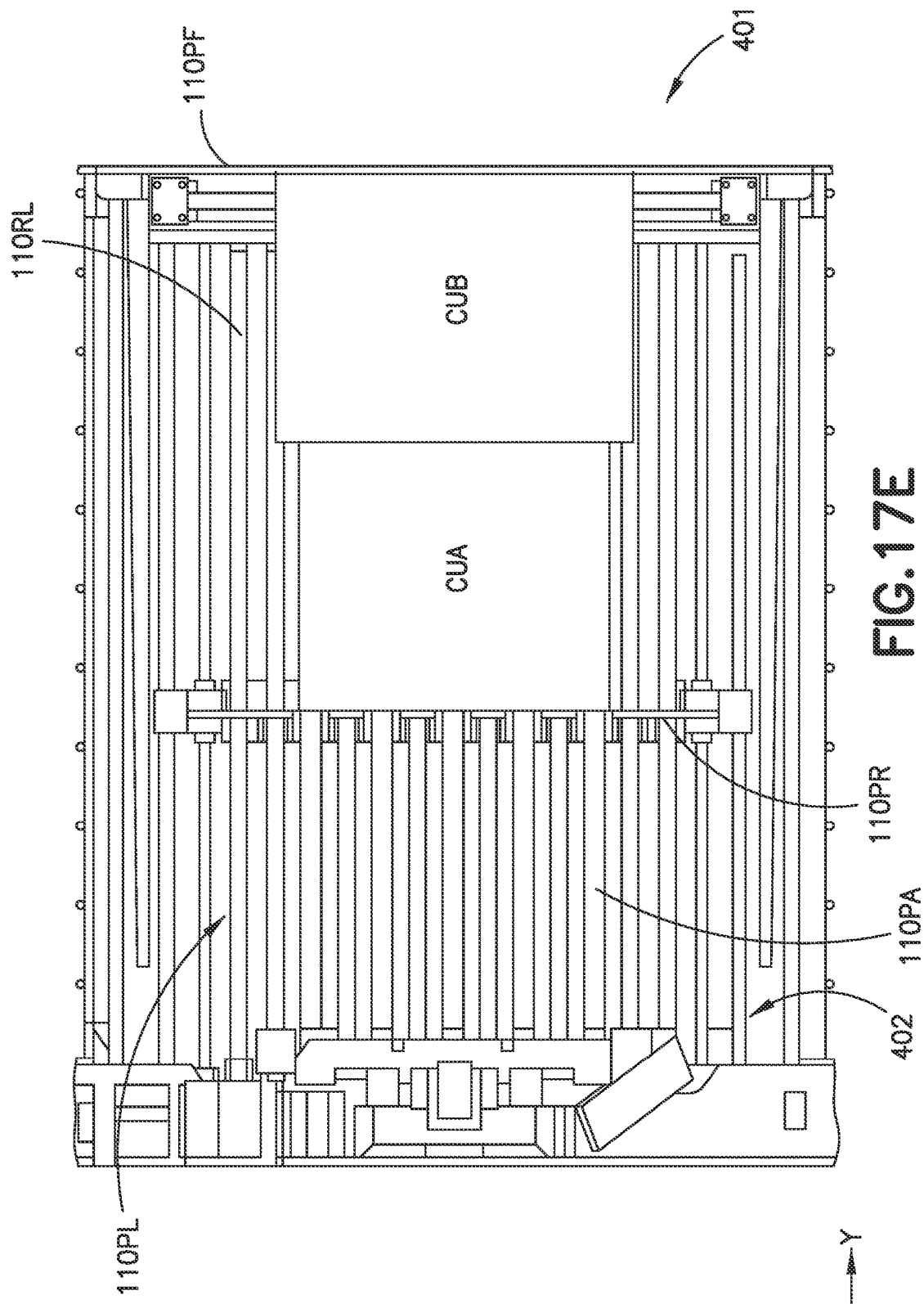
Figure 19:
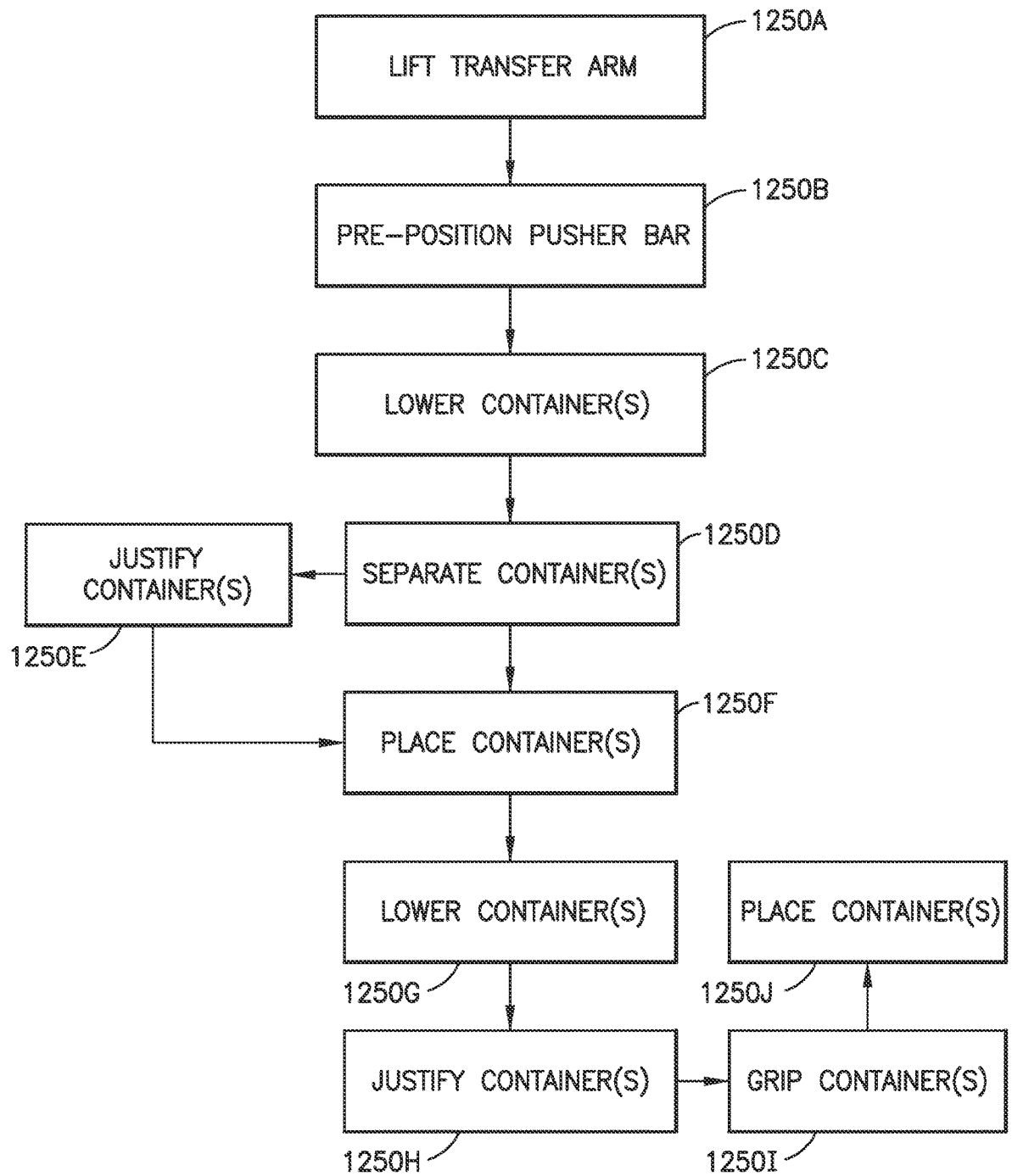

As may be realized, in one aspect where the container bots 110 turn into a pier 130BD (FIG. 16) the spacing between bots travelling on the high speed bot travel path HSTP of the container transfer deck 130DC (FIG. 1B) is such that the bot interfacing with the interface station TS is able to slow down and turn into the interface station TS substantially without interference from and/or interference with another container bot 110 travelling along the container transfer deck 130DC. In other aspects, the container bots 110 travelling on the container transfer deck 130DC may drive around the container transfer deck 130DC turning into the interface stations TS as the container transfer deck 130DC is substantially open and configured for the undeterministic traversal of container bots 110 across and along the container transfer deck 130DC as described above. Where the containers CUA, CUB of the multi-pick are placed at different positions of, for example, a common buffer shelf BS of interface/handoff station 7000A, 7000B of the lifts 150B1, 150B2 the container bot 110 places a first one of the containers CUB in a first position of the buffer shelf 7000A and places the second one of the containers CUA in a second position of the buffer shelf 7000A. Where the containers of the multi-pick are placed at a common container holding location the container bot 110 places both containers CUA, CUB as a unit (e.g. a pickface) at for example, a common position of buffer shelf 7000A.

Where the containers CUA, CUB are sorted for placement at separate positions of a common holding location or at different holding locations (such as described in U.S. Pat. No. 9,856,083 previously incorporated by reference herein in its entirety), the containers CUA, CUB are separated from each other in the payload section 110PL. For example, referring also to FIGS. 13A, 13B, and 17A-17F, the pick head 270 of the transfer arm 110PA may be moved in the Z direction to lift the containers CUA, CUB from the rollers 110RL by an amount sufficient to allow the pusher bar 110PR to pass beneath the containers (FIG. 19, Block 1250A). As the containers CUA, CUB are lifted the pusher bar 110PR is positioned along the Y direction so as to be located between the containers CUA, CUB (see FIG. 17F) (FIG. 19, Block 1250B). The pick head 270 is lowered so that the containers CUA, CUB are transferred to the rollers 110RL and so that the pusher bar is inserted between the containers CUA, CUB (FIG. 19, Block 1250C). The pusher bar 110PR is moved in the Y direction (e.g. to separate the containers) to move container CUA towards the back 402 of the payload section 110PL (e.g. against the justification surface 273JS of the tines 273A-273E or any other suitable position) while the container CUB remains at the front of the payload section 110PL adjacent the fence 110PF (e.g. as shown in FIG. 17D) (FIG. 19, Block 1250D). As may be realized, where the containers are held against the justification surface 273JS of the tines during transport, the pusher bar is moved in the Y direction (e.g. to separate the containers) to move container CUB towards the front 401 of the payload section 110PL (e.g. against the fence 110PF or any other suitable position) while the container CUA remains at the back of the payload section 110PL adjacent the justification surface 273JS. The pusher bar 110PR may also be moved in the Y direction to re-justify the container CUB against the fence 110PF to position the container on the tines 273A-273E for placement at a container holding location (FIG. 19, Block 1250E). As may be realized, with the container CUA being positioned substantially against the justification surface 273JS of the tines 273A-273E (e.g. of the pick head 270) the container CUB can be placed at a container holding location substantially without interference from the container CUA (FIG. 19, Block 1250F), e.g. the container CUA is free from contacting other containers disposed at the container holding location. The container CUA is lowered/transferred back into the payload section 110PL (e.g. by retracting and lowering the transfer arm 110PA) (FIG. 19, Block 1250G). The pusher bar 110PR, which is pre-positioned between the justification surface 273JS and the container CUA, pushes the container CUA, which is disposed on the rollers 110RL, against the fence 110PF to forward justify the container CUA for placement at another container holding location (e.g. different than the holding location that container CUB was placed) (FIG. 19, Block 1250H). The pusher bar 110PR remains against the container CUA for gripping (e.g. with the fence) the container during transport to the other container holding location (FIG. 19, Block 1250I). The pusher bar 110PR moves away from the container CUA and the transfer arm is actuated to lift and extend the pick head 270 for placing the container CUA at the other container holding location (FIG. 19, Block 1250J).

Similarly, referring to FIGS. 1A, 1B, and 2, in one aspect where the container bots 110 turn into a breakpack module 266 from the transfer deck (see FIG. 1B) the spacing between bots travelling on the high speed bot travel path HSTP of the container transfer deck 130DC (FIG. 1B) is such that the bot interfacing with the interface station TS is able to slow down and turn into the interface station TS substantially without interference from and/or interference with another container bot 110 travelling along the container transfer deck 130DC. In other aspects, the container bots 110 travelling on the container transfer deck 130DC may drive around the container bots 110 turning into the breakpack module 266 as the container transfer deck 130DC is substantially open and configured for the undeterministic traversal of container bots 110 across and along the container transfer deck 130DC as described above. Where the containers CUA, CUB of the multi-pick are placed at different positions of, for example, a common support surface of the induction conveyor 500A, 500B, 500C (FIG. 3A) the container bot 110 places a first one of the containers CUB in a first position of the support surface and places the second one of the containers CUA in a second position of the support surface of the induction conveyor 500A, 500B, 500C. Where the containers of the multi-pick are placed at a common container holding location the container bot 110 places both containers CUA, CUB as a unit (e.g. a pickface) at for example, a common position of support surface of the induction conveyor 500A, 500B, 500C.

Where the containers CUA, CUB are sorted for placement at separate positions of a common holding location or at different holding locations (such as described in U.S. Pat. No. 9,856,083 previously incorporated by reference herein in its entirety), the containers CUA, CUB are separated from each other in the payload section 110PL. For example, referring also to FIGS. 13A, 13B, and 17A-17F, the pick head 270 of the transfer arm 110PA may be moved in the Z direction to lift the containers CUA, CUB from the rollers 110RL by an amount sufficient to allow the pusher bar 110PR to pass beneath the containers (FIG. 19, Block 1250A). As the containers CUA, CUB are lifted the pusher bar 110PR is positioned along the Y direction so as to be located between the containers CUA, CUB (see FIG. 17F) (FIG. 19, Block 1250B). The pick head 270 is lowered so that the containers CUA, CUB are transferred to the rollers 110RL and so that the pusher bar is inserted between the containers CUA, CUB (FIG. 19, Block 1250C). The pusher bar 110PR is moved in the Y direction (e.g. to separate the containers) to move container CUA towards the back 402 of the payload section 110PL (e.g. against the justification surface 273JS of the tines 273A-273E or any other suitable position) while the container CUB remains at the front of the payload section 110PL adjacent the fence 110PF (e.g. as shown in FIG. 17D) (FIG. 19, Block 1250D). As may be realized, where the containers are held against the justification surface 273JS of the tines during transport, the pusher bar is moved in the Y direction (e.g. to separate the containers) to move container CUB towards the front 401 of the payload section 110PL (e.g. against the fence 110PF or any other suitable position) while the container CUA remains at the back of the payload section 110PL adjacent the justification surface 273JS. The pusher bar 110PR may also be moved in the Y direction to re-justify the container CUB against the fence 110PF to position the container on the tines 273A-273E for placement at a container holding location (FIG. 19, Block 1250E). As may be realized, with the container CUA being positioned substantially against the justification surface 273JS of the tines 273A-273E (e.g. of the pick head 270) the container CUB can be placed at a container holding location of the support surface of the induction conveyor 500A, 500B, 500C substantially without interference from the container CUA (FIG. 19, Block 1250F), e.g. the container CUA is free from contacting other containers disposed at the support surface of the induction conveyor 500A, 500B, 500C. The container CUA is lowered/transferred back into the payload section 110PL (e.g. by retracting and lowering the transfer arm 110PA) (FIG. 19, Block 1250G). The pusher bar 110PR, which is pre-positioned between the justification surface 273JS and the container CUA, pushes the container CUA, which is disposed on the rollers 110RL, against the fence 110PF to forward justify the container CUA for placement at another container holding location (e.g. different than the holding location that container CUB was placed) of the support surface of the same induction conveyor 500A, 500B, 500C or at another support surface of another induction conveyor 500A, 500B, 500C (FIG. 19, Block 1250H). The pusher bar 110PR remains against the container CUA for gripping (e.g. with the fence) the container during transport to the other container holding location (FIG. 19, Block 1250I). The pusher bar 110PR moves away from the container CUA and the transfer arm is actuated to lift and extend the pick head 270 for placing the container CUA at the other container holding location (FIG. 19, Block 1250J). In accordance with one or more aspects of the disclosed embodiment, a warehousing system for storing and retrieving goods in containers is provided. The warehousing system comprising: a multilevel container storage array, each level of which has a transport area and a storage area, the storage area including an array of storage shelves configured to hold containers thereon, and the transport area being substantially continuous and arranged to communicably connect storage shelves of the array of storage shelves to each other, the transport area including picking aisles and a container transfer deck connecting the picking aisles; at least one autonomous guided container transport vehicle, distinct from the container transfer deck, located on each level of the multilevel storage array and configured to traverse the container transfer deck and picking aisles on each level and transport containers accessed to and from container storage locations on each of the storage shelves on each level of the multilevel storage array to a breakpack operation station; a putwall of more than one levels of breakpack goods container stations distributed along each level with a corresponding breakpack goods transfer deck at each level of the putwall; at least one autonomous guided breakpack goods transport vehicle configured to traverse and transport breakpack goods along the corresponding breakpack goods transfer deck, and between corresponding breakpack goods transfer decks at different levels of the putwall, to each breakpack goods container station at each level of the putwall; and a controller configured to effect operation of the at least one autonomous guided container transport vehicle between the container storage locations, the breakpack operation station, and a breakpack goods container located at a breakpack goods container station of the putwall.

In accordance with one or more aspects of the disclosed embodiment, the putwall is different and distinct than the multilevel container storage array.

In accordance with one or more aspects of the disclosed embodiment, the at least one autonomous guided container transport vehicle is configured to respectively transport supply goods containers and breakpack goods containers.

In accordance with one or more aspects of the disclosed embodiment, the breakpack goods transfer deck at each level of the putwall is separate and distinct from each container transfer deck so that a respective putwall level has the breakpack goods transfer deck separate and distinct from each container transfer deck coupled to the breakpack operation station.

In accordance with one or more aspects of the disclosed embodiment, the breakpack goods transfer deck is configured so that at least one autonomous guided breakpack goods transport vehicle traverses the breakpack goods transfer deck and transports breakpack goods from the breakpack operation station into corresponding breakpack goods containers for transport by the at least one autonomous guided container transport vehicle on the container transfer deck.

In accordance with one or more aspects of the disclosed embodiment, the autonomous guided breakpack goods transport vehicle has a payload support, and is configured to output, from its payload support, a breakpack goods unit payload, transported thereon, into the breakpack goods container at each breakpack goods container station at each level of the putwall.

In accordance with one or more aspects of the disclosed embodiment, a common portion of the multilevel container storage array and the transport area are communicably connected, via one or more of the breakpack operation station, to more than one of the putwall, each putwall is independent of each other putwall, wherein: each putwall is filled independent of each other putwall, and each putwall effects independent breakpack goods container output, where each putwall is accessed by the autonomous guided container transport vehicle, and the independent breakpack goods container output of the respective putwall is independent of each other putwall so as to provide output breakpack goods containers filled orthogonal to each other.

In accordance with one or more aspects of the disclosed embodiment, each independent putwall has different breakpack goods container stations, each disposed for holding a different respective breakpack goods container, independently filled relative to each other breakpack goods container of each other independent putwall, so that the filled different respective breakpack goods container defines the independent breakpack goods container output of the independent putwall.

In accordance with one or more aspects of the disclosed embodiment, the warehousing system further comprises an intervening sorter disposed to communicably couple the multilevel array transport area and the breakpack operation station, the intervening sorter being configured so as to sort supply goods containers, from the autonomous guided container transport vehicle, and upstream of the breakpack operation station.

In accordance with one or more aspects of the disclosed embodiment, sortation, by the intervening sorter upstream of the breakpack operation station, of the supply goods containers is disposed to promote sequencing of the supply goods containers, from an inferior optimized sequence to a superior optimized sequence of goods, effecting a predetermined sequence of supply goods containers input the breakpack operation station, and decommissioning of goods, from supply goods containers, and dispatch of the at least one autonomous guided breakpack goods transport vehicle from the breakpack operation station to fill the putwall.

In accordance with one or more aspects of the disclosed embodiment, the intervening sorter upstream of the breakpack operation station is configured to as to define multiple axes of sortation orthogonal to each other.

In accordance with one or more aspects of the disclosed embodiment, at least one axis of sortation in one direction has a parallel axis of sortation.

In accordance with one or more aspects of the disclosed embodiment, the at least one autonomous guided breakpack goods transport vehicle traverse along the corresponding breakpack goods transfer deck and between corresponding breakpack goods transfer decks of the putwall defines a breakpack goods sorter downstream of the breakpack operation station that promotes sequencing of breakpack goods transported to each of the breakpack goods container at each breakpack goods container station from an inferior optimized sequence to a superior optimized sequence of goods that effects a predetermined sequence of breakpack goods fill into the breakpack goods container in the putwall.

In accordance with one or more aspects of the disclosed embodiment, the breakpack goods sorter downstream of the breakpack operation station is configured to as to define multiple axes of sortation orthogonal to each other.

In accordance with one or more aspects of the disclosed embodiment, at least one axis of sortation in one direction has a parallel axis of sortation.

In accordance with one or more aspects of the disclosed embodiment, a method for storing and retrieving goods in containers is provided. The method comprising: providing a multilevel container storage array, each level of which has a transport area and a storage area, the storage area including an array of storage shelves configured to hold containers thereon, and the transport area being substantially continuous and arranged to communicably connect storage shelves of the array of storage shelves to each other, the transport area including picking aisles and a container transfer deck connecting the picking aisles; transporting containers, with at least one autonomous guided container transport vehicle, accessed to and from container storage locations on each of the storage shelves on each level of the multilevel storage array to a breakpack operation station, where the at least one autonomous guided container transport vehicle traverses the container transfer deck and picking aisles on each level, is distinct from the container transfer deck, and at least one of the at least one autonomous guided container transport vehicle is located on each level of the multilevel storage array; providing a putwall of more than one levels of breakpack goods container stations distributed along each level with a corresponding breakpack goods transfer deck at each level of the putwall; transporting, with at least one autonomous guided breakpack goods transport vehicle, breakpack goods along the corresponding breakpack goods transfer deck, and between corresponding breakpack goods transfer decks at different levels of the putwall, to each breakpack goods container station at each level of the putwall; and effecting, with a controller, operation of the at least one autonomous guided container transport vehicle between the container storage locations, the breakpack operation station, and a breakpack goods container located at a breakpack goods container station of the putwall.

In accordance with one or more aspects of the disclosed embodiment, the putwall is different and distinct than the multilevel container storage array.

In accordance with one or more aspects of the disclosed embodiment, the at least one autonomous guided container transport vehicle respectively transports supply goods containers and breakpack goods containers.

In accordance with one or more aspects of the disclosed embodiment, the breakpack goods transfer deck at each level of the putwall is separate and distinct from each container transfer deck so that a respective putwall level has the breakpack goods transfer deck separate and distinct from each container transfer deck coupled to the breakpack operation station.

In accordance with one or more aspects of the disclosed embodiment, the breakpack goods transfer deck is configured so that at least one autonomous guided breakpack goods transport vehicle traverses the breakpack goods transfer deck and transports breakpack goods from the breakpack operation station into corresponding breakpack goods containers for transport by the at least one autonomous guided container transport vehicle on the container transfer deck.

In accordance with one or more aspects of the disclosed embodiment, the autonomous guided breakpack goods transport vehicle has a payload support, and outputs, from its payload support, a breakpack goods unit payload, transported thereon, into the breakpack goods container at each breakpack goods container station at each level of the putwall.

In accordance with one or more aspects of the disclosed embodiment, a common portion of the multilevel container storage array and the transport area are communicably connected, via one or more of the breakpack operation station, to more than one of the putwall, each putwall is independent of each other putwall, wherein: each putwall is filled independent of each other putwall, and each putwall effects independent breakpack goods container output, where each putwall is accessed by the autonomous guided container transport vehicle, and the independent breakpack goods container output of the respective putwall is independent of each other putwall so as to provide output breakpack goods containers filled orthogonal to each other.

In accordance with one or more aspects of the disclosed embodiment, each independent putwall has different breakpack goods container stations, each disposed for holding a different respective breakpack goods container, independently filled relative to each other breakpack goods container of each other independent putwall, so that the filled different respective breakpack goods container defines the independent breakpack goods container output of the independent putwall.

In accordance with one or more aspects of the disclosed embodiment, the method further comprises sorting, with an intervening sorter disposed to communicably couple the multilevel array transport area and the breakpack operation station, supply goods containers, from the autonomous guided container transport vehicle, and upstream of the breakpack operation station.

In accordance with one or more aspects of the disclosed embodiment, sortation, by the intervening sorter upstream of the breakpack operation station, of the supply goods containers is disposed to promote sequencing of the supply goods containers, from an inferior optimized sequence to a superior optimized sequence of goods, effecting a predetermined sequence of supply goods containers input the breakpack operation station, and decommissioning of goods, from supply goods containers, and dispatch of the at least one autonomous guided breakpack goods transport vehicle from the breakpack operation station to fill the putwall.

In accordance with one or more aspects of the disclosed embodiment, the intervening sorter upstream of the breakpack operation station defines multiple axes of sortation orthogonal to each other.

In accordance with one or more aspects of the disclosed embodiment, at least one axis of sortation in one direction has a parallel axis of sortation.

In accordance with one or more aspects of the disclosed embodiment, the at least one autonomous guided breakpack goods transport vehicle traverse along the corresponding breakpack goods transfer deck and between corresponding breakpack goods transfer decks of the putwall defines a breakpack goods sorter downstream of the breakpack operation station that promotes sequencing of breakpack goods transported to each of the breakpack goods container at each breakpack goods container station from an inferior optimized sequence to a superior optimized sequence of goods that effects a predetermined sequence of breakpack goods fill into the breakpack goods container in the putwall.

In accordance with one or more aspects of the disclosed embodiment, the breakpack goods sorter downstream of the breakpack operation station is configured to as to define multiple axis of sortation orthogonal to each other.

In accordance with one or more aspects of the disclosed embodiment, at least one axis of sortation in one direction has a parallel axis of sortation.

In accordance with one or more aspects of the disclosed embodiment, an automated order fulfillment system is provided. The automated order fulfillment system comprises: a multilevel breakpack goods container fill array, each level having a container fill station area, with breakpack goods container stations arrayed along the container fill station area, and having a corresponding breakpack goods transfer deck juxtaposed along the breakpack container stations of the container fill station area; and at least one autonomous guided breakpack goods transport vehicle, with a payload support for holding at least one breakpack goods unit for transport by the at least one autonomous guided breakpack goods transport vehicle, the at least one autonomous guided breakpack goods transport vehicle being configured to traverse and transport breakpack goods along the corresponding breakpack goods transfer deck, and between corresponding breakpack goods transfer decks at different levels of the multilevel breakpack goods container fill array, to each breakpack goods container station at each level, wherein each breakpack goods container station is disposed to hold a breakpack goods container accessed by and filled by the at least one autonomous guided breakpack goods transport vehicle with a predetermined breakpack goods fill payload; wherein the corresponding transfer deck at each level is communicably joined to other transfer decks corresponding to each other level of the multilevel breakpack goods container fill array by interlevel transit autonomous guided breakpack goods transport vehicle pathways that traverse between the corresponding breakpack goods transfer deck at each level and other breakpack goods transfer decks corresponding to each other level so that the at least one autonomous guided breakpack goods transport vehicle transits, via the interlevel transit autonomous guided breakpack goods transport pathways from the corresponding breakpack goods transfer deck to each other breakpack goods transfer deck corresponding to each other level, and transports the predetermined breakpack goods fill payload loaded on the at least one autonomous guided breakpack goods transport vehicle on one level and fills the breakpack goods container at each breakpack goods container station at a different level.

In accordance with one or more aspects of the disclosed embodiment, the corresponding breakpack goods transfer decks at each level and interlevel transit autonomous guided breakpack goods transport pathways form at least a two-dimensional matrix of autonomous guided breakpack goods transport vehicle divert pathways including at least one interlevel divert pathway and at least one intralevel divert pathway, so that the at least one autonomous guided breakpack goods transport vehicle freely diverts, on the fly, via at least one of the at least one interlevel divert pathway and the at least one interlevel divert pathway from an initial breakpack goods container station destination to a divert breakpack goods container station destination on at least one of a common level and a different level as the initial container station destination.

In accordance with one or more aspects of the disclosed embodiment, the corresponding breakpack goods transfer deck at each level is non-deterministic and the at least one interlevel divert pathway is non-deterministic so that the at least one autonomous guided breakpack goods transport vehicle may freely transition between the corresponding breakpack goods transfer deck to the at least one interlevel divert pathway and vice versa.

In accordance with one or more aspects of the disclosed embodiment, the at least one interlevel divert pathway is a ramp.

In accordance with one or more aspects of the disclosed embodiment, the at least one autonomous guided breakpack goods transport vehicle is configured so as to effect pose determination and localization via one or more, alone or in combination, of at least one of wheel odometry, dead reckoning, distance measurement and detection of fiducials with electromagnetic distance sensors or vision, with two-dimensional or three-dimensional cameras, informing vehicle pose and localization both longitudinally along a pathway and in a Z direction raising or lowering the at least one autonomous guided breakpack goods transport vehicle between levels and effect free transition of vehicle travel, at a substantially constant rate of travel in the transition, between the breakpack goods transfer deck to the at least one interlevel divert pathway and vice versa.

In accordance with one or more aspects of the disclosed embodiment, the automated order fulfillment system further comprises: a multilevel container storage array, each level of which has a transport area and a storage area, the storage area including an array of storage shelves configured to hold containers thereon, and the transport area being substantially continuous and arranged to communicably connect storage shelves of the array of storage shelves to each other, the transport area including picking aisles and a container transfer deck connecting the picking aisles; and at least one autonomous guided container transport vehicle configured to traverse the container transfer deck and picking aisles to effect transport of containers between the multilevel container storage array and the multilevel breakpack goods container fill array; wherein the multilevel breakpack goods container fill array is different and distinct than the multilevel container storage array.

In accordance with one or more aspects of the disclosed embodiment, the at least one autonomous guided container transport vehicle is configured to respectively transport supply goods containers and breakpack goods containers.

In accordance with one or more aspects of the disclosed embodiment, the corresponding breakpack goods transfer deck at each level of the multilevel container storage array is separate and distinct from each container transfer deck so that a respective level of the multilevel container storage array has the breakpack goods transfer deck separate and distinct from each container transfer deck.

In accordance with one or more aspects of the disclosed embodiment, the corresponding breakpack goods transfer deck is configured so that the at least one autonomous guided breakpack goods transport vehicle traverses the corresponding breakpack goods transfer deck and transports breakpack goods from a breakpack operation station into corresponding breakpack goods containers for transport by the at least one autonomous guided container transport vehicle on the container transfer deck.

In accordance with one or more aspects of the disclosed embodiment, the automated order fulfillment system further comprises: a breakpack operation station; and an intervening sorter disposed upstream of the breakpack operation station, the intervening sorter being configured so as to sort supply goods containers inbound to the breakpack operation station.

In accordance with one or more aspects of the disclosed embodiment, sortation, by the intervening sorter upstream of the breakpack operation station, of the supply goods containers is disposed to promote sequencing of the supply goods containers, from an inferior optimized sequence to a superior optimized sequence of goods, effecting a predetermined sequence of supply goods containers input the breakpack operation station, and decommissioning of goods, from supply goods containers, and dispatch of the at least one autonomous guided breakpack goods transport vehicle from the breakpack operation station to fill the multilevel breakpack goods container fill array.

In accordance with one or more aspects of the disclosed embodiment, the intervening sorter upstream of the breakpack operation station is configured to as to define multiple axes of sortation orthogonal to each other.

In accordance with one or more aspects of the disclosed embodiment, at least one axis of sortation in one direction has a parallel axis of sortation.

In accordance with one or more aspects of the disclosed embodiment, the at least one autonomous guided breakpack goods transport vehicle traverse along the corresponding breakpack goods transfer deck and between corresponding breakpack goods transfer decks of the different levels defines a breakpack goods sorter downstream of the breakpack operation station that promotes sequencing of breakpack goods transported to each of the breakpack goods container at each breakpack goods container station from an inferior optimized sequence to a superior optimized sequence of goods that effects a predetermined sequence of breakpack goods fill into the breakpack goods container in the multilevel breakpack goods container fill array.

In accordance with one or more aspects of the disclosed embodiment, the breakpack goods sorter downstream of the breakpack operation station is configured to as to define multiple axes of sortation orthogonal to each other.

In accordance with one or more aspects of the disclosed embodiment, at least one axis of sortation in one direction has a parallel axis of sortation.

In accordance with one or more aspects of the disclosed embodiment, a method for order fulfillment in an automated order fulfillment system is provided. The method comprises: providing a multilevel breakpack goods container fill array, each level having a container fill station area, with breakpack goods container stations arrayed along the container fill station area, and having a corresponding breakpack goods transfer deck juxtaposed along the breakpack container stations of the container fill station area; and traversing and transporting, with at least one autonomous guided breakpack goods transport vehicle, breakpack goods along the corresponding breakpack goods transfer deck, and between corresponding breakpack goods transfer decks at different levels of the multilevel breakpack goods container fill array, to each breakpack goods container station at each level, wherein each breakpack goods container station is disposed to hold a breakpack goods container accessed by and filled by the at least one autonomous guided breakpack goods transport vehicle with a predetermined breakpack goods fill payload, and the least one autonomous guided breakpack goods transport vehicle has a payload support for holding at least one breakpack goods unit for transport by the at least one autonomous guided breakpack goods transport vehicle; wherein the corresponding transfer deck at each level is communicably joined to other transfer decks corresponding to each other level of the multilevel breakpack goods container fill array by interlevel transit autonomous guided breakpack goods transport vehicle pathways that traverse between the corresponding breakpack goods transfer deck at each level and other breakpack goods transfer decks corresponding to each other level so that the at least one autonomous guided breakpack goods transport vehicle transits, via the interlevel transit autonomous guided breakpack goods transport pathways from the corresponding breakpack goods transfer deck to each other breakpack goods transfer deck corresponding to each other level, and transports the predetermined breakpack goods fill payload loaded on the at least one autonomous guided breakpack goods transport vehicle on one level and fills the breakpack goods container at each breakpack goods container station at a different level.

In accordance with one or more aspects of the disclosed embodiment, the corresponding breakpack goods transfer decks at each level and interlevel transit autonomous guided breakpack goods transport pathways form at least a two-dimensional matrix of autonomous guided breakpack goods transport vehicle divert pathways including at least one interlevel divert pathway and at least one intralevel divert pathway, so that the at least one autonomous guided breakpack goods transport vehicle freely diverts, on the fly, via at least one of the at least one interlevel divert pathway and the at least one interlevel divert pathway from an initial breakpack goods container station destination to a divert breakpack goods container station destination on at least one of a common level and a different level as the initial container station destination.

In accordance with one or more aspects of the disclosed embodiment, the corresponding breakpack goods transfer deck at each level is non-deterministic and the at least one interlevel divert pathway is non-deterministic so that the at least one autonomous guided breakpack goods transport vehicle may freely transition between the corresponding breakpack goods transfer deck to the at least one interlevel divert pathway and vice versa.

In accordance with one or more aspects of the disclosed embodiment, the at least one interlevel divert pathway is a ramp.

In accordance with one or more aspects of the disclosed embodiment, the at least one autonomous guided breakpack goods transport vehicle effects pose determination and localization via one or more, alone or in combination, of at least one of wheel odometry, dead reckoning, distance measurement and detection of fiducials with electromagnetic distance sensors or vision, with two-dimensional or three-dimensional cameras, informing vehicle pose and localization both longitudinally along a pathway and in a Z direction raising or lowering the at least one autonomous guided breakpack goods transport vehicle between levels and effect free transition of vehicle travel, at a substantially constant rate of travel in the transition, between the breakpack goods transfer deck to the at least one interlevel divert pathway and vice versa.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the disclosed embodiment.

What is claimed is:

1. A warehousing system for storing and retrieving goods in containers, the warehousing system comprising:
   a multilevel container storage array, each level of which has a transport area and a storage area, the storage area including an array of storage shelves configured to hold containers thereon, and the transport area being substantially continuous and arranged to communicably connect storage shelves of the array of storage shelves to each other, the transport area including picking aisles and a container transfer deck connecting the picking aisles;
   at least one autonomous guided container transport vehicle, distinct from the container transfer deck, located on each level of the multilevel storage array and configured to traverse the container transfer deck and picking aisles on each level and transport containers accessed to and from container storage locations on each of the storage shelves on each level of the multilevel storage array to a breakpack operation station;
   a putwall of more than one levels of breakpack goods container stations distributed along each level with a corresponding breakpack goods transfer deck at each level of the putwall;
   at least one autonomous guided breakpack goods transport vehicle configured to traverse and transport breakpack goods along the corresponding breakpack goods transfer deck, and between corresponding breakpack goods transfer decks at different levels of the putwall, to each breakpack goods container station at each level of the putwall; and
   a controller configured to effect operation of the at least one autonomous guided container transport vehicle between the container storage locations, the breakpack operation station, and a breakpack goods container located at a breakpack goods container station of the putwall.

2. The warehousing system of claim 1, wherein the putwall is different and distinct than the multilevel container storage array.

3. The warehousing system of claim 1, wherein the at least one autonomous guided container transport vehicle is configured to respectively transport supply goods containers and breakpack goods containers.

4. The warehousing system of claim 1, wherein the breakpack goods transfer deck at each level of the putwall is separate and distinct from each container transfer deck so that a respective putwall level has the breakpack goods transfer deck separate and distinct from each container transfer deck coupled to the breakpack operation station.

5. The warehousing system of claim 1, wherein the breakpack goods transfer deck is configured so that at least one autonomous guided breakpack goods transport vehicle traverses the breakpack goods transfer deck and transports breakpack goods from the breakpack operation station into corresponding breakpack goods containers for transport by the at least one autonomous guided container transport vehicle on the container transfer deck.

6. The warehousing system of claim 1, wherein the autonomous guided breakpack goods transport vehicle has a payload support, and is configured to output, from its payload support, a breakpack goods unit payload, transported thereon, into the breakpack goods container at each breakpack goods container station at each level of the putwall.

7. The warehousing system of claim 1, wherein a common portion of the multilevel container storage array and the transport area are communicably connected, via one or more of the breakpack operation station, to more than one of the putwall, each putwall is independent of each other putwall, wherein:
   each putwall is filled independent of each other putwall, and
   each putwall effects independent breakpack goods container output,
   where each putwall is accessed by the autonomous guided container transport vehicle, and the independent breakpack goods container output of the respective putwall is independent of each other putwall so as to provide output breakpack goods containers filled orthogonal to each other.

8. The warehousing system of claim 7, wherein each independent putwall has different breakpack goods container stations, each disposed for holding a different respective breakpack goods container, independently filled relative to each other breakpack goods container of each other independent putwall, so that the filled different respective breakpack goods container defines the independent breakpack goods container output of the independent putwall.

9. The warehousing system of claim 1, further comprising an intervening sorter disposed to communicably couple the multilevel array transport area and the breakpack operation station, the intervening sorter being configured so as to sort supply goods containers, from the autonomous guided container transport vehicle, and upstream of the breakpack operation station.

10. The warehousing system of claim 9, wherein sortation, by the intervening sorter upstream of the breakpack operation station, of the supply goods containers is disposed to promote sequencing of the supply goods containers, from an inferior optimized sequence to a superior optimized sequence of goods, effecting a predetermined sequence of supply goods containers input the breakpack operation station, and decommissioning of goods, from supply goods containers, and dispatch of the at least one autonomous guided breakpack goods transport vehicle from the breakpack operation station to fill the putwall.

11. The warehousing system of claim 9, wherein the intervening sorter upstream of the breakpack operation station is configured to as to define multiple axes of sortation orthogonal to each other.

12. The warehousing system of claim 11, wherein at least one axis of sortation in one direction has a parallel axis of sortation.

13. The warehousing system of claim 1, wherein the at least one autonomous guided breakpack goods transport vehicle traverse along the corresponding breakpack goods transfer deck and between corresponding breakpack goods transfer decks of the putwall defines a breakpack goods sorter downstream of the breakpack operation station that promotes sequencing of breakpack goods transported to each of the breakpack goods container at each breakpack goods container station from an inferior optimized sequence to a superior optimized sequence of goods that effects a predetermined sequence of breakpack goods fill into the breakpack goods container in the putwall.

14. The warehousing system of claim 13, wherein the breakpack goods sorter downstream of the breakpack operation station is configured to as to define multiple axes of sortation orthogonal to each other.

15. The warehousing system of claim 14, wherein at least one axis of sortation in one direction has a parallel axis of sortation.

16. A method for storing and retrieving goods in containers, the method comprising:
providing a multilevel container storage array, each level of which has a transport area and a storage area, the storage area including an array of storage shelves configured to hold containers thereon, and the transport area being substantially continuous and arranged to communicably connect storage shelves of the array of storage shelves to each other, the transport area including picking aisles and a container transfer deck connecting the picking aisles;
transporting containers, with at least one autonomous guided container transport vehicle, accessed to and from container storage locations on each of the storage shelves on each level of the multilevel storage array to a breakpack operation station, where the at least one autonomous guided container transport vehicle traverses the container transfer deck and picking aisles on each level, is distinct from the container transfer deck, and at least one of the at least one autonomous guided container transport vehicle is located on each level of the multilevel storage array;
providing a putwall of more than one levels of breakpack goods container stations distributed along each level with a corresponding breakpack goods transfer deck at each level of the putwall;
transporting, with at least one autonomous guided breakpack goods transport vehicle, breakpack goods along the corresponding breakpack goods transfer deck, and between corresponding breakpack goods transfer decks at different levels of the putwall, to each breakpack goods container station at each level of the putwall; and
effecting, with a controller, operation of the at least one autonomous guided container transport vehicle between the container storage locations, the breakpack operation station, and a breakpack goods container located at a breakpack goods container station of the putwall.

17. The method of claim 16, wherein the putwall is different and distinct than the multilevel container storage array.

18. The method of claim 16, wherein the at least one autonomous guided container transport vehicle respectively transports supply goods containers and breakpack goods containers.

19. The method of claim 16, wherein the breakpack goods transfer deck at each level of the putwall is separate and distinct from each container transfer deck so that a respective putwall level has the breakpack goods transfer deck separate and distinct from each container transfer deck coupled to the breakpack operation station.

20. The method of claim 16, wherein the breakpack goods transfer deck is configured so that at least one autonomous guided breakpack goods transport vehicle traverses the breakpack goods transfer deck and transports breakpack goods from the breakpack operation station into corresponding breakpack goods containers for transport by the at least one autonomous guided container transport vehicle on the container transfer deck.

21. The method of claim 16, wherein the autonomous guided breakpack goods transport vehicle has a payload support, and outputs, from its payload support, a breakpack goods unit payload, transported thereon, into the breakpack goods container at each breakpack goods container station at each level of the putwall.

22. The method of claim 16, wherein a common portion of the multilevel container storage array and the transport area are communicably connected, via one or more of the breakpack operation station, to more than one of the putwall, each putwall is independent of each other putwall, wherein:
each putwall is filled independent of each other putwall, and
each putwall effects independent breakpack goods container output,
where each putwall is accessed by the autonomous guided container transport vehicle, and the independent breakpack goods container output of the respective putwall is independent of each other putwall so as to provide output breakpack goods containers filled orthogonal to each other.

23. The method of claim 22, wherein each independent putwall has different breakpack goods container stations, each disposed for holding a different respective breakpack goods container, independently filled relative to each other breakpack goods container of each other independent putwall, so that the filled different respective breakpack goods container defines the independent breakpack goods container output of the independent putwall.

24. The method of claim 16, further comprising sorting, with an intervening sorter disposed to communicably couple the multilevel array transport area and the breakpack operation station, supply goods containers, from the autonomous guided container transport vehicle, and upstream of the breakpack operation station.

25. The method of claim 24, wherein sortation, by the intervening sorter upstream of the breakpack operation station, of the supply goods containers is disposed to promote sequencing of the supply goods containers, from an inferior optimized sequence to a superior optimized sequence of goods, effecting a predetermined sequence of supply goods containers input the breakpack operation station, and decommissioning of goods, from supply goods containers, and dispatch of the at least one autonomous guided breakpack goods transport vehicle from the breakpack operation station to fill the putwall.

26. The method of claim 24, wherein the intervening sorter upstream of the breakpack operation station defines multiple axes of sortation orthogonal to each other.

27. The method of claim 26, wherein at least one axis of sortation in one direction has a parallel axis of sortation.

28. The method of claim 16, wherein the at least one autonomous guided breakpack goods transport vehicle traverse along the corresponding breakpack goods transfer deck and between corresponding breakpack goods transfer decks of the putwall defines a breakpack goods sorter downstream of the breakpack operation station that promotes sequencing of breakpack goods transported to each of the breakpack goods container at each breakpack goods container station from an inferior optimized sequence to a superior optimized sequence of goods that effects a predetermined sequence of breakpack goods fill into the breakpack goods container in the putwall.

29. The method of claim 28, wherein the breakpack goods sorter downstream of the breakpack operation station is configured to as to define multiple axis of sortation orthogonal to each other.

30. The method of claim 29, wherein at least one axis of sortation in one direction has a parallel axis of sortation.

* * * * *